US008091117B2

(12) United States Patent
Williams et al.

(10) Patent No.: US 8,091,117 B2
(45) Date of Patent: Jan. 3, 2012

(54) SYSTEM AND METHOD FOR INTERFACING WITH HETEROGENEOUS NETWORK DATA GATHERING TOOLS

(75) Inventors: John Leslie Williams, Riverton, CT (US); Brian Costello, Los Angeles, CA (US); John Patrick Ravenel, Escondido, CA (US); Thomas Paul Walpoie, Carlsbad, CA (US)

(73) Assignee: Preventsys, Inc., Carlsbad, CA (US)

( * ) Notice: Subject to any disclaimer, the term of this patent is extended or adjusted under 35 U.S.C. 154(b) by 760 days.

(21) Appl. No.: 10/778,779

(22) Filed: Feb. 13, 2004

(65) Prior Publication Data

US 2005/0008001 A1    Jan. 13, 2005

Related U.S. Application Data

(60) Provisional application No. 60/448,313, filed on Feb. 14, 2003.

(51) Int. Cl.
*G06F 21/00* (2006.01)
(52) U.S. Cl. .......................................................... 726/3
(58) Field of Classification Search .......... 726/3, 11–14; 713/151–153
See application file for complete search history.

(56) References Cited

U.S. PATENT DOCUMENTS

| | | | | |
|---|---|---|---|---|
| 4,954,941 A | 9/1990 | Redman | ......................... | 364/200 |
| 4,999,806 A | 3/1991 | Chernow et al. | ............... | 364/900 |
| 5,175,732 A | 12/1992 | Hendel et al. | .................. | 370/463 |
| 5,237,614 A | 8/1993 | Weiss | .............................. | 380/23 |
| 5,581,764 A | 12/1996 | Fitzgerald et al. | ............ | 395/703 |
| 5,649,187 A | 7/1997 | Hornbuckle | .................. | 395/610 |
| 5,699,275 A | 12/1997 | Beasley et al. | ................. | 364/514 |
| 5,742,829 A | 4/1998 | Davis et al. | ..................... | 395/712 |
| 5,764,913 A | 6/1998 | Jancke et al. | ............. | 395/200.54 |
| 5,771,347 A | 6/1998 | Grantz et al. | ................... | 395/186 |
| 5,781,534 A * | 7/1998 | Perlman et al. | ................ | 370/248 |
| 5,799,002 A | 8/1998 | Krishnan | ........................ | 370/234 |
| 5,805,897 A | 9/1998 | Glowny | ......................... | 395/712 |
| 5,809,329 A | 9/1998 | Lichtman et al. | .............. | 395/828 |
| 5,852,812 A | 12/1998 | Reeder | ............................ | 705/39 |
| 5,854,794 A | 12/1998 | Pawlowski | .................... | 370/509 |
| 5,860,012 A | 1/1999 | Luu | ................................ | 395/712 |
| 5,875,186 A * | 2/1999 | Belanger et al. | ............... | 370/331 |

(Continued)

FOREIGN PATENT DOCUMENTS

EP          477039 A2  *  3/1992

(Continued)

OTHER PUBLICATIONS

Zhang et al., "An Information Protection System for Intranets", 2002, Proceedings of the Seventh International Symposium on COmputers and Communications, IEEE, 2002.*

(Continued)

*Primary Examiner* — Eleni Shiferaw
*Assistant Examiner* — Tamara Teslovich
(74) *Attorney, Agent, or Firm* — Patent Capital Group

(57) ABSTRACT

A prevention-based network auditing system includes a plurality of heterogeneous information sources gathering information about the network. An audit server invokes the heterogeneous information sources via a uniform communications interface to gather information about the network, and converts the information gathered by the information sources into a normalized data format such as, for example, into XML (Extensible Markup Language). The converted information is then stored in an audit repository for security and regulatory policy assessment, network vulnerability analysis, report generation, and security improvement recommendations.

20 Claims, 44 Drawing Sheets

U.S. PATENT DOCUMENTS

| | | | |
|---|---|---|---|
| 5,881,236 A | 3/1999 | Dickey | |
| 5,892,903 A | 4/1999 | Klaus | |
| 5,919,247 A | 7/1999 | Van Hoff et al. | 709/217 |
| 5,931,946 A | 8/1999 | Terada et al. | 713/201 |
| 5,933,646 A | 8/1999 | Hendrickson et al. | 395/712 |
| 5,933,826 A | 8/1999 | Ferguson | 707/9 |
| 5,968,176 A * | 10/1999 | Nessett et al. | 726/11 |
| 5,974,454 A | 10/1999 | Apfel et al. | 709/221 |
| 5,987,611 A | 11/1999 | Freund | 713/201 |
| 5,991,802 A | 11/1999 | Allard et al. | 709/219 |
| 6,016,499 A | 1/2000 | Ferguson | 707/104 |
| 6,029,247 A | 2/2000 | Ferguson | 713/201 |
| 6,052,710 A | 4/2000 | Saliba et al. | 709/203 |
| 6,061,740 A | 5/2000 | Ferguson et al. | 709/246 |
| 6,073,214 A | 6/2000 | Fawcett | 711/133 |
| 6,078,945 A | 6/2000 | Hinsley | 709/105 |
| 6,094,679 A | 7/2000 | Teng et al. | 709/229 |
| 6,108,649 A | 8/2000 | Young et al. | 707/4 |
| 6,115,743 A | 9/2000 | Cowan et al. | 709/224 |
| 6,138,157 A | 10/2000 | Welter et al. | 709/224 |
| 6,151,643 A | 11/2000 | Cheng et al. | 710/36 |
| 6,151,708 A | 11/2000 | Pedrizetti et al. | 717/11 |
| 6,157,618 A | 12/2000 | Boss et al. | 370/252 |
| 6,185,689 B1 | 2/2001 | Todd et al. | |
| 6,202,207 B1 | 3/2001 | Donohue | 717/11 |
| 6,205,552 B1 | 3/2001 | Fudge | 713/201 |
| 6,219,675 B1 | 4/2001 | Pal et al. | 707/201 |
| 6,229,540 B1 * | 5/2001 | Tonelli et al. | 715/735 |
| 6,243,766 B1 | 6/2001 | Sliger et al. | 710/2 |
| 6,256,668 B1 | 7/2001 | Slivka et al. | 709/220 |
| 6,263,362 B1 | 7/2001 | Donoho et al. | 709/207 |
| 6,266,774 B1 | 7/2001 | Sampath et al. | |
| 6,269,456 B1 | 7/2001 | Hodges et al. | 714/38 |
| 6,272,677 B1 | 8/2001 | Lam et al. | 717/11 |
| 6,279,113 B1 | 8/2001 | Vaidya | 713/201 |
| 6,279,156 B1 | 8/2001 | Amberg et al. | 717/11 |
| 6,281,790 B1 | 8/2001 | Kimmel et al. | 340/506 |
| 6,282,175 B1 | 8/2001 | Steele et al. | 370/254 |
| 6,282,546 B1 * | 8/2001 | Gleichauf et al. | 707/102 |
| 6,282,709 B1 | 8/2001 | Reha et al. | 717/11 |
| 6,282,712 B1 | 8/2001 | Davis et al. | 717/11 |
| 6,298,445 B1 | 10/2001 | Shostack et al. | 713/201 |
| 6,301,668 B1 * | 10/2001 | Gleichauf et al. | 726/25 |
| 6,307,841 B1 | 10/2001 | Rowles et al. | 370/252 |
| 6,311,278 B1 | 10/2001 | Raanan et al. | |
| 6,321,337 B1 | 11/2001 | Reshef et al. | |
| 6,324,656 B1 | 11/2001 | Gleichauf et al. | 714/37 |
| 6,334,190 B1 | 12/2001 | Silverbrook et al. | 713/500 |
| 6,347,375 B1 | 2/2002 | Reinert et al. | 713/201 |
| 6,380,851 B1 * | 4/2002 | Gilbert et al. | 340/517 |
| 6,408,391 B1 * | 6/2002 | Huff et al. | 726/22 |
| 6,415,321 B1 * | 7/2002 | Gleichauf et al. | 709/224 |
| 6,425,006 B1 * | 7/2002 | Chari et al. | 709/224 |
| 6,487,666 B1 | 11/2002 | Shanklin et al. | |
| 6,493,871 B1 | 12/2002 | Welch et al. | 717/173 |
| 6,546,493 B1 | 4/2003 | Magdych et al. | 713/201 |
| 6,574,737 B1 | 6/2003 | Kingsford et al. | |
| 6,584,569 B2 | 6/2003 | Reshef et al. | |
| 6,684,253 B1 | 1/2004 | Whitaker et al. | 709/229 |
| 6,704,874 B1 * | 3/2004 | Porras et al. | 726/22 |
| 6,718,359 B2 | 4/2004 | Zisapel et al. | |
| 6,721,713 B1 | 4/2004 | Guheen et al. | 705/1 |
| 6,725,046 B2 | 4/2004 | Park | |
| 6,735,701 B1 * | 5/2004 | Jacobson | 726/1 |
| 6,751,661 B1 | 6/2004 | Geddes | 709/223 |
| 6,754,895 B1 | 6/2004 | Bartel et al. | 717/171 |
| 6,766,458 B1 | 7/2004 | Harris et al. | 713/201 |
| 6,785,821 B1 | 8/2004 | Teal | |
| 6,789,202 B1 | 9/2004 | Ko et al. | 713/201 |
| 6,859,793 B1 | 2/2005 | Lambiase | 705/59 |
| 6,862,581 B1 | 3/2005 | Lambiase | 705/51 |
| 6,920,558 B2 | 7/2005 | Sames et al. | 713/166 |
| 6,947,398 B1 | 9/2005 | Ahmed et al. | 370/331 |
| 6,957,348 B1 | 10/2005 | Flowers et al. | |
| 6,976,068 B2 | 12/2005 | Kadam et al. | 709/223 |
| 6,988,208 B2 | 1/2006 | Hrabik et al. | 726/23 |
| 6,990,660 B2 | 1/2006 | Moshir et al. | |
| 7,000,247 B2 | 2/2006 | Banzhof | 726/2 |
| 7,003,561 B1 | 2/2006 | Magdych et al. | 709/223 |
| 7,024,548 B1 | 4/2006 | O'Toole | 713/1 |
| 7,058,968 B2 | 6/2006 | Rowland et al. | 726/1 |
| 7,069,581 B2 | 6/2006 | Fu et al. | 726/3 |
| 7,073,198 B1 | 7/2006 | Flowers et al. | |
| 7,089,589 B2 | 8/2006 | Chefalas et al. | 726/22 |
| 7,096,498 B2 * | 8/2006 | Judge | 726/22 |
| 7,096,502 B1 | 8/2006 | Fox et al. | |
| 7,096,503 B1 | 8/2006 | Magdych et al. | 726/25 |
| 7,124,181 B1 | 10/2006 | Magdych et al. | 709/224 |
| 7,146,642 B1 | 12/2006 | Magdych et al. | 726/22 |
| 7,152,105 B2 | 12/2006 | McClure et al. | 709/224 |
| 7,243,148 B2 | 7/2007 | Keir et al. | |
| 7,257,630 B2 | 8/2007 | Cole et al. | |
| 7,260,844 B1 | 8/2007 | Tidwell | |
| 7,290,275 B2 | 10/2007 | Baudoin et al. | 726/1 |
| 7,308,712 B2 | 12/2007 | Banzhof | |
| 7,346,922 B2 | 3/2008 | Miliefsky | 726/3 |
| 7,536,456 B2 | 5/2009 | Williams et al. | 709/224 |
| 7,543,056 B2 | 6/2009 | McClure et al. | |
| 7,624,422 B2 | 11/2009 | Williams et al. | 726/1 |
| 7,627,891 B2 | 12/2009 | Williams et al. | 726/1 |
| 7,664,845 B2 | 2/2010 | Kurtz et al. | |
| 7,673,043 B2 | 3/2010 | Keir et al. | |
| 7,680,880 B2 | 3/2010 | Landfield | |
| 7,823,147 B2 | 10/2010 | Moshir et al. | |
| 2001/0014150 A1 | 8/2001 | Beebe et al. | 379/189 |
| 2001/0020254 A1 | 9/2001 | Blumenau et al. | 709/229 |
| 2001/0034847 A1 | 10/2001 | Gaul, Jr. | |
| 2001/0049793 A1 | 12/2001 | Sugimoto | 713/200 |
| 2002/0005092 A1 * | 1/2002 | Collins et al. | 81/57.39 |
| 2002/0010679 A1 | 1/2002 | Felsher | 705/51 |
| 2002/0010855 A1 | 1/2002 | Reshef et al. | |
| 2002/0019945 A1 * | 2/2002 | Houston et al. | 713/201 |
| 2002/0026591 A1 | 2/2002 | Hartley et al. | 713/201 |
| 2002/0035542 A1 * | 3/2002 | Tumey et al. | 705/44 |
| 2002/0053020 A1 * | 5/2002 | Teijido et al. | 713/153 |
| 2002/0061001 A1 * | 5/2002 | Garcia-Luna-Aceves et al. | 370/338 |
| 2002/0068559 A1 * | 6/2002 | Sharma et al. | 455/423 |
| 2002/0082778 A1 | 6/2002 | Barnett et al. | |
| 2002/0083337 A1 | 6/2002 | Welcher et al. | 713/201 |
| 2002/0087882 A1 | 7/2002 | Schneier et al. | 713/201 |
| 2002/0100036 A1 | 7/2002 | Moshir et al. | 717/173 |
| 2002/0103658 A1 * | 8/2002 | Angal et al. | 705/1 |
| 2002/0104014 A1 * | 8/2002 | Zobel et al. | 713/200 |
| 2002/0116639 A1 | 8/2002 | Chefalas et al. | 713/201 |
| 2002/0138271 A1 | 9/2002 | Shaw | 704/270 |
| 2002/0147803 A1 | 10/2002 | Dodd et al. | 709/223 |
| 2002/0178382 A1 | 11/2002 | Mukai et al. | |
| 2002/0178383 A1 | 11/2002 | Hrabick et al. | |
| 2002/0184533 A1 | 12/2002 | Fox | 713/201 |
| 2002/0188481 A1 | 12/2002 | Berg et al. | 705/4 |
| 2003/0014664 A1 | 1/2003 | Hentunen | |
| 2003/0028803 A1 | 2/2003 | Bunker et al. | |
| 2003/0046128 A1 | 3/2003 | Heinrich | |
| 2003/0056113 A1 | 3/2003 | Korosec | 713/200 |
| 2003/0056116 A1 | 3/2003 | Bunker et al. | 713/201 |
| 2003/0061506 A1 | 3/2003 | Cooper et al. | 713/201 |
| 2003/0065942 A1 | 4/2003 | Lineman et al. | 713/201 |
| 2003/0101353 A1 | 5/2003 | Tarquini et al. | |
| 2003/0120935 A1 | 6/2003 | Teal et al. | 713/188 |
| 2003/0126472 A1 | 7/2003 | Banzhof | 713/201 |
| 2003/0135749 A1 | 7/2003 | Gales et al. | 713/200 |
| 2003/0140250 A1 | 7/2003 | Taninaka et al. | 713/201 |
| 2003/0154269 A1 | 8/2003 | Nyanchama et al. | |
| 2003/0163728 A1 | 8/2003 | Shaw | 713/201 |
| 2003/0172145 A1 | 9/2003 | Nguyen | 709/223 |
| 2003/0188189 A1 * | 10/2003 | Desai et al. | 713/201 |
| 2003/0195861 A1 | 10/2003 | McClure et al. | |
| 2003/0196097 A1 | 10/2003 | Korosec et al. | 713/185 |
| 2003/0196123 A1 | 10/2003 | Rowland et al. | 713/201 |
| 2003/0200357 A1 | 10/2003 | Yanosy | 709/328 |
| 2003/0204632 A1 | 10/2003 | Willebeek-LeMair et al. | 709/249 |
| 2003/0208606 A1 | 11/2003 | Maguire et al. | 709/227 |
| 2003/0212779 A1 | 11/2003 | Boyter et al. | |
| 2003/0212909 A1 | 11/2003 | Chandrashekhar et al. | 713/201 |
| 2003/0217039 A1 | 11/2003 | Kurtz et al. | |

| | | | |
|---|---|---|---|
| 2003/0220940 A1 | 11/2003 | Futoransky et al. ....... | 707/104.1 |
| 2003/0233438 A1 | 12/2003 | Hutchinson | |
| 2004/0003266 A1 | 1/2004 | Moshir et al. ................ | 713/191 |
| 2004/0010709 A1 | 1/2004 | Baudoin et al. .............. | 713/201 |
| 2004/0015728 A1 | 1/2004 | Cole et al. | |
| 2004/0019803 A1 | 1/2004 | Jahn ............................ | 713/201 |
| 2004/0042470 A1 | 3/2004 | Cooper et al. ................ | 370/401 |
| 2004/0064731 A1 | 4/2004 | Nguyen et al. | |
| 2004/0073810 A1 | 4/2004 | Dettinger et al. | |
| 2004/0078384 A1 | 4/2004 | Keir et al. | |
| 2004/0098621 A1 | 5/2004 | Raymond .................... | 713/201 |
| 2004/0103309 A1 | 5/2004 | Tracy et al. | |
| 2004/0111643 A1 | 6/2004 | Farmer ........................ | 713/201 |
| 2004/0117478 A1 | 6/2004 | Triulzi et al. | |
| 2004/0123145 A1 | 6/2004 | Baffes et al. ................. | 713/201 |
| 2004/0143753 A1 | 7/2004 | Hernacki et al. ............. | 713/200 |
| 2004/0170153 A1 | 9/2004 | Stewart et al. ............... | 370/338 |
| 2004/0187032 A1 | 9/2004 | Gels et al. | |
| 2004/0221178 A1 | 11/2004 | Aaron et al. ................. | 713/201 |
| 2004/0225524 A1 | 11/2004 | Narasimhan et al. ............ | 705/1 |
| 2004/0250116 A1 | 12/2004 | Strickland et al. | |
| 2005/0010821 A1 | 1/2005 | Cooper et al. ............... | 713/201 |
| 2005/0015622 A1 | 1/2005 | Williams et al. | |
| 2005/0015623 A1 | 1/2005 | Williams et al. | |
| 2005/0022012 A1 | 1/2005 | Bluestone et al. | |
| 2005/0022028 A1 | 1/2005 | Hall | |
| 2005/0044037 A1 | 2/2005 | Lawrence et al. .............. | 705/38 |
| 2005/0044389 A1 | 2/2005 | Oliphant ....................... | 713/187 |
| 2005/0091542 A1 | 4/2005 | Banzhof | |
| 2005/0111466 A1 | 5/2005 | Kappes et al. ................ | 370/400 |
| 2005/0125685 A1 | 6/2005 | Samuelson et al. ........... | 713/200 |
| 2005/0138433 A1 | 6/2005 | Linetsky ....................... | 713/202 |
| 2005/0188419 A1 | 8/2005 | Dadhia et al. ..................... | 726/1 |
| 2005/0201297 A1 | 9/2005 | Peikari .......................... | 370/242 |
| 2005/0216957 A1 | 9/2005 | Banzhof et al. ................. | 726/25 |
| 2005/0257267 A1 | 11/2005 | Williams et al. | |
| 2006/0080653 A1 | 4/2006 | Siwatu et al. | |
| 2006/0101517 A1 | 5/2006 | Banzhof et al. ................ | 726/25 |
| 2006/0136327 A1 | 6/2006 | You | |
| 2006/0191012 A1 | 8/2006 | Banzhof et al. ................ | 726/25 |
| 2006/0206757 A1 | 9/2006 | Russell et al. | |
| 2006/0282388 A1 | 12/2006 | Solomon et al. ............... | 705/52 |
| 2007/0011319 A1 | 1/2007 | McClure et al. | |
| 2007/0016955 A1 | 1/2007 | Goldberg et al. | |
| 2007/0162973 A1 | 7/2007 | Schneier et al. | |
| 2007/0250595 A1 | 10/2007 | Landfield | |
| 2007/0283007 A1 | 12/2007 | Keir et al. | |
| 2007/0283441 A1 | 12/2007 | Cole et al. | |
| 2009/0259748 A1 | 10/2009 | McClure et al. | |
| 2011/0029966 A1 | 2/2011 | Moshir et al. | |

FOREIGN PATENT DOCUMENTS

| | | |
|---|---|---|
| EP | 1143665 | 10/2001 |
| WO | WO 9967931 | 12/1999 |
| WO | WO 01/65330 | 9/2001 |
| WO | WO 03/058457 | 7/2003 |
| WO | WO 03/060717 | 7/2003 |
| WO | WO 2005/094490 | 10/2005 |
| WO | WO 2006/049841 | 5/2006 |
| WO | WO 2006/091425 | 8/2006 |

OTHER PUBLICATIONS

International Search Report for PCT/US04/04292 dated Jan. 14, 2005, 1 page.
Request for Reexamination of U.S. Patent No. 7,000,247 filed on Mar. 2, 2006.
Office Action Summary from U.S. Appl. No. 10/810,927 which was mailed on Dec. 15, 2006.
Office Action Summary from U.S. Appl. No. 10/975,828 which was mailed on Nov. 15, 2006.
U.S. Appl. No. 11/009,782, filed Dec. 10, 2004.
U.S. Appl. No. 11/410,730, filed Apr. 25, 2006.
Wolfe et al., "Maintaining remote services and resources over the Internet and other networks" Jun. 10-12, 2002; IEEE, p. 137-138.
Peng Lui; "Engineering a distributed intrusion tolerant database system using COTS components" IEEE, vol. 2, Apr. 22-24, 2003, p. 284-289.
International Search Report and Written Opinion from PCT Application No. US05/09689 mailed Jan. 25, 2007.
CERT® Advisories, "CERT/CC Advisories 1988-200" http://web.archive.org/web/20000815055129/http://www.cert.org/advisories/ 2000, p. 1-34.
"Review SPQUERY", in Network Computing, Nov. 2000 www.networkcomputer.co.uk/back_iss/prod_update/reviews/spquery4.1.htm.
"Ready for Windows 2000 Service Pack 1? St. Bernards Software's SPQuery 4.0 is Here Just in Time," Business Wire, Aug. 2, 2000, www.findarticles.com/p/articles/mi_m0EIN/is_August_2/ai_63819686/print.
Edwards, Mark Joseph, "Useful SPQuery 3.0 automates Finding, installing hotfixes," Infoworld, Jun. 21, 1999 www.infoworld.com/cgi-bin/displayArchive.pl?/99/25/c04-25.46htm.
SPQuery Users Manuel, 1st. Quarter 2001.
WebConsole Core 4.0 for NetWare, archived May 11, 2000 Web.archive.org/web/200005111133746/www.patchlink.com/products/wenw_product...
"Gravitix The Patch Finder" archived Aug. 15, 2000 web.archive.org/web/20000815094824/www.patchlink.com/products/gravitix.asp.
"Network Vulnerability Assessment Report" archived Sep. 17, 2000 web.archive.org/web/20000917072109/documents.iss.net/literature/InternetScanner/reports/Line_Mgmt_Vulnerability_Assessment_Report.pdf.
"Host Vulnerability Summary Report" archived Sep. 17, 2000 web.archive.org/web/20000917072216/documents.iss.net/literature/InternetScanner/reports/Technician_Host-Vulnerability_Summary_Report.pdf.
"ISS SAFEsuite prodict: Internet Scanner" archived Aug. 20, 2000 web.archive.org/web/2000082023428/www.iss.net/securing_e-business/security_pr...
"To Setup Secure PC Network" archived Aug. 16, 2000 web.archive.org/web/20000816192628/www.citadel.com/downloads/SPC+readme.txt.
"Microsoft Security Glossary" Oct. 29, 2002 www.microsoft.com/security/glossary.mspx.
Stephen Swoyer, Hotfix Management Tools Maturing Nov. 19, 2001, ENT News.
"Systems Management Server Product Overview, Features" www.microsoft.com; Jan. 29, 2002.
Novel ZENworks Grows Up, Feb. 7, 2000.
www.thestandard.com article, Dec. 21, 2000.
Topaz white paper; copyright date 2000.
Topaz news release; Oct. 4, 1999.
www.freshtech.com web pages, pp. 1-8; copyright date 1996-2000.
"Benefits of Software Leasing"; Dec. 15, 1998.
"Leasing Software"; no later than Feb. 27, 2001.
Timbale pp. 1-4; Dec. 21, 2000.
"The Open Software Description Format (OSD)"; Aug. 11, 1997.
Computer Associate ManageIT news release; May 8, 2000.
www.sitepartrol.com pp. 1-2; no later than Nov. 28, 2001.
www/rhsolution.com pp. 1-4; no later than Jan. 8, 2001.
www.hotelhelpdesk.com pp. 1-4, no later than Jan. 8, 2001.
InfraDesk™ page; Dec. 21, 2000.
www.triactive.com page; no later than Nov. 28, 2001.
Webopedia.com definitions; copyright date 2001.
Technical Comparison of Systems Management Server 2.0 and Novell's ZENworks 2.0; copyright date 2000.
SafePatch Description , pp. 1-3; Oct. 2000.
SafePatch; Oct. 2000.
Marimba Castanet; copyright 2000.
wwvv.shavlik.com pp. 1-12; copyright date 2001.
HFNetChk, pp. 1-21; copyright date 2001.
Welcome to Windows Update page; copyright date 2001.
Winfingerprint pp. 1-3; no later than Sep. 10, 2001.
Shipley, G. "Tools From the Underground", May 29, 2000.
Sourceforge.net pp. 1-2; copyright date 1999, 2000, 2001.
Robinson, C., "Patchlink.com Brings Remote Management Online", Dec. 4, 2000.
Coopee, "Building a strong foundation", Network World Fusion, Jan. 31, 2000.
"Q. What is Qchain.exe?" www.ntfaq.com; Jul. 23, 2001.

"Newly Released Patchlink Update 4.0 . . ." biz.yahoo.com; Oct. 14, 2002.

Burnback, "Patching up bad patches" www.zdnet.com; Nov. 22, 2002.

Mueller, "Patchlink Helps Keep Windows Closed" www.netowrkcomputing.com; Sep. 2, 2002.

Patchlink® Update™ 4.0 White Paper: Cross-platform Security Patch Management; Copyright date 2002.

Pages numbered as 1-27, from www.bigfix.com; no later than Nov. 25, 2002.

"UpdateEXPERT: Product Reviews & Testimonials" www.stbernard.com.

"SPQuery v4.1", www.networkcomputin.co.uk Nov. 2000.

"Ahead of the Service Pack", www.networkcomputing.co.uk ; Nov. 2000.

U.S. Appl. No. 10/975,828, filed Oct. 28, 2004.

U.S. Appl. No. 10/810,927, filed Mar. 25, 2004.

Final Office Action Summary from U.S. Appl. No. 10/778,837 mailed on Mar. 5, 2008.

Final Office Action Summary from U.S. Appl. No. 10/778,836 mailed on Mar. 17, 2008.

Office Action Summary from U.S. Appl. No. 10/778,770 mailed on Sep. 26, 2007.

Office Action Summary from U.S. Appl. No. 10/778,770 mailed on Apr. 26, 2007.

Office Action Summary from U.S. Appl. No. 10/779,190 mailed on Sep. 18, 2007.

Office Action Summary from U.S. Appl. No. 10/778,837 mailed on Sep. 24, 2007.

Office Action Summary from U.S. Appl. No. 10/778,836 mailed on Sep. 10, 2007.

Zhang, Guoqing et al., "An Information Protection System for Intranets" Proceedings of the Seventh International Symposium on Computers and Communications (2002).

Final Office Action Summary from U.S. Appl. No. 10/778,770 mailed on Apr. 30, 2008.

Final Office Action Summary from U.S. Appl. No. 10/779,190 mailed on Apr. 29, 2008.

Office Action Summary from U.S. Appl. No. 10/778,837 mailed on Jul. 3, 2008.

Office Action Summary from U.S. Appl. No. 10/778,836 mailed on Sep. 3, 2008.

Office Action Summary from U.S. Appl. No. 10/779,190 which was Mailed on Sep. 26, 2008.

Office Action Summary from U.S. Appl. No. 10/778,770 mailed on Oct. 14, 2008.

Notice of Allowance from U.S. Appl. No. 10/778,836 mailed on Apr. 9, 2009.

Final Office Action Summary from U.S. Appl. No. 10/778,837 mailed on Dec. 16, 2008.

Final Office Action Summary from U.S. Appl. No. 10/778,770 mailed on Apr. 2, 2009.

Notice of Allowance from U.S. Appl. No. 10/779,190 mailed on May 18, 2009.

Notice of Allowance from U.S. Appl. No. 10/778,837 mailed on Jun. 29, 2009.

Supplemental Search Report in European Application No. 04711110.9-1244 mailed on May 17, 2010 (3 pages).

Response to Non-Final Action dated Apr. 26, 2007 in U.S. Appl. No. 10/778,770, filed Jul. 24, 2007.

Response to Non-Final action dated Sep. 26, 2007 in U.S. Appl. No. 10/778,770, filed Jan. 28, 2008.

RCE and Amendment filed in Response to Final Action dated Apr. 30, 2008 in U.S. Appl. No. 10/778,770, filed Jul. 30, 2008.

Response to Non-Final Action dated Oct. 14, 2008 in U.S. Appl. No. 10/778,770, filed Jan. 14, 2009.

Notice of Appeal and Appeal Brief in U.S. Appl. No. 10/778,770 as filed on Jul. 2, 2009.

Examiner's Answer to Appeal Brief in U.S. Appl. No. 10/778,770 mailed Oct. 15, 2009.

Reply Brief in U.S. Appl. No. 10/778,770, filed Jan. 15, 2010.

Non-Final Office Action in U.S. Appl. No. 10/813,917 mailed on May 4, 2007.

Response to Non-Final Office Action dated May 4, 2007 in U.S. Appl. No. 10/813,917, filed Aug. 6, 2007.

Final Office Action in U.S. Appl. No. 10/813,917 mailed on Oct. 17, 2007.

Response to Final Office Action dated Oct. 17, 2007 in U.S. Appl. No. 10/813,917, filed Dec. 21, 2007.

Advisory Action in U.S. Appl. No. 10/813,917 mailed on Jan. 25, 2008.

Request for Continued Examination and Amendment in U.S. Appl. No. 10/813,917, filed Mar. 19, 2008.

Non-Final Action in U.S. Appl. No. 10/813,917 mailed on Jun. 10, 2008.

Response to Non-Final Action dated Jun. 10, 2008 in U.S. Appl. No. 10/813,917, filed Sep. 3, 2008.

Final Office Action in U.S. Appl. No. 10/813,917 mailed on Dec. 12, 2008.

Pre-Brief Conference Request and Notice of Appeal in U.S. Appl. No. 10/813,917, filed Mar. 12, 2009.

Pre-Brief Appeal Conference Decision in U.S. Appl. No. 10/813,917 mailed on Apr. 13, 2008.

Request for Continued Examination and Amendment in U.S. Appl. No. 10/813,917, filed May 13, 2009.

Non-Final Office Action in U.S. Appl. No. 10/813,917 mailed on Aug. 7, 2009.

Response to Non-Final Office Action dated Aug. 7, 2009 in U.S. Appl. No. 10/813,917, filed Dec. 7, 2009.

Final Office Action in U.S. Appl. No. 10/813,917 mailed on Feb. 22, 2010.

Request for Continued Examination and Amendment in U.S. Appl. No. 10/813,917, filed Jun. 22, 2010.

Non-Final Office Action in U.S. Appl. No. 10/813,917 mailed on Oct. 7, 2010.

Notice of Appeal in U.S. Appl. No. 10/813,917, filed Feb. 24, 2011.

Non-Final Office Action in U.S. Appl. No. 11/521,113 mailed on May 16, 2008.

Response to Non-Final Office Action dated May 16, 2008 in U.S. Appl. No. 11/521,113, filed Aug. 18, 2008.

Notice of Allowance and Examiner Interview Summary in U.S. Appl. No. 11/521,113 mailed on Dec. 2, 2008.

Non-Final Office Action in U.S. Appl. No. 11/521,113 mailed on Dec. 29, 2008.

312 Amendment in in U.S. Appl. No. 11/521,113, filed Mar. 2, 2009.

Applicant Summary of Interview with Examiner in U.S. Appl. No. 12/476,082, filed Jan. 21, 2011.

Notice of Allowance and Examiner Interview Summary in U.S. Appl. No. 12/476,082, filed Feb. 9, 2011.

Request for Continued Examination in U.S. Appl. No. 12/476,082, filed Feb. 25, 2011.

Notice of Allowance in U.S. Appl. No. 12/476,082 mailed on Mar. 10, 2011.

Request for Continued Examination and Amendment in U.S. Appl. No. 12/476,082, filed Jun. 10, 2011.

Non-Final Office Action in U.S. Appl. No. 10/387,221 mailed on Sep. 22, 2006.

Response to Non-Final Office Action dated Sep. 22, 2006 in U.S. Appl. No. 10/387,221, filed Dec. 22, 2006.

Notice of Allowance in U.S. Appl. No. 10/387,221 mailed on Feb. 14, 2007.

Non-Final Office Action in U.S. Appl. No. 11/748,445 mailed on Mar. 9, 2010.

Response to Non-Final Office Action dated Mar. 9, 2010 in U.S. Appl. No. 11/748,445, filed Jun. 9, 2010.

Final Office Action in U.S. Appl. No. 11/748,445 mailed on Aug. 20, 2010.

Response to Final Office Action dated Aug. 20, 2010 in U.S. Appl. No. 11/748,445, filed Jan. 20, 2011.

Examiner Interview Summary in U.S. Appl. No. 11/748,445 mailed on Feb. 4, 2011.

Examiner Interview Summary in U.S. Appl. No. 11/748,445 mailed on Feb. 7, 2011.

Applicant Summary of Interview with Examiner in U.S. Appl. No. 11/748,445, filed Feb. 9, 2011.

Advisory Action in n U.S. Appl. No. 11/748,445 mailed on Feb. 18, 2011.
Request for Continued Examination in U.S. Appl. No. 11/748,439, filed Feb. 18, 2011.
Notice of Allowance in U.S. Appl. No. 11/748,439, filed Mar. 16, 2011.
Request for Continued Examination in U.S. Appl. No. 11/748,439, filed Jun. 13, 2011.
Non-Final Office Action in U.S. Appl. No. 10/387,358 mailed on Dec. 19, 2005.
Response to Non-Final Office Action dated Dec. 19, 2005 in U.S. Appl. No. 10/387,358, filed Mar. 20, 2006.
Non-Final Office Action in U.S. Appl. No. 10/387,358 mailed on Nov. 17, 2006.
Response to Non-Final Office Action dated Nov. 17, 2006 in U.S. Appl. No. 10/387,358, filed Feb. 20, 2007.
Final Office Action in U.S. Appl. No. 10/387,358 mailed on Apr. 23, 2007.
Response to Final Office Action dated Apr. 23, 2007 in U.S. Appl. No. 10/387,358, filed Jun. 25, 2007.
Supplemental Response to Final Office Action dated Apr. 23, 2007 in U.S. Appl. No. 10/387,358, filed Jul. 2, 2007.
Advisory Action in U.S. Appl. No. 10/387,358 mailed on Aug. 2, 2007.
Notice of Appeal in U.S. Appl. No. 10/387,358, filed Sep. 24, 2007.
Appeal Brief Filed in U.S. Appl. No. 10/387,358, filed Jan. 24, 2008.
Notice of Defective Appeal Brief in U.S. Appl. No. 10/387,358 mailed on Jul. 8, 2008.
Appeal Brief Filed in U.S. Appl. No. 10/387,358, filed Jul. 23, 2008.
Non-Final Office Action in U.S. Appl. No. 10/387,358, filed Sep. 29, 2008.
Response to Non-Final Office Action dated Sep. 29, 2008 in U.S. Appl. No. 10/387,358, filed Jan. 29, 2009.
Final Office Action in U.S. Appl. No. 10/387,358 mailed on Apr. 2, 2009.
Request for Continued Examination and Amendment in U.S. Appl. No. 10/387,358, filed Jul. 2, 2009.
Notice of Allowance and Examiner Interview Summary in U.S. Appl. No. 10/387,358 mailed on Sep. 17, 2009.
Supplemental Notice of Allowance in U.S. Appl. No. 10/387,358 mailed on Nov. 4, 2009.
312 Amendment in U.S. Appl. No. 10/387,358, filed Dec. 17, 2009.
Non-Final Office Action in U.S. Appl. No. 10/387,223 mailed on Sep. 22, 2006.
Response to Non-Final Office Acction dated Sep. 22, 2006 in U.S. Appl. No. 10/387,223, filed Dec. 22, 2006.
Notice of Allowance in U.S. Appl. No. 10/387,223 mailed on Feb. 14, 2007.
Non-Final Office Action in U.S. Appl. No. 11/748,445 mailed on Jul. 24, 2009.
Response to Non-Final Office Action dated Jul. 24, 2009 in U.S. Appl. No. 11/748,445, filed Oct. 26, 2009.
Notice of Allowance in U.S. Appl. No. 11/748,445, filed Dec. 28, 2009.
Non-Final Office Action in U.S. Appl. No. 10/050,675 mailed on Jan. 20, 2006.
Response to Non-Final Office Action dated Jan. 20, 2006 in U.S. Appl. No. 10/050,675, filed Apr. 17, 2006.
Notice of Allowance in U.S. Appl. No. 10/050,675 mailed on Jul. 17, 2006.
Supplemental Notice of Allowance in U.S. Appl. No. 10/050,675 mailed on Sep. 27, 2006.
Notice of Allowance in U.S. Appl. No. 11/748,439 mailed on Jun. 22, 2011.
Non-Final Office Action in U.S. Appl. No. 11/410,730 mailed on Apr. 29, 2009.
Response to Non-Final Office Action dated Apr. 29, 2009 in U.S. Appl. No. 11/410,730, filed Aug. 31, 2009.
Notice of Allowance in U.S. Appl. No. 11/410,730 mailed on Dec. 16, 2009.
312 Amendment in U.S. Appl. No. 11/410,730, filed Jan. 14, 2010.
Non-Final Office Action in U.S. Appl. No. 10/335,490 mailed on Nov. 18, 2004.
Response to Non-Final Office Action dated Nov. 18, 2004 in U.S. Appl. No. 10/335,490, filed Dec. 10, 2004.
Examiner Interview Summary in U.S. Appl. No. 10/335,490 mailed on Dec. 21, 2004.
Non-Final Office Action in U.S. Appl. No. 10/335,490 mailed on Mar. 23, 2005.
Response to Non-Final Office Action dated Mar. 23, 2005 in U.S. Appl. No. 10/335,490, filed May 4, 2005.
Supplemental Amendment to Non-Final Action dated Mar. 23, 2005 in U.S. Appl. No. 10/335,490, filed Jun. 30, 2005.
Examiner Interview Summary in U.S. Appl. No. 10/335,490 mailed on Aug. 29, 2005.
Notice of Allowance, Notice of Allowability, and Examiner's Interview Summary in U.S. Appl. No. 11/335,490 mailed on Sep. 22, 2005.
USPTO Image File Wrapper for Reexamination of U.S. Patent No. 7,000,247 filed as U.S. Reexamination Control No. 90/007,955 on Mar. 2, 2006.
Non-Final Office Action in U.S. Appl. No. 10/009,782 mailed on Jun. 4, 2007.
Response to Non-Final Office Action dated Jun. 4, 2007 in U.S. Appl. No. 10/009,782, filed Aug. 3, 2007.
Notice of Allowance in U.S. Appl. No. 10/009,782 mailed on Aug. 24, 2007.
USPTO Image File Wrapper for Reexamination of U.S. Patent No. 7,308,712 filed as U.S. Reexamination Application Control No. 90/009,120 on May 29, 2008.
U.S. Appl. No. 10/927,927, filed Mar. 25, 2004.
Non-Final Office Action in U.S. Appl. No. 10/810,927 mailed on Dec. 15, 2006.
Examiner Interview Summary in U.S. Appl. No. 10/810,927 mailed on Feb. 9, 2007.
Response to Non-Final Office Action dated Dec. 15, 2006 in U.S. Appl. No. 10/810,927, filed Feb. 22, 2007.
Final Office Action in U.S. Appl. No. 10/810,927 mailed on May 2, 2007.
Response to Final Office Action dated May 2, 2007 in U.S. Appl. No. 10/810,927, filed Jun. 28, 2007.
Notice of Non-Compliant Amendment in U.S. Appl. No. 10/810,927 mailed on Jul. 13, 2007.
Response to Notice of Non-Compliant Amendment dated Jul. 13, 2007 in U.S. Appl. No. 10/810,927, filed Jul. 18, 2007.
Advisory Action in U.S. Appl. No. 10/810,927 mailed on Oct. 3, 2007.
Notice of Abandonment in U.S. Appl. No. 10/810,927 mailed on Feb. 27, 2007.
Non-Final Office Action in U.S. Appl. No. 10/975,828 mailed on Nov. 15, 2006.
Examiner Interview Summary in U.S. Appl. No. 10/975,828 mailed on Feb. 9, 2007.
Response to Non-Final Action dated Nov. 15, 2006 in U.S. Appl. No. 10/975,828, filed Feb. 14, 2007.
Final Office Action in U.S. Appl. No. 10/975,828 mailed on May 17, 2007.
Response to Final Office Action in U.S. Appl. No. 10/975,828 mailed on Jul. 13, 2007.
Advisory Action in U.S. Appl. No. 10/975,828 mailed on Aug. 1, 2007.
Notice of Abandonment in U.S. Appl. No. 10/975,828 mailed on Dec. 27, 2007.
Response to Non-Final Action dated Sep. 10, 2007 in U.S. Appl. No. 10/778,836, filed Dec. 10, 2007.
Request for Continued Examination and Amendment in U.S. Appl. No. 10/778,836, filed Jun. 17, 2008.
Response to Non-Final Action dated Sep. 3, 2008 in U.S. Appl. No. 10/778,836, filed Dec. 3, 2008.
Response to Non-Final Office Action dated Sep. 24, 2007 in U.S. Appl. No. 10/778,837, filed Jan. 24, 2008.
Request for Continued Examination and Amendment in U.S. Appl. No. 11/778,837, filed Jun. 5, 2008.
Response to Non-Final Office Action dated Jul. 3, 2008 in U.S. Appl. No. 11/778,837, filed Sep. 22, 2008.

Pre-Brief Conference Request and Notice of Appeal in U.S. Appl. No. 10/778,837, filed Mar. 16, 2009.
Pre-Brief Conference Decision in U.S. Appl. No. 10/778,837 mailed on Apr. 8, 2009.
Examiner Interview Summary in U.S. Appl. No. 10/778,837 mailed on Jun. 10, 2009.
Response to Non-Final Office Action dated Sep. 18, 2007 in U.S. Appl. No. 10/779,190, filed Jan. 18, 2008.
Request for Continued Examination and Amendment in U.S. Appl. No. 10/779,190, filed Jul. 29, 2008.
Response to Non-Final Action dated Sep. 26, 2008 in U.S. Appl. No. 10/779,190, filed Jan. 26, 2009.
Notice of Allowance in U.S. Appl. No. 12/476,082 mailed on Aug. 8, 2011.
"Active Watch: Hosted Web Performance Monitoring Service"; copyright date 2000. (Cited in U.S. Appl. No. 10/335,490).
"Ahead of the Service Pack"; from www.networkcomputing.co.uk website via link in "UpdateEXPERT: Product Reviews & Testimonials"; Nov. 2000.
"ASPs: Leasing software"; copyright date 2000-2001. (Cited in U.S. Appl. No. 10/335,490).
Craig Smith and Peter Grundl, Know Your Enemy: Passive Fingerprinting, Sep. 3, 2001, available at <http://www.project.honeynet.org/papers/finger/>.
Fyodor, "Remote OS detection via TCP/IP Stack FingerPrinting," Oct. 18, 1998, retrieved from <http://nmap.org/nmap-fingerprinting-article.txt on Feb. 25, 2011>.
Fyodor, The Art of Port Scanning, Phrack Magazine, vol. 7, Issue 51, Sep. 1, 1997*, available at <http://www.insecure.org/nmap/p51-11.txt>.
"Internet Security Systems Internet Scanner", archived Jun. 6, 2001 in Web.archive.org., web.archive.org/web/2001060422406/documents.iss.net/literature/InternetScanner/is.sub.-- ps. pdf. (Cited in U.S. Appl. No. 11/009,782).
Magic Solutions®, The Leader in Service Management, ©2003, 8 pages.
Magic Total Service Desk, brochure dated Apr. 2001, 2 pages.
Beddoe et al., "The Siphon Project: An Implementation of Stealth Target Acquisition & Information Gathering Methodologies", Blackhat USA Conference 2001, presented Jul. 11, 2001, available at <http://www.blackhat.com/html/bh-usa-01/bh-usa-01-speakers.html>.
Spitzner, L., "Passive Fingerprinting Symantec Connect", May 2, 2002, retrieved from <www.securityfocus.com/infocus/1224 on Feb. 25, 2011>.
"Systems Management Server Product Overview, Features", from www.Microsoft.com; Jan. 29, 2002, Feb. 8, 1999.
Kearns, D., "Patch tracking"; Jun. 27, 2001.
Manzuik, Steve, "Ultimate Security Toolkit", in NTSecurity, May 16, 2000, web.archive.org/web/2001160751/www.ntsecurity.net/Articles/Index.cfm?ArticleId=92902&SearchString=cyber.
Moshir, "Non-invasive Automatic Offsite Updating System and Method" U.S. Appl. No. 60/234,680, filed Sep. 22, 2000.
NetworkDeltaWebs$^{SM}$ page; copyright date 2000. (Cited in U.S. Appl. No. 10/335,490).
PatchLink Menu: Gravitix Overview; copyright date 2001. (Cited in U.S. Appl. No. 10/335,490).
PatchLink Press Release; Jun. 18, 2001. (Cited in U.S. Appl. No. 10/335,490).
PatchLink Press Release; Mar. 27, 2000. (Cited in U.S. Appl. No. 10/335,490).
Proctor; no later than Jan. 8, 2001. (Cited in U.S. Appl. No. 10/335,490).
"Remedy Customer Relationship Solutions$^{SM}$," May 1999, 46 sheets (two pages per sheet).
St. Bernard, St. Bernard Software Simplifies NT Service Pack Management with SPQuery, Apr. 29, 2000 Business Wire.
Sturdevant, C., "ZENWorks Cuts Legwork in NetWare Shops"; Mar. 13, 2000 (Cited in U.S. Appl. No. 10/335,490).
www.microsoft.com/smsmgmt pages, pp. 1-27; Jun. 23, 1999. (Cited in U.S. Appl. No. 10/335,490).
www.mspassociation.org web pages, pp. 1-6; no later than Nov. 28, 2001. (Cited in U.S. Appl. No. 10/335,490).
Product Information from GuardedNet Website, copyright 2003, www.guarded.net.
Product Information from ArcSight Website, www.arcsight.com.
"About CVE: Common Vulnerabilities and Exposures (CVE) is:" http://www.cve.mitre.org/about/Mar. 22, 2004.
CERT® Incident Notes In-Jul. 2000, "Exploitation of Hidden File Extensions," CERT Software Engineering Institute, Carnegie Mellon University, Jul. 27, 2000.
Allen, Julia, "State of the Practice of Intrusion Detection Technologies," Networked Systems Survivability Program, Jan. 2000.
Dan Kuykendall, a/k/a Seek3r, "Legal Docs: The response to their complaint", <www.kuykendall.org>, printed Oct. 25, 2002, pp. 2-4.
Declaration of Dan Kuykendall in Opposition to OSC Re: *Preliminary Injunction, Foundstone, Inc*, v. *NT OBJECTives, Inc.*, Case No. 02CC15350 (Sup. Ct. Cal.), dated Oct. 23, 2002, pp. 3-4.
Declaration of Eric Caso in Opposition to OSC Re: *Preliminary Injunction, Foundstone, Inc*, v. *NT OBJECTives, Inc.*, Case No. 02CC15350 (Sup. Ct. Cal.), dated Oct. 23, 2002, pp. 2-5 & Exhibits B, C and D.
Declaration of Jassen D. Glaser in Opposition to OSC Re: *Preliminary Injunction, Foundstone, Inc.* v. *NT OBJECTives, Inc.*, Case No. 02CC15350 (Sup. Ct. Cal.), dated Oct. 23, 2002, pp. 6-10 & Exhibits F, G.
Declaration of Micahel J. Morton in Opposition to OSC Re: *Preliminary Injunction, Foundstone, Inc.* v. *NT OBJECTives, Inc.*, Case No. 02CC15350 (Sup. Ct. Cal.), dated Oct. 23, 2002, pp. 2-5.
Declaration of Stuart McClure in Support of Plaintiff's Application for Temporary Restraining Order and Preliminary Injunction, *Foundstone, Inc.* v. *NT OBJECTives, Inc.*, Case No. 02CC15350 (Sup. Ct. Cal.), dated Oct. 4, 2002, pp. 2-5.
Memorandum of Points and Authorities in Support of Defendants' Opposition to Plaintiff's OSC Re: *Preliminary Injunction, Foundstone, Inc.* v. *NT OBJECTives, Inc.*, Case No. 02CC15350 (Sup. Ct. Cal.), dated Oct. 23, 2002, pp. 9-10.
Plaintiff Foundstone's Supplemental Reply in Support of Order to Show Cause Re: Preliminary Injunction, *Foundstone, Inc.* v. *NT OBJECTives, Inc.*, Case No. 02CC15350 (Sup. Ct. Cal.), dated Oct. 28, 2002, pp. 2-3.
Plaintiff's Memorandum of Points and Authorities in Support of Application for Temporary Restraining Order, Preliminary Injunction, *Foundstone, Inc.* v. *NT OBJECTives, Inc.*, Case No. 02CC15350 (Sup. Ct. Cal.), dated Oct. 4, 2002, pp. 9-13.
Plaintiff's Reply in Support of Motion for Preliminary Injunction, *Foundstone, Inc.* v. *NT OBJECTives, Inc.*, Case No. 02CC15350 (Sup. Ct. Cal.), dated Oct. 25, 2002, pp. 5-8.
International Preliminary Report on Patentability in PCT Application No. PCT/US05/009689 issued on Feb. 13, 2007.
Written Inquiry from Japanese Patent Application No. 2003/0560745 mailed on Jul. 14, 2010.
Office Action issued in Japanese Patent Application No. 2003/0560745 mailed Jan. 9, 2008.
Decision of Rejection in Japanese Patent Application U.S. Appl. No. 2003-0560745 mailed on Jul. 23, 2008.
Office Action from Canadian Patent Application No. 2,473,444 mailed on Nov. 15, 2007.
Office Action in Chinese Patent Application No. 028285425 mailed on Dec. 8, 2006.
Office Action Summary from Australian application No. 2002245262 which was mailed on Sep. 15, 2006.
The International Preliminary Examination Report from PCT/US02/01093 mailed Oct. 27, 2003.
The International Search Report from PCT/US02/01093 mailed Aug. 5, 2002.
Non-Final Office Action in U.S. Appl. No. 10/813,917 mailed on Jul. 7, 2011.
Fonseca, B., "Web performance tools get upgrade"; Aug. 29, 2000.

* cited by examiner

FIG.8

ROUTER SECURITY POLICY 1.0 PURPOSE
THIS DOCUMENT DESCRIBES A REQUIRED MINIMAL SECURITY CONFIGURATION FOR ALL ROUTERS AND SWITCHES CONNECTING TO A PRODUCTION NETWORK OR USED IN A PRODUCTION CAPACITY AT OR ON BEHALF OF <COMPANY NAME>

2.0 SCOPE
ALL ROUTERS AND SWITCHES CONNECTED TO <COMPANY NAME> PRODUCTION NETWORKS ARE AFFECTED. ROUTERS AND SWITCHES WITHIN INTERNAL, SECURED LABS ARE NOT AFFECTED. ROUTERS AND SWITCHES WITHIN DMZ AREAS FALL UNDER THE INTERNET DMZ EQUIPMENT POLICY.

3.0 POLICY
EVERY ROUTER MUST MEET THE FOLLOWING CONFIGURATION STANDARDS:

1. NO LOCAL USER ACCOUNTS ARE CONFIGURED ON THE ROUTER. ROUTERS MUST USE TACACS+ FOR ALL USER AUTHENTICATION

2. THE ENABLE PASSWORD ON THE ROUTER MUST BE KEPT IN A SECURE ENCRYPTED FORM. THE ROUTER MUST HAVE THE ENABLE PASSWORD SET TO THE CURRENT PRODUCTION ROUTER PASSWORD FROM THE ROUTER'S SUPPORT ORGANIZATION.

3. DISALLOW THE FOLLOWING:
   a. >IP DIRECTED BROADCASTS
   b. INCOMING PACKETS AT THE ROUTER SOURCED WITH INVALID ADDRESSES SUCH AS RFC1918 ADDRESS
   c. TCP SMALL SERVICES

Associated Rules
- SANS_TOP_20_U4_SNMP V1
- SANS_TOP_20_U3_SSH V1
- SANS_TOP_20_U1_RPC V1
- No_Publicity_Accessible_Databases V1
- E-Commerce_Servers_on_DMZ V1
- Router_Web_Services_SANS V1
- Short_Asymmetric_Key V1
- Small_Services_SANS V1
- Webserver_Constraints V1

Add  Delete  Assoc.

Other Policies containing selected rule

Policy Description
Preventsys' recommended Best Practices policy

FIG. 11

```
-<scanresult scan_id="7859193697859193">
 +<host host_id="180"network_id="24"host_unique_id="10.4.1.125"ipaddr="10.4.1.125"hostname="shoe.preventsys.com"
   date_added="2003-10-30 17:34:41.562729-08">
 -<host host_id="181"network_id="24"host_unique_id="10.4.1.8"ipaddr="10.4.1.8"hostname="trix.preventsys.com"date_added=
   "2003-10-30 17:34:41.562729-08">
 -<test name="portscan"scanner="nessus"version="1.0"scanner_data_index=portscan">
  -<result>
   -<service name="ssh"port="22"proto="tcp">
     <![CDATA[SSH-1.99-OpenSSH_3.7.1p2]]>
    </service>
   </result>
  </test>
 -<test name="portscan"scanner="nessus"version="1.0"scanner_data_index=portscan">
   <result>
    <service name="unknown" port="9102"proto="tcp"/>
   </result>
  </test>
 -<test name="portscan"scanner="nessus"version="1.0"scanner_data_index=portscan">
   <result>
    <service name="unknown" port="9103"proto="tcp"/>
   </result>
  </test>
 -<test name="portscan"scanner="nessus"version="1.0"scanner_data_index=portscan">
   <result>
    <service name="unknown" port="9106"proto="tcp"/>
   </result>
  </test>
 -<test name="portscan"scanner="nessus"version="1.0"scanner_data_index=portscan">
   <result>
    <service name="unknown" port="9107"proto="tcp"/>
   </result>
  </test>
 -<test name="[Nessus v1.0]icmp timestamp request"scanner="nessus" version="1.0"scanner_data_index="10114">
   <result>
    <![CDATA[The remote host answers to an ICMP timestamp request. This allows an attacker to know the date which
    is set on your machine. ;;This may help him to defeat all your time based authentication protocols.;;Solution:filter out
   </result>
  </test>
  ...
 </host>
</scanresult>
```

FIG.14

```xml
<xsl:template name="Logon_Banner-Template">
<xsl:if test="false">
<configuration xmlns="urn:Preventsys:rule_xml">
<supported_audit_modules>
<audit_module name="portscan" version="1.0"/>
</supported_audit_modules>
</configuration>
</xsl:if>
<!-- To fire this rule, a host must be running a telnet or ftp service whose banner does not contain the words
specified in the banner variable. -->
<xsl:variable name="banner">
<xsl:text>U.S.Government computer system and unauthorized use can be punished by fines or imprisonment</xsl:text>
</xsl:variable>
<!-- Select hosts running telnet or ftp -->
<xsl:variable name="hosts" select="/scanresult/host[test/@name='portscan' and
(test/result/service/@port='23' or test/result/service/@port='21') and
test/result/service/@proto='tcp' and not (test/@scanner='nmap')]"/>
<xsl:for-each select="$hosts">
    <xsl:if test="not(contains(test[@name='portscan']/result/service[@port='23' and @proto='tcp'], $banner))">
        <xsl:element name="result">
            <description>This host is exposing a telnet banner that does not comply to network policy.</description>
            <solution>Reword the banner to contain the text <xsl:value-of select="$banner"/>.</solution>
        </xsl:element>
    </xsl:if>
    <xsl:if test="not(contains(test[@name='portscan']/result/service[@port='21' and @proto='tcp'], $banner))">
        <xsl:element name="result">
            <description>This host is exposing a ftp banner that does not comply to network policy.</description>
            <solution>Reword the banner to contain the text <xsl:value-of select="$banner"/>.</solution>
        </xsl:element>
    </xsl:if>
</xsl:for-each>
</xsl:template>
```

| | | | | | |
|---|---|---|---|---|---|
| ▷AUDITS | ▷REPORTS | ▷POLICY LAB | ▷REMEDIATION | ▷ADMINISTRATION | ▷ HELP | LOGOUT |

PREVENTSYS

○○○⊗ REMEDIATION TASK ASSIGNMENT — 530

ANALYSIS: [DevAuditConf]  
AUDIT CONFIGURATION NAME: DevAuditConf  POLICY-VERSION: Preventsys v3  POLICY: PREVENTSYS  
NETWORK GROUP: DevNetGroup  ANALYSIS DATE/TIME: 11/11/2003 5:39 PM  
Date: 10/17/2002-11/11/2003    NETWORK GROUP: DevNetGroup    Modify Filter

— 532     — 536     — 534     — 538     — 540     — 544

| >VULNERABILITIES/VIOLATIONS | >HOST | >IP ADDRESS | >DATE FOUND | >SEVERITY | >ASSIGN TO |
|---|---|---|---|---|---|
| No_Pubicly_Accessible_Databases | host-qa-51.company.com | 10.4.1.51 | 11/11/2003 | 100 | Preventsys ▼ |
| No_Pubicly_Accessible_Databases | host-qa-52.company.com | 10.4.1.52 | 11/11/2003 | 100 | Patric Ravenel ▼ |
| No_Pubicly_Accessible_Databases | host-qa-53.company.com | 10.4.1.53 | 11/11/2003 | 100 | Assign To ▼ |
| No_DB_On_DMZ | host-qa-75.company.com | 10.4.1.75 | 11/11/2003 | 100 | Assign To ▼ |
| No_DB_On_DMZ | lambtor.company.com | 10.4.1.70 | 11/11/2003 | 100 | Assign To ▼ |
| No_DB_On_DMZ | luckycharms.company.com | 10.4.1.7 | 11/11/2003 | 100 | Assign To ▼ |
| No_DB_On_DMZ | penqin.company.com | 10.4.1.77 | 11/11/2003 | 99 | Assign To ▼ |
| [Nessus v1.0] Microsoft's SQL Overflows | shoe.company.com | 10.4.1.125 | 11/11/2003 | 100 | Assign To ▼ |
| No_DB_On_DMZ | shoe.company.com | 10.4.1.125 | 11/11/2003 | 100 | Assign To ▼ |
| No_Pubicly_Accessible_Databases | shoe.company.com | 10.4.1.125 | 11/11/2003 | 100 | Assign To ▼ |
| NSA_SQLServer_DefaultPorts | shoe.company.com | 10.4.1.125 | 11/11/2003 | 100 | Assign To ▼ |
| NSA_SQLServer_Services | shoe.company.com | 10.4.1.125 | 11/11/2003 | 100 | Assign To ▼ |
| NSA_SQLServer_Services | shoe.company.com | 10.4.1.125 | 11/11/2003 | 100 | Assign To ▼ |
| No_DB_On_DMZ | wheaties.company.com | 10.4.1.6 | 11/11/2003 | 100 | Assign To ▼ |

<<PREV 1 NEXT>>

546 — [ASSIGN TASKS]   [CANCEL]

FIG.23

ADD USER - MICROSOFT INTERNET EXPLORER
FILE EDIT VIEW FAVORITES TOOLS HELP
ADDRESS https://dualski1:8669/cssc/remediation/adduser.do

PREVENTSYS preventsys | 10.1.0.134 | 1/2/04 | 8:20 PM

AUDITS  REPORTS  POLICY LAB  REMEDIATION  ADMINISTRATION  HELP  LOGOUT

ADMINISTRATION>>USER>>ADD

ADD USER — 600

USERNAME:
20 CHARACTERS MAX

PASSWORD:
30 CHARACTERS MAX

VERIFY PASSWORD:

FULL NAME:

EMAIL ADDRESS:

DEFAULT ROLE: SUPER USER / ADMINISTRATOR / REMEDIATOR / AUDITOR

NETWORK GROUP ASSOCIATION: comboGroup / newNet1 / newNet2 / newNet3

SUBMIT   CANCEL

![Screenshot of Add Host Property dialog in Microsoft Internet Explorer]

```
ADD HOST PROPERTY-MICROSOFT INTERNET EXPLORER
FILE  EDIT  VIEW  FAVORITES  TOOLS  HELP
BACK ▼ · × ⟲ ⌂ SEARCH ☆FAVORITES ⊙MEDIA ✉▼ 🖨
ADDRESS https://dudski 1:8669/cssc/hostgroup/hostGroupConfig.do                Go  Links»
```

PREVENTSYS
preventsys | 10.1.0.134 | 1/2/04 | 9:12 PM

AUDITS    REPORTS    POLICY LAB    REMEDIATION    ADMINISTRATION    HELP    LOGOUT

ADMINISTRATION>>HOST PROPERTY>>ADD

ADD HOST PROPERTY

HOST PROPERTY NAME: [SAMPLE]

SPECIFY WHICH SERVICES ARE MAPPED TO THIS PROPERTY:

BY DEFAULT, ALL OTHER SERVICES SHOULD BE: [ALLOWED▼] IF THEY ARE NOT EXPLICITLY ALLOWED OR PROHIBITED BELOW.

| SERVICE DESCRIPTION | PROTOCOL | SERVICE PORT | TYPE OF MAPPING |
|---|---|---|---|
| BEAR SHARE | TCP | 6346 | SELECT MAPPING... ▼ |
| BLUBSTER | UDP | 41170 | SELECT MAPPING... ▼ |
| BOOTP | TCP | 67 | SELECT MAPPING... ▼ |
| BOOTP | UDP | 67 | SELECT MAPPING... ▼ |
| CHARGEN | TCP | 19 | SELECT MAPPING... ▼ |
| CHARGEN/UDP | UDP | 19 | SELECT MAPPING... ▼ |
| DAYTIME | TCP | 13 | SELECT MAPPING... ▼ |
| DAYTIME/UDP | UDP | 13 | SELECT MAPPING... ▼ |
| DESLOGIN | TCP | 2005 | SELECT MAPPING... ▼ |
| DHCP CLIENT | TCP | 68 | SELECT MAPPING... ▼ |
| DHCP CLIENT | UDP | 68 | SELECT MAPPING... ▼ |
| DISCARD | TCP | 9 | SELECT MAPPING... ▼ |
| DISCARD/UDP | UDP | 9 | SELECT MAPPING... ▼ |
| DOMAIN | TCP | 53 | SELECT MAPPING... ▼ |
| ECHO | TCP | 7 | SELECT MAPPING... ▼ |
| ECHO/UDP | UDP | 7 | SELECT MAPPING... ▼ |
| EMULE | TCP | 4662 | SELECT MAPPING... ▼ |
| EXEC | TCP | 512 | SELECT MAPPING... ▼ |
| FINGER | TCP | 79 | SELECT MAPPING... ▼ |
| FTP | TCP | 21 | SELECT MAPPING... ▼ |

<<PREV 1 2 3 4 NEXT>>

[SUBMIT]  [CANCEL]

DONE                                                    LOCAL INTRANET

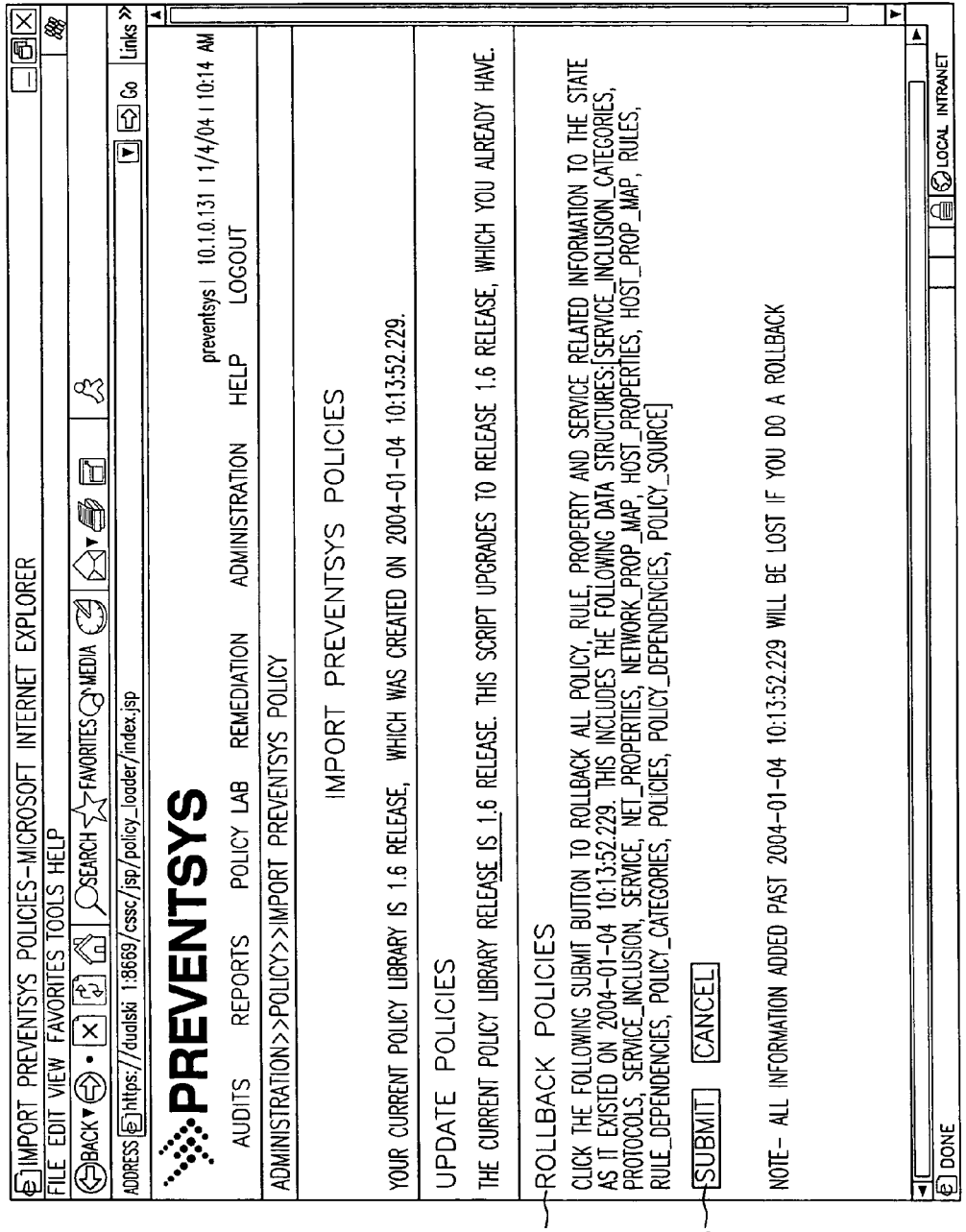

SYSTEM AND METHOD FOR INTERFACING WITH HETEROGENEOUS NETWORK DATA GATHERING TOOLS

CROSS-REFERENCE TO RELATED APPLICATIONS

This application claims the benefit of U.S. Provisional Application No. 60/448,313, filed on Feb. 14, 2003, the content of which is incorporated herein by reference. This application also contains subject matter that is related to the subject matter disclosed in U.S. Patent Application entitled "Network Audit and Policy Assurance System" (U.S. patent application Ser. No. 10/779,190), U.S. Patent Application entitled "System and Method for Applying a Machine-Processable Policy Rule to Information Gathered About a Network" (U.S. patent application Ser. No. 10/778,836), U.S. Patent Application entitled "System and Method for Automated Policy Audit and Remediation Management" (U.S. patent application Ser. No. 10/778,770), and U.S. Patent Application entitled "System and Method for Security Information Normalization" (U.S. patent application Ser. No. 10/778,837), all filed on Feb. 13, 2004, the content of all of which are incorporated herein by reference.

FIELD OF THE INVENTION

This invention is generally related to network security audit systems, and more particularly, to a system and method for uniformly interfacing with heterogeneous network data gathering tools.

BACKGROUND OF THE INVENTION

A network security audit system may employ different types of network data gathering tools to gather information about the network. For example, one type of scanner may be capable of operating system fingerprinting, port mapping, and/or vulnerability assessment, while another scanner may be configured with other capabilities. Other types of information sources such as, for example, cameras, human input, and the like, may also be used to add to the information provided by the scanners.

A drawback to utilizing different types of network data gathering tools in a network security audit system is that each tool generally requires a different interface format. The input and output configurations may therefore differ from tool to tool. Designing a separate interface for each particular type of tool used for a network audit is inefficient and laborious. Such an approach also generally limits the network audit system in expanding its current set of tools. Accordingly, there exists a need for a system and method that uniformly interfaces with the different types of network data gathering tools without having to cater the interface to the particular type of tool that is being used.

SUMMARY OF THE INVENTION

According to one embodiment, the present invention is directed to a method for gathering information in a network auditing system utilizing a plurality of heterogeneous information sources. The method includes communicating with the plurality of heterogeneous information sources via a uniform communications interface; receiving network information gathered by the heterogeneous information sources via the uniform communications interface; converting the received network information into a normalized data format; storing the converted network information in a data store; comparing at least a portion of the converted network information with a network policy; and determining, based on the comparison, compliance with the network policy.

According to one embodiment of the invention, the normalized data format is a machine-processable language format.

According to another embodiment of the invention, the method further includes tracking an identity of a network device; and correlating the gathered network information based on the tracked identity of the network device.

According to another embodiment of the invention, the method further includes scheduling a network audit for gathering the network information; and dynamically configuring a packet filter for opening communication with a network device in response to a start of the scheduled network audit, and closing communication with the network device in response to an end of the scheduled network audit.

According to another embodiment of the invention, the network information includes an identification of a wireless access point used for accessing a wireless network, and the method further includes connecting to the wireless access point; and determining a location of the wireless access point on the network.

According to another embodiment of the invention, the present invention is directed to a system for gathering information in a network audit system. The system includes a plurality of heterogeneous information sources gathering information about the network. The system also includes a first server that includes a uniform communications interface facilitating communication with the plurality of heterogeneous information sources; and an engine for converting information gathered by the heterogeneous information sources into a normalized data format. The system further includes a data store storing the converted information.

According to another embodiment of the invention, the system further includes an engine for tracking an identity of a network device and correlating the gathered network information based on the tracked identity of the network device.

According to another embodiment of the invention, the system further includes a user interface for scheduling a network audit for gathering the network information, and for dynamically configuring a packet filter for opening communication with a network device in response to a start of the scheduled network audit, and closing communication with the network device in response to an end of the scheduled network audit.

According to another embodiment of the invention, the network information includes an identification of a wireless access point used for accessing a wireless network, and the system further includes an engine for connecting to the wireless access point, and determining a location of the wireless access point on the network.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 8 is an exemplary screen shot of a policy editor window according to one embodiment of the invention;

FIG. 11 is an exemplary scan results document representing facts gathered about a scanned network that has been normalized into an XML (Extensible Markup Language) format according to one embodiment of the invention;

FIG. 14 is an illustration of an exemplary XSL-based rule template according to one embodiment of the invention;

FIG. 18 is a screen shot of a GUI displaying an exemplary policy compliance report calculated and rendered based on an XML-based compliance document according to one embodiment of the invention;

FIG. 20 is a screen shot of a GUI displaying an exemplary remediation task assignment screen according to one embodiment of the invention;

FIG. 23 is a screen shot of an exemplary GUI for adding a new user to the system of FIG. 1 according to one embodiment of the invention;

FIG. 26 is a screen shot of an exemplary GUI for generating host groups according to one embodiment of the invention;

FIG. 27 is a screen shot of an exemplary GUI for adding a host property to a list of available host properties according to one embodiment of the invention;

FIGS. 37A-37B are exemplary screen shots of a GUI for importing, updating, and/or rolling back policies according to one embodiment of the invention.

DETAILED DESCRIPTION

I. Introduction

Figure 1:
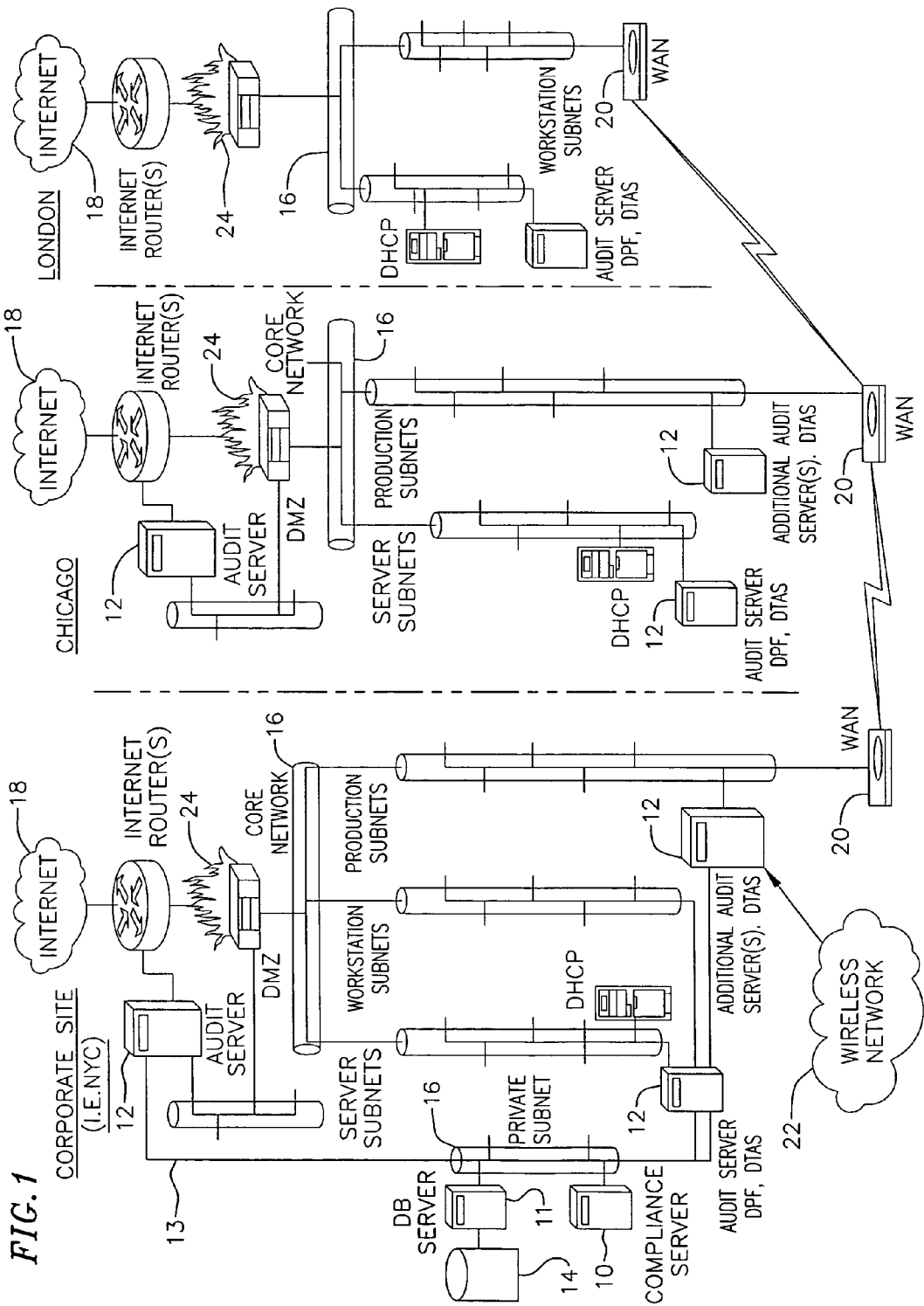
FIG. 1 is a schematic block diagram of a global network including a prevention-based network security audit system according to one embodiment of the invention.

FIG. 1 is a schematic block diagram of a global network according to one embodiment of the invention. The global network may include a plurality of internal networks 16 coupled to each other over a public internet 18 or a private wide area network 20. The global network also includes a prevention-based network security audit system that provides an automated assessment of security and regulatory policies, network vulnerability analysis, and makes recommendations for improving the security of the global network.

According to one embodiment of the invention, the prevention-based network security audit system ("the system") includes a central compliance server 10 coupled to a database server 11 hosting an audit repository 14. The compliance server 10 is further coupled to one or more audit servers 12 over data communication lines 13. According to one embodiment of the invention, the data communication lines transmit data in accordance with a transport layer security (TLS) protocol making use of encryption mechanisms, such as, for example, public key cryptography, to help ensure privacy between communicating applications.

The audit repository 14 stores network topology information, vulnerability and violation information, security and regulatory policies, network scan results, and the like. The network scan results may include, for example, network information gathered by information gathering tools as well as manual audit task information describing aspects of physical security that may be important to a network policy. The audit repository 14 may be implemented as part of the database server 11 as is illustrated in FIG. 1, and/or the compliance server 10.

The audit servers 12 are preferably strategically deployed around the global network to gather facts about wired 16 or wireless 22 local networks within the global network. According to one embodiment of the invention, the audit servers 12 are configured to gather facts relating to the wired and/or wireless 22 local networks using heterogeneous information sources. Such information sources may include scanners, cameras, manually entered data, and/or the like. The data gathered by each information source is converted into a normalized data format, such as, for example, and XML (Extensible Markup Language), and stored in the audit repository 14 for access by the compliance server 10.

According to one embodiment of the invention, the audit servers 12 are configured to provide DTAS (Dynamic Target Acquisition Service) and/or DPF (Dynamic Packet Filter) services for the global network. DTAS allows unique network devices to be enumerated and their characteristics correlated over time even in DHCP (Dynamic Host Configuration Protocol) environments where their IP addresses may change. DPF provides a firewall between the enterprise LAN/WAN and the private subnet containing the compliance server 10 and audit repository 14. DTAS and DPF may be provided via one or more dedicated servers, or as part of one or more audit servers 12.

The compliance server 10 is coupled to the audit servers 12 and the audit repository 14 for tracking, from a central location, the overall health of the global network in terms of security and/or regulation compliance. The compliance server 10 analyzes data gathered by the audit servers 12, and assesses policy violations and vulnerability risks, and makes recommendations for improving the security and policies of the network. The compliance server 10 further aids in the creation, configuration, editing, testing, and deployment of security and regulation policies for use during the network audits. The compliance server 10 also provides consolidated visibility into the security of the network and the various assessments that have been made about policy compliance, via various types of reports that may be generated manually or automatically based on predetermined conditions.

According to one embodiment of the invention, the global network further includes traditional security components 24 such as firewalls, intrusion detection systems, and the like, for providing additional security to the network. A person of skill in the art should recognize that other detection-based solutions such as anti-virus, intrusion detection, and the like may be utilized to complement the prevention-based network security audit system.

II. Compliance Server

Figure 2:
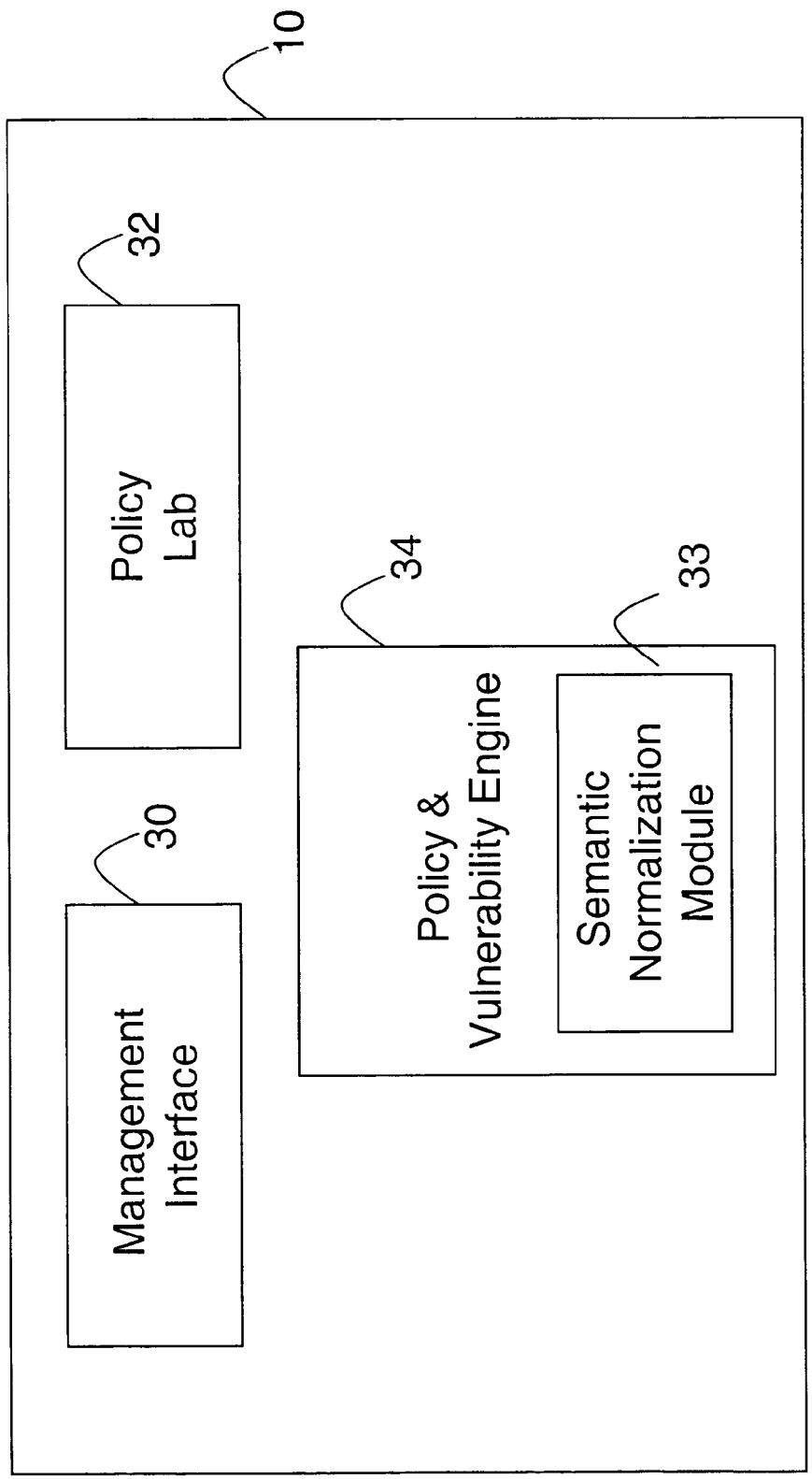
FIG. 2 is a block diagram of a compliance server according to one embodiment of the invention.

FIG. 2 is a more detailed block diagram of the compliance server 10 according to one embodiment of the invention. According to the illustrated embodiment, the compliance server includes a management interface 30, policy lab 32, and policy and vulnerability (P&V) engine 34. The management interface 30 provides a user interface and related software and hardware for generating various types of reports with different degrees of detail about the facts learned about the global network. The management interface 30 also allows the central management of users, hosts, networks, and the like, as well as the configuration and scheduling of audits and remediation tasks.

The policy lab 32 provides a user interface, via client-side application, through related software, for allowing a user to rapidly write security and regulation policies in any natural language, such as English, and link such written policies to machine-processable rules. Although English is used as an example of a natural language, a person of skill in the art should recognize that any other natural language besides English may also be used to generate policy source documents. The policy lab 32 also allows a user to evaluate the effectiveness of new or modified security policies prior to deployment, by modeling the effects of the policies on the network.

The P&V engine 34 analyzes data gathered by the audit servers 12 and determines whether the audited networks comply with established security and regulation policies. In this regard, the P&V engine 34 includes a semantic normalization module 33 for normalizing data provided by the various scanners as well as other data source products. The P&V engine 34 further determines whether vulnerability risks exist within the network based on pre-established vulnerability analysis rules. The P&V engine 34 may be incorporated into one or more processors residing within the compliance server 10.

III. Policy Lab

Figure 3:
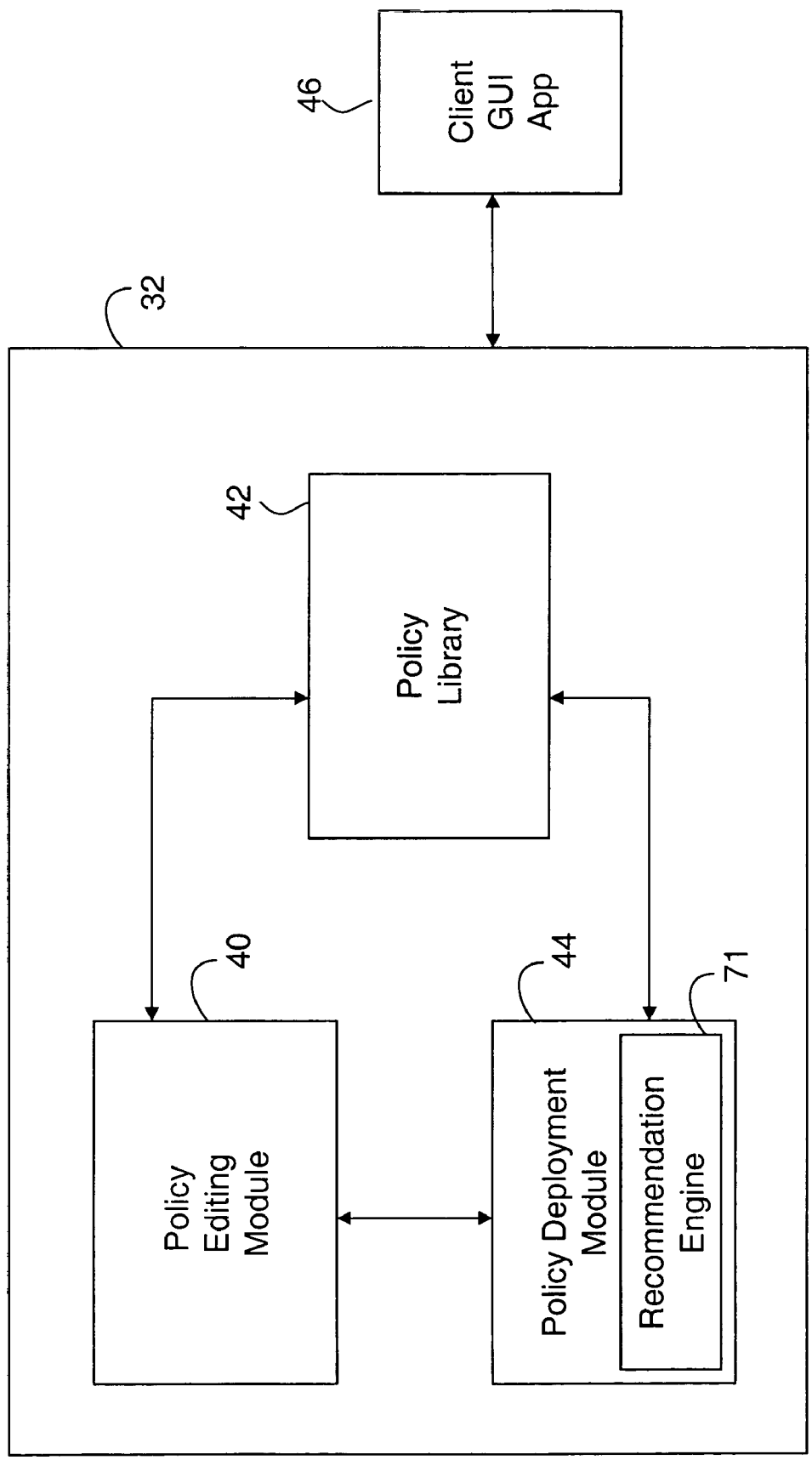
FIG. 3 is a block diagram of a policy lab according to one embodiment of the invention.

FIG. 3 is a more detailed functional block diagram of the policy lab 32 according to one embodiment of the invention. According to the illustrated embodiment, the policy lab includes a policy-editing module 40, policy library 42, and a policy deployment module 44.

The policy library 42 is a repository of pre-established policies that are written in both English and in a machine-processable language. A policy is made up of one or more rules stored in the policy library 42. According to one embodiment of the invention, the policy library physically resides in the repository 14.

The policies stored in the policy library 42 are designed to help meet the exacting standards of industry organizations such as the government, healthcare organizations, financial service organizations, technology sectors, international organizations, and/or public interest organizations. Exemplary policies defined by the government include NIST (National Institute of Standards and Technology), NSA (National Security Agency), OMB (Office of Management and Budget), GLBA (Graham, Leach, Bliley Act), GISRA (Government Information Security Reform Act), Sarbanes-Oxley, FERC (Federal Energy Regulatory Commission), DITSCAP (DoD Information Technology Security Certification and Accreditation), and HIPAA (Health Insurance Portability and Accountability Act).

Exemplary policies defined by the technology sectors include SANS (System Administration and Network Security), NERC (North American Electric Reliability Council), and IETF (Internet Engineering Task Force).

Exemplary policies defined by international organizations include ISO (International Standards Organization) 17799, and EUDPD (EU Personal Data Protection Directive).

An exemplary policy defined by public interest organizations includes COPPA (Children's Online Privacy Protection Act). According to one embodiment of the invention, the policy library 42 stores one or more of these policies in both their natural language and in machine-processable forms.

Other policies stored in the policy library 42 are designed to audit and manage compliance of agreements with third parties, referred to as service level agreements (SLA), for security, availability, and performance of products and/or services provided by the third parties. The policy library 42 may further include policies for detecting other network vulnerabilities as well as specialized policies developed for the particular network.

The policy-editing module 40 and the policy deployment module 44 are, according to one embodiment of the invention, software modules run on one or more processors resident in the compliance server 10, or within a client-side GUI application 46 that from time to time connects and synchronizes with the compliance server. The policy-editing module 40 allows a user to create and edit policies for storing in the policy library 42. The policy deployment module 44 allows a user to evaluate the effectiveness of new or modified policies prior to their deployment. The policy deployment module 44 further includes a recommendation engine 71 for recommending security policies and rules for increasing network security.

Figure 4:
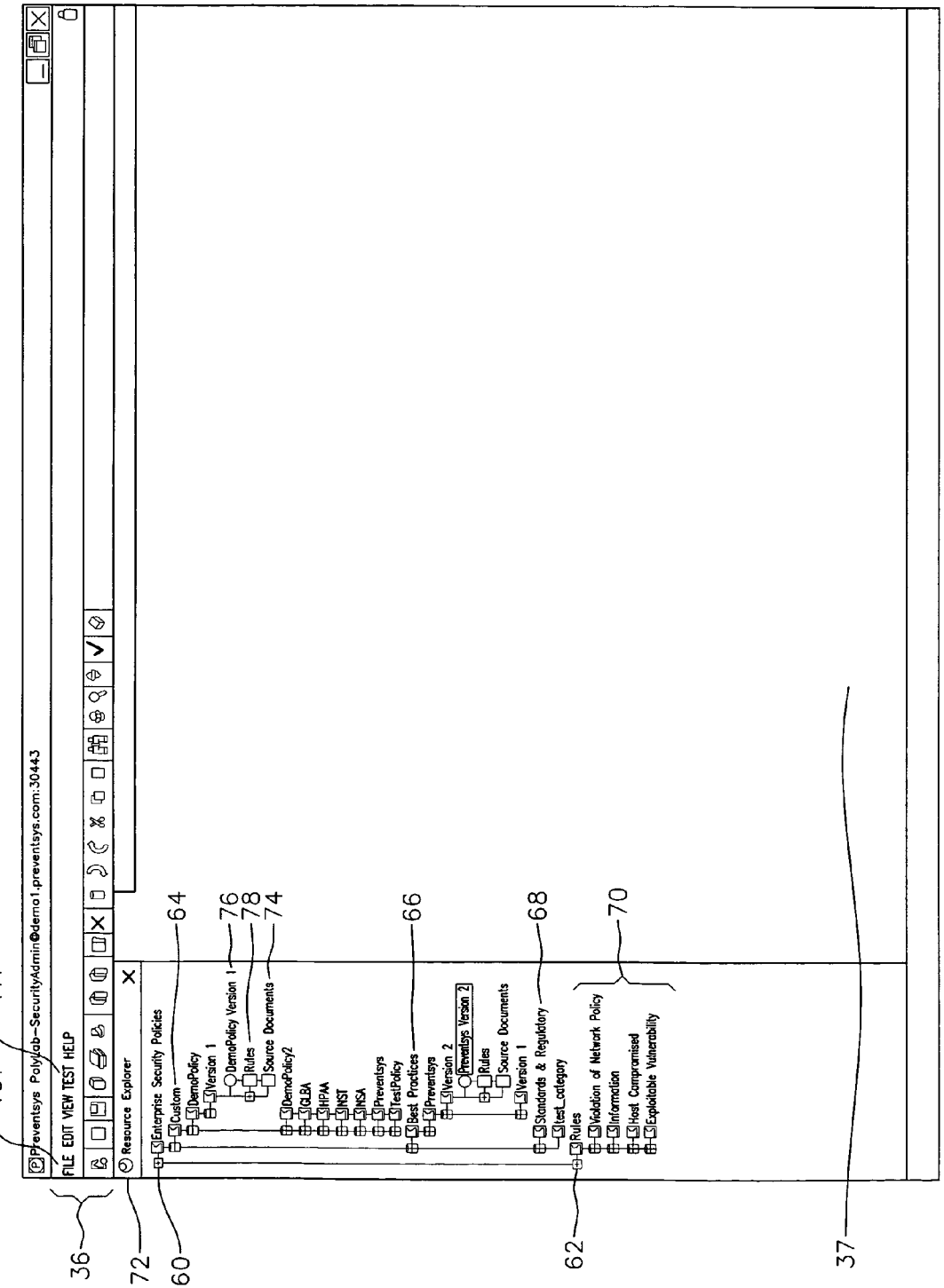
FIG. 4 is an exemplary screen shot of a graphics users interface (GUI) for invoking a policy editing and policy deployment module according to one embodiment of the invention.

FIG. 4 is an exemplary screen shot of a graphics users interface (GUI) for invoking the policy editing and policy deployment modules 40, 44 according to one embodiment of the invention. The GUI provides an explorer window 72 for navigating the various files stored in the policy library 42. The GUI further provides a toolbar 36 with a plurality of selectable menus and submenus for accessing the various functionalities provided by the policy editing and deployment modules. A work area 37 may be used to generate displays associated with the accessed functionalities.

According to one embodiment of the invention, the policy library 42 is organized into a policy directory 60 and rules directory 62. The policy directory 60 may organize individual policies 76 into different policy categories. For example, a custom policy category 64 may include policies that have been customized to meet the needs of the particular global network. A best practices category 66 may include policies that comply with industry best practices. A standards and regulatory policy category 68 may include policies that comply with published standards and regulations. According to one embodiment of the invention, each policy 76 is associated with one or more rules 78 and natural language policy source documents 74.

The rules directory 62 may organize individual rules 78 into different categories (types) 70. For example, the rules directory 62 may include rules that seek to find violations of network policies, rules that seek to gather information about the network, rules that seek to identify compromised hosts, and/or rules that seek to identify vulnerabilities in the network.

Figure 5:
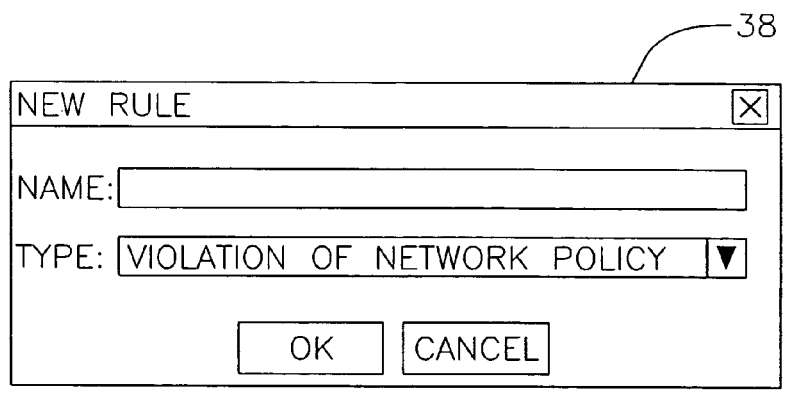
FIG. 5 is an exemplary screen shot of a pop-up window for creating a policy rule according to one embodiment of the invention.

According to one embodiment of the invention, a new rule may be created by selecting a new rules option (not shown) from a file menu 101 of the toolbar 36. As is illustrated in FIG. 5, selection of this option causes the policy editing module 40 to display a pop-up window 38 requesting the user to provide a name of the new rule as well as a rule type. Selection of an OK button causes the policy editing module 40 to display a rule editor window in the work area 37.

Figure 6:
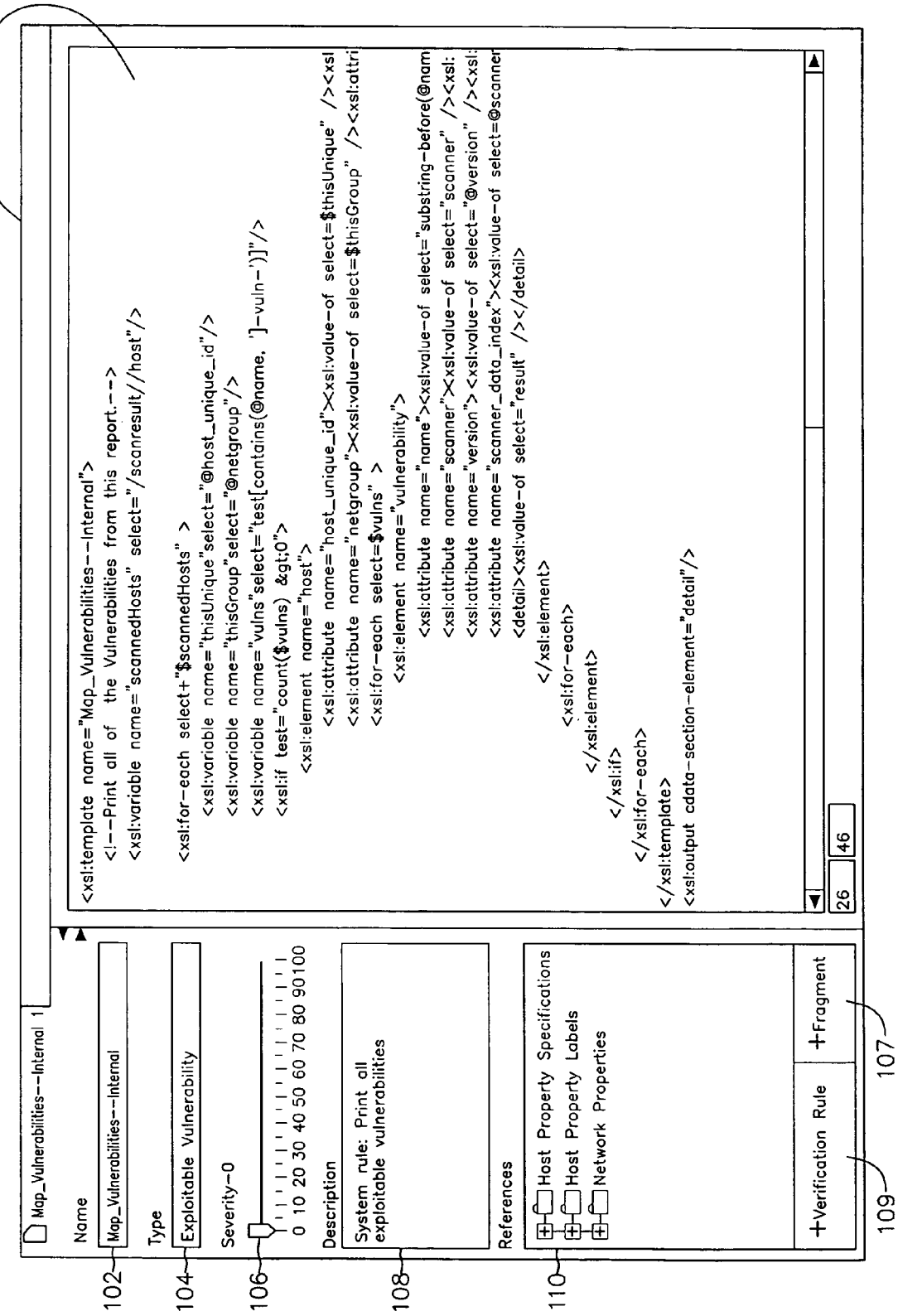
FIG. 6 is an exemplary screen shot of a rule editor window according to one embodiment of the invention.

FIG. 6 is an exemplary screen shot of a rule editor window 39 according to one embodiment of the invention. The rule editor window 39 includes a rule text window 100 allowing a user to view or generate the machine code text for a particular rule. According to one embodiment of the invention, an extensible stylesheet language (XSL) is used for machine coding a rule. A person of skill in the art should recognize, however, that other programming languages may be used instead of XSL, such as, for example, SQL, Java, JavaScript, or any procedural, object-oriented, or structured programming language conventional in the art.

The name and rule type provided by the user in the pop-up window 38 is displayed in windows 102 and 104, respectively. A severity meter 106 allows the user to quantify a severity for violating the rule. The severity meter thus allows rules to be weighted relative to other rules when calculating various measures of risk. According to one embodiment of the invention, a severity level may range from 1 to 100, with 100 being the most severe.

Window 108 allows a user to provide a brief description of the rule.

Window 110 provides a list of references to defined sub-elements already associated with particular XSL codes. Rules are generally written for specific device types (e.g. routers, firewalls, etc)., specific application configurations (e-commerce servers, credit card processing systems etc.), or specific subnets (e.g. DMZ network, finance network, etc.) that have certain properties. Selection of a particular reference allows a user to select the properties associated with the particular rule, and add the associated XSL code into the text window 100 by selecting a verification or fragment button 109, 107, without having to recreate the XSL code each time. According to one embodiment of the invention, the XSL code associated with the references is independent of a scanner or other product used for gathering data about the network.

After a rule has been generated, the user may save the rule in the category of the rules directory 62 matching the rule type 104.

Figure 7:
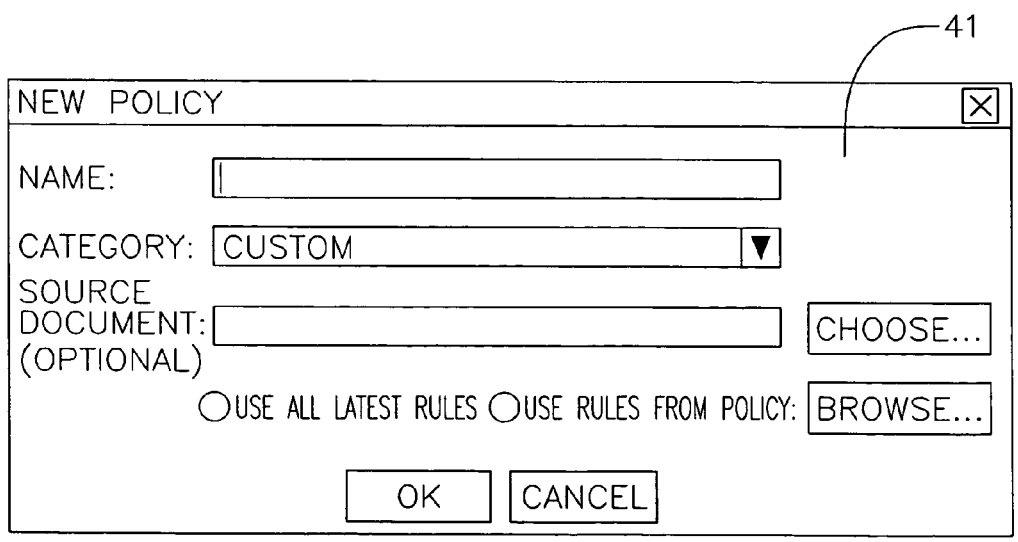
FIG. 7 is an exemplary screen shot of a pop-up window for creating a policy according to one embodiment of the invention.

According to one embodiment of the invention, a new policy may be created by selecting a new policy option (not shown) from the file menu 101 of the toolbar 36. As is illustrated in FIG. 7, selection of the new policy option causes the display of a pop-up window 41 requesting the user to provide a name of the new policy as well as the policy category. The user may also optionally provide, at this time, a path to a natural language source document file to be associated with the policy. The user may further select to associate to the policy, a latest version of all available current rules, or rules that are associated with an existing policy.

Selection of an OK button causes display of a policy editor window in the work area 37.

FIG. 8 is an exemplary screen shot of a policy editor window 43 according to one embodiment of the invention. The policy editor window 43 includes a source document window 50 displaying the text of a source document associated with the policy retrieved from the policy's source document directory. For example, if a source document was selected from the pop-up window 41, the text of the selected document is displayed in the source document window 50.

Otherwise, if no source document was initially selected via the pop-up window 41, the source document window 50 displays a link (not shown) allowing the user to browse a list of available policy source documents in a separate file chooser window, and associate a particular policy source document to the policy. In this regard, the policy editing module 40 provides necessary software, such as, for example, a word processing software, for generating and storing the natural language policy source documents.

The policy editing module 40 stores the association between the policy and the selected source document, so that the next time the policy is viewed via the policy editor window 43, the selected source document is automatically retrieved and displayed in the source document window 50.

The policy editor window 43 further includes an associated rules window 52 that displays a list of machine-coded rules associated with the policy. According to one embodiment of the invention, the type of rules selected by the user via the pop-up window 41 are initially displayed in the associated rules window 52.

Rules may be added or deleted from a policy. In order to add a rule to the policy, the user selects a specific version of a machine-processable rule listed in the rules directory 62 of the explorer window 72, and provides an add command. The add command may be provided, for example, by selecting an add icon under the associated rules window 52. According to one embodiment of the invention, the add command creates an association between the natural language policy and the machine-processable rule. The added rule is then displayed in the associated rules window 52. The policy editing module 40 stores the association information so that the next time the policy is invoked, the selected rule is also automatically retrieved. In this manner, policies may be generated in a natural language while allowing them to be machine-auditable via their association to machine-processable rules.

In order to delete a rule from the policy, the user selects a rule from the associated rules window 52, and issues a delete command. The delete command may be provided, for example, by selecting a delete icon under the associated rules window 52. The policy editing module 40 removes the association information between the policy and the rule so that the next time the policy is invoked, the removed rule is no longer retrieved.

According to one embodiment of the invention, the policy editing module 40 allows the association of one or more machine-processable rules to a specific portion of a policy. In this regard, a user indicates a section of the source document for the policy, for example, by highlighting the section in the source document window 50, and selects one or more rules from the associated rules window 52. This activates an icon under the associated rules window 52 which, upon its selection, causes the selected rule(s) to be associated with the selected text. The representation of the selected rule is changed in the associated rules window 52 to depict the association. Furthermore, according to one embodiment of the invention, the highlighted portion of the source document text is converted into a hyperlink for linking to the associated rule(s).

Selection of a particular rule in the associated rules window 52 causes a display of other policies containing the selected rule in an other policies window 54. The policy editor window 43 further includes a description window 56 allowing the user to enter a description of the displayed policy.

Once the rules have been defined and associated with a particular policy, the policy may be tested by the policy deployment module 44 for effectiveness and impact on the network prior to deployment of the policy in a scheduled audit. The effect of applying such policies to the network may also be modeled. According to one embodiment of the invention, the policy deployment module 44 tests a policy on past audit results stored in the audit repository 14. After testing, the policy may be ready for deployment.

According to one embodiment of the invention, a policy may be tested by selecting a test policy option (not shown) from a test menu 111 of the toolbar 36. Selection of this option causes the display of a policy test window in the work area 37.

Figure 9:
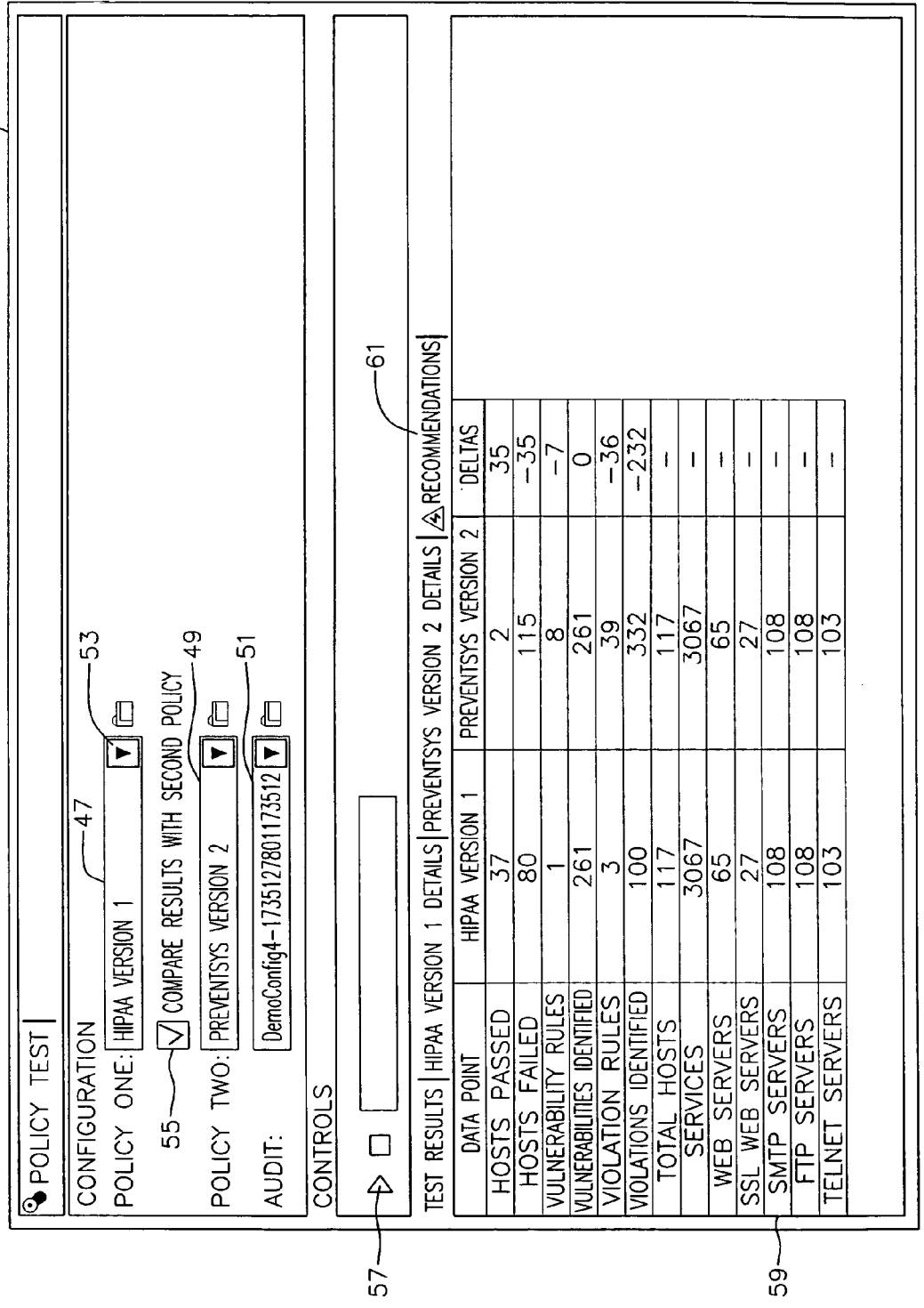
FIG. 9 is an exemplary screen shot of a policy test window according to one embodiment of the invention.

FIG. 9 is an exemplary screen shot of a policy test window 45 according to one embodiment of the invention. According to the illustrated embodiment, a user enters into area 47 the name of a policy to be tested. This may be done, for example, by selecting a chooser icon 53, browsing a list of policies, and selecting the desired policy.

If the user desires to perform a comparative analysis, the user may also enter the name of a second policy into area 49, and indicate in area 55 that a comparative analysis is to be performed.

The user further enters into area 51, the name of a scan results document stored in the audit repository 14, and transmits a command to initiate the test. The test may be initiated, for example, by selecting a start button 57. In response to the start command, the policy deployment module 44 applies the selected policy or policies to the scan results as in a regular scheduled audit. The policy deployment module 44 then correlates the results into various data points, and displays the correlated results in a table format 59, providing the user an organized view of the anticipated effect of applying the policy to the network.

According to one embodiment of the invention, the policy test window 45 includes a recommendations option 61 for invoking the policy deployment module's recommendation engine 71. Selection of the recommendations option 61 causes the recommendation engine 71 to provide a list of rules not included in the policy that was tested, that are recommended to be included into the policy. In this regard, the recommendation engine 71 determines whether the audit result discovered devices or scenarios for which a policy rule should exist. For example, if the audit result identified the existence of a wireless access point (WAP), and no rules were included in the tested policy to address WAPs, the engine may recommend adding the rule to the policy. This may be done, for example, by maintaining a table of assets and/or scenarios for which rules should exist, and an identifier of such rules.

The recommendation engine 71 applies the recommended rules to the scan results, and ranks the rules based on their importance. The importance of a rule may be determined, for instance, based on a number of times that the rule was applied, the severity meter set for the rule, the assets that are affected, and the like. According to one embodiment of the invention, the recommendation engine 71 displays an ordered list of the recommended rules based on their importance.

IV. Audit Server

Figure 10:
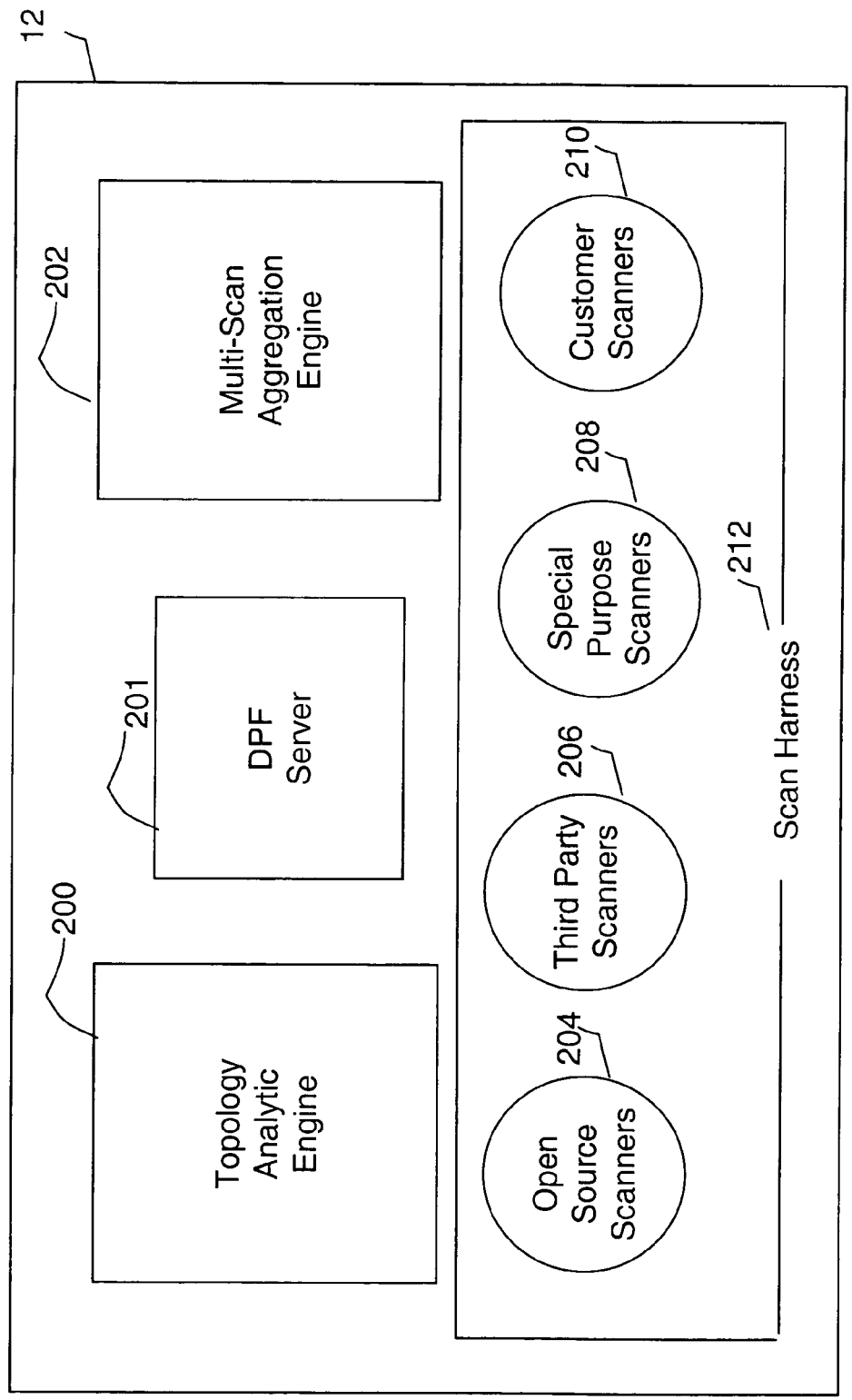
FIG. 10 is a block diagram of an audit server according to one embodiment of the invention.

FIG. 10 is a more detailed functional block diagram of the audit server 12 according to one embodiment of the invention. The audit server 12 includes a topology analytic engine 200, a DPF server 201, and a multi-scan aggregation engine 202. The audit server 12 also includes a scan harness 212 that interoperates with different open source scanners 204, third party scanners 206, special purpose scanners 208, and/or customer scanners 210, to gather data, such as security data, about the network 16, 22 in a manner that is conventional in the art. Exemplary open source scanners 204 include Nessus, which is provided by an open-source entity, Nessus.org. Exemplary third party scanners 206 include scanners such as, for example, Internet Scanner manufactured by Internet Security Systems, Inc. Special purpose scanners 208 may be either third-party or proprietary scanners used for conducting network topology discovery, specialized checks for difficult-to-locate vulnerabilities and policy violations, 802.11 wireless network auditing, and the like. Customer scanners 210 may be used for performing audits that are unique to the customer environment.

According to one embodiment of the invention, the scan harness 212 is a software application program interface (API) communicating between the scanners and the audit server 12. The scan harness 212 provides a common interface that allows the audit server 12 to uniformly communicate with the scanners, even if they are heterogeneous in kind. Thus, numerous heterogeneous network scanning technologies and software packages may be integrated into a single, integrated audit server.

According to one embodiment of the invention, the scan harness 212 implementation is done on a per scanner basis. The implementation includes meta-information about the capabilities that each scanner can provide, and how it maps to other related scanners that can perform the same type of test. For example, one scanner may be capable of operating system fingerprinting, port mapping, and/or vulnerability assessment, while another scanner may be configured with other capabilities. The meta-information may then be used for determining whether a scanner is capable of performing a particular type of audit.

DTAS Server

According to one embodiment of the invention, initialization of the audit server 12 invokes the Dynamic Target Acquisition Service (DTAS) provided by the topology analytic engine 200 for discovering hosts that are active on the network. A target list of such active hosts is then generated for use during a network audit session. The topology analytic engine 200 further builds a map file for keeping track of the active devices based on their unique identifiers even when DHCP is used to change their IP addresses.

According to one embodiment of the invention, there are three types of hosts for purposes of determining their unique identifiers. First, a host, such as a server, may be a static host whose IP address does not change. In this scenario, the static IP address is used as the host's unique identifier.

Second, a host may have a static hostname but a dynamic IP. This may occur when a DHCP server is configured with each host's media access control (MAC) address, and a domain name server assigns the same hostname to the IP address associated with the MAC address. In this scenario, the hostname is used as the host's unique identifier.

Third, a host may have a dynamic IP and a dynamic hostname, which is common in networks utilizing DHCP. In this scenario, the host's MAC address is used as its unique identifier.

Upon initialization, the topology analytic engine 200 audits the network(s) associated with the audit server 12 for determining the active hosts. In this regard, the topology analytic engine broadcasts predetermined packets to the network(s). The type of packet that is broadcast may depend on whether the network is a static IP and static hostname/dynamic IP network, or a dynamic IP/hostname network. For example, the topology analytic engine 200 may direct an address resolution protocol (ARP) request to the dynamic IP/hostname network, and await an ARP reply from the hosts in the network. The ARP reply specifies the MAC address associated with an IP address transmitted in the ARP request, in addition to indicating that the host associated with the IP address is alive.

If a desired response is received from the hosts, the topology analytic engine 200 determines that the host is alive, and generates the map file mapping of the active host's IP address to its unique identifier. The map file may also include a hostname and a network identifier of the network in which the host resides.

According to one embodiment of the invention, the topology analytic engine 200 generates a target file based on the map file. The target file includes a subset of the information in the map file, such as, for example, a list of IP addresses associated with the active hosts. The target file is stored locally in the audit server 12, and used by the scan harness 212 to scan the live hosts during an audit session. When the scan results are returned to the compliance server 10, the map file is also returned to allow the compliance server 10 to track the results across scans regardless of any IP address changes. In this regard, the compliance server 10 uses the map file to determine the unique identifier of a host that was scanned, and stores the scanning information based on the unique identifier. The compliance server 10 may thus maintain a history of scans and audits on a host level basis using the unique identifier even if its associated IP address changes over time.

According to one embodiment of the invention, the scan harness 212 works with one or more scanners 204-210 to launch a pre-configured audit based on the target list created by the topology analytic engine 200 at a pre-determined time as scheduled by the compliance server 10. In this regard, the scan harness 212 provides necessary input to the various heterogeneous scanners 204-210, and receives the scan results that represent the facts gathered about the network as output. The scan results are often heterogeneous in their format when heterogeneous scanners are used. The scan harness 212 takes the scan results in their heterogeneous formats, and automatically converts them into a single, normalized data format. According to one embodiment of the invention, the normalized data format is a machine-processable language format such as XML, which, according to one embodiment of the invention, is normalized for structure but not for semantic equivalence. According to this embodiment, semantic equivalence normalization is done in the P&V engine 34 (FIG. 2) as is described in further detail below. In making the automatic conversion of the data format structure, the scan harness 212 may utilize a conversion table that maps known fields in the output of a particular scanner into XML fields used in the XML format. The normalization allows the scan results to be consistently parsed and stored in the audit repository 14.

FIG. 11 is an exemplary scan results document 220 representing the facts gathered about a scanned network via the audit server scanners, that has been normalized into the XML format according to one embodiment of the invention. According to the illustrated embodiment, the scan results document 220 has its information represented in the outermost enclosure of the "<scanresult>" 222 beginning and "</scanresult>" 224 ending tags. Information on each host device being scanned is enclosed in the "<host>" 226 and "</host>" 228 tags. The information for each host device includes at least the host's physical or IP address 230, test information, and results of the test run by a particular scanner. The host's physical address may be obtained from the map file generated by the topology analytic engine 200.

The test conducted by the scanner is enclosed in the "<test>" 232 and "</test>" 234 tags. According to one embodiment of the invention, the test information includes a name of the test 236, scanner identifier 238, test version, 240, and scanner data index 242. The scanner data index provides meta-information about the specifics of the test performed, and how it maps to other related scanners that can perform the same type of test.

The "<result>" 244 and "</result>" 246 tags encapsulate information about the host device found by the scanner. For example, the scan results may reveal the type of service run by the host device, including a service name 248, port 250 used for running the service, and protocol 252 associated with the service. A person of skill in the art should recognize that while the present example is host centric, any test related to the security of the enterprise, including physical security, may be represented via a similar format where a unique identifier for the object being tested is given in the outer tag and the results of the test in the inner tags.

Once the normalized scan results document is generated, it is stored in the audit repository 14 for analysis by the compliance server 10. The analysis may occur automatically based on policies that have been pre-configured for the completed audit. The analysis may also be manually invoked by a user for testing a particular policy, or for re-analyzing the scan results.

DPF Server

According to one embodiment of the invention, the audit server 12 further provides a firewall between the enterprise LAN/WAN and the private subnet containing the compliance server 10 and audit repository 14, via a DPF server 201 that may be incorporated into the audit servers 12. The DPF server 201 may be implemented as a Unix daemon running on a TCP/IP port.

The DPF server protects the compliance server 10 and audit repository 14 via a packet filter that may be dynamically configured with filtering rules, also referred to as DPF rules, that allow temporary or permanent communication with the associated port on the audit server. According to one embodiment of the invention, the DPF server is configured, by default, to drop all packets addressed to its interface. Communication on the selected ports of the interface are then opened, either permanently or temporarily, based on permanent or temporary filtering rules. Such controlled flow of packets helps provide integrity to the data that is transmitted via the audit servers.

According to one embodiment of the invention, in order to open a permanent communication with an audit server 12, a network administrator creates a permanent filtering rule via the compliance server 10 which allows the free exchange of packets between a source/destination address, protocol, and/or source/destination port. For example, it may be desirable to permanently open an e-mail port on the audit server to allow e-mails to be sent and received freely.

Once a permanent filtering rule is generated, the compliance server 10 forwards the rule to a first reachable audit server 12. Each audit server 12 then forwards the rule to each DPF server 201. The permanent filtering rule is added to the DPF server 201's packet filter according to the source/destination address, protocol, and/or port information indicated in the rule.

The DPF server 201 may further open, for a particular scan job, a temporary communication between an audit server and IP addresses included in its target file. According to one embodiment of the invention, the communication is terminated once the scan job is complete. In this regard, the audit server transmits a temporary filtering rule to the DPF server 201, which opens a temporary communication between the audit server and the networks in the target file for all ports and protocols. Once a connection has been established, it is left open until the current scan job is complete. Once the job has been completed, a quit command is transmitted to the DPF server 201 to remove any temporary filtering rules added by the audit server during the connection. Once the temporary rules have been removed, a revised rule list is applied, and the connection is terminated. In this manner, the packet filter may be dynamically controlled to allow communication when a scan is pending, but restricting such communication at other times, helping eliminate unnecessary exposure of the compliance server 10 and audit database 14.

Figure 12:
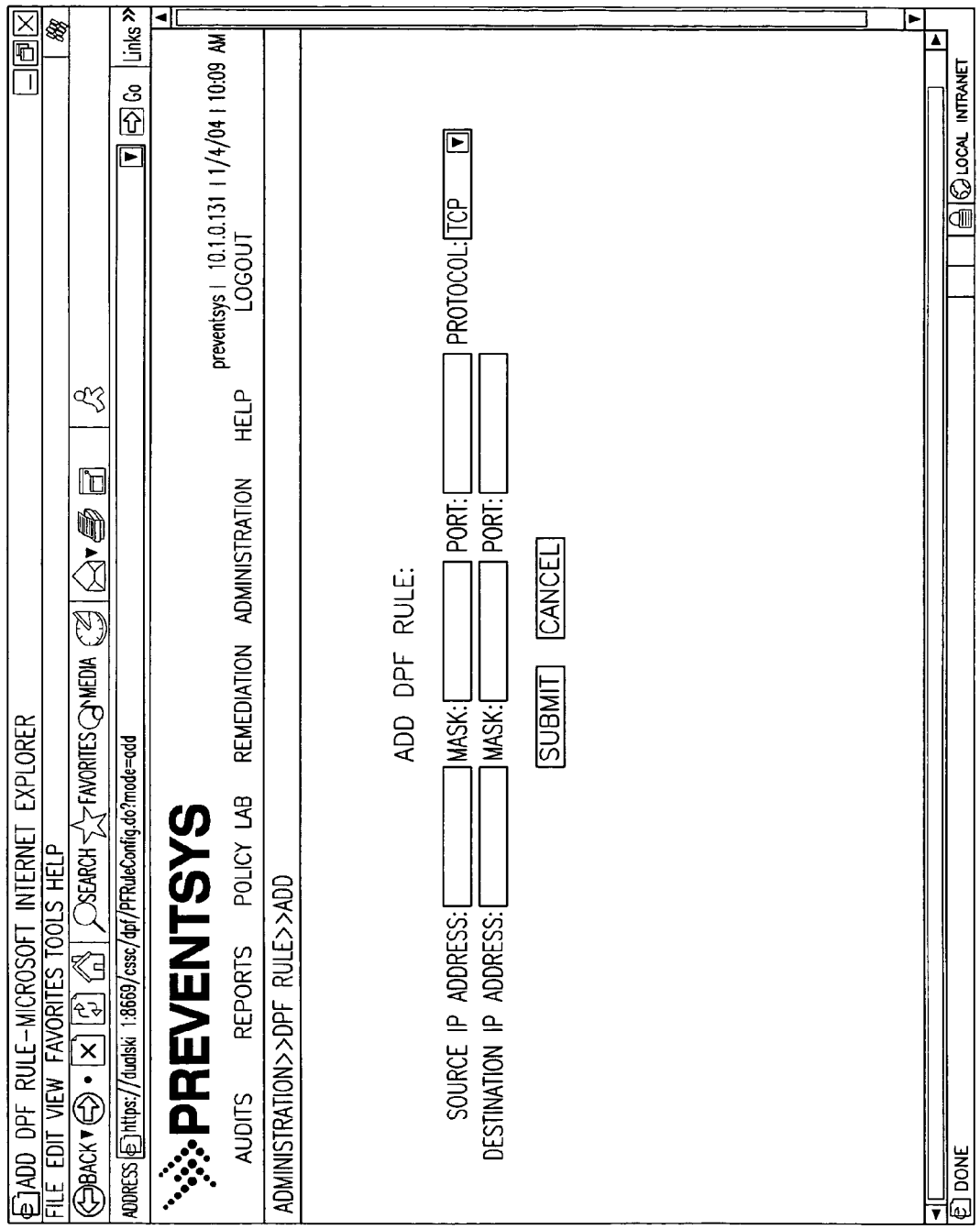
FIG. 12 is a screen shot of a GUI for adding a filtering rule according to one embodiment of the invention.

FIG. 12 is a screen shot of a GUI for adding a filtering rule according to one embodiment of the invention. A filtering rule includes a source address, mask, and port specification as well as a destination address, mask, and port specification. According to one embodiment of the invention, a single Internet protocol setting is associated to both the source and destination addresses.

WAP Detection

According to one embodiment of the invention, the audit server 12 is further configured to automatically identify and test wireless access points (WAPs) to wireless networks, and determine their logical location on the global network. A WAP often performs MAC address filtering by maintaining a list of MAC addresses of hosts that are allowed to join a wireless network via the WAP. A host having a MAC address that is not included in the list may not generally access a wireless network via the WAP. It is desirable, therefore, to determine whether MAC address filtering is turned on or off for a particular WAP, whether the filtering lists are up-to-date, and whether the MAC address filtering works properly.

According to one embodiment of the invention, the topology analytic engine 200 in the audit server is configured to discover WAPs via a special purpose scanner 208, such as, for example, a WiFi scanner manufactured by Preventsys, Inc. According to one embodiment of the invention, the special purpose scanner 208 returns a list of identified wireless access point devices and associated connection parameters such as, for example, one or more addresses or identifiers associated with the access point, radio frequency or channel information, and encryption status.

Given a known list of known WAPs and their associated MAC address filtering lists, the audit server 12 periodically tests whether MAC address filtering is functional for each WAP. If it is deemed to not be functional, a logical location of the WAP failing the test is identified for determining whether such failure poses a risk to the network.

Figure 12A:
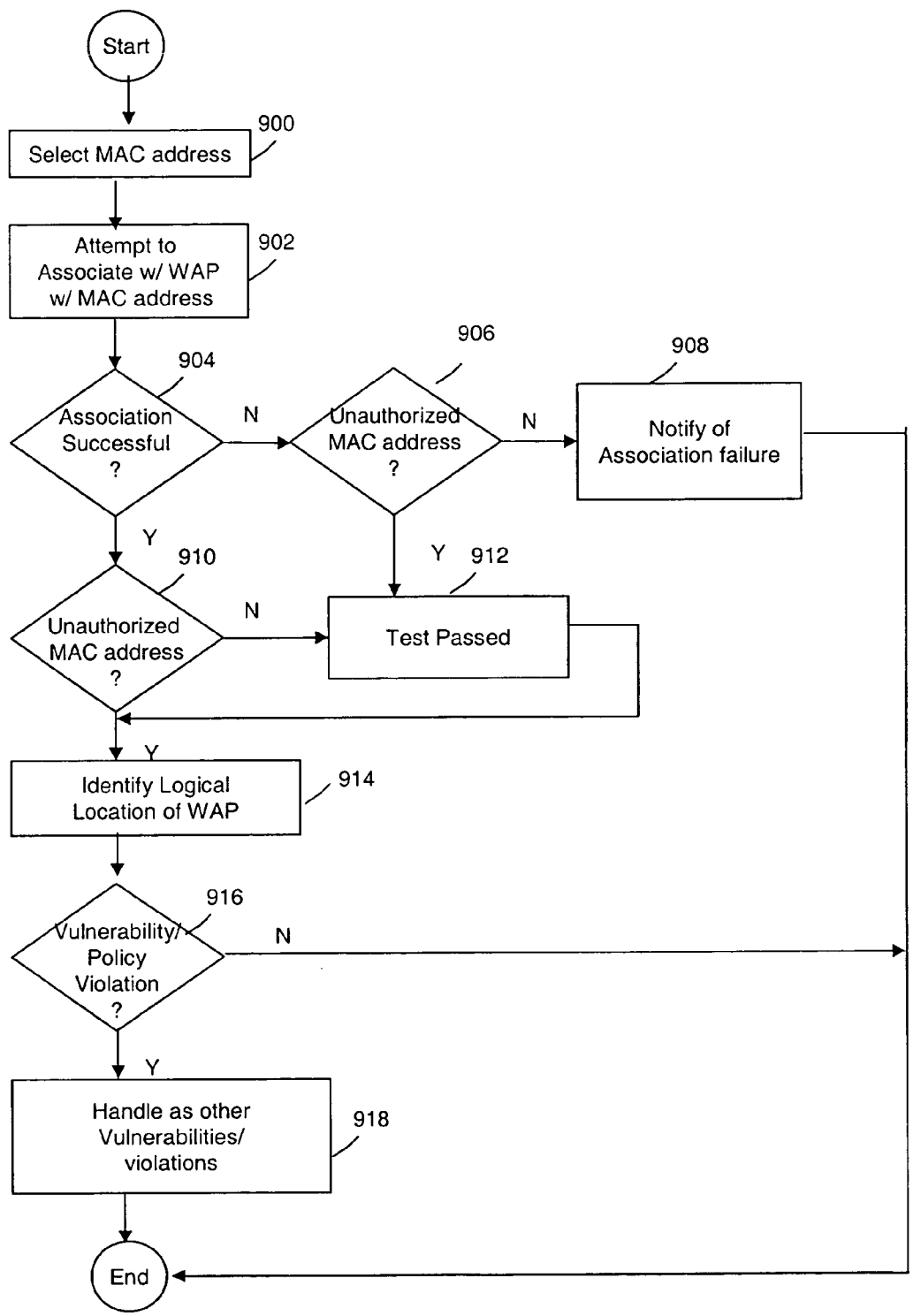
FIG. 12A is a flow diagram of an exemplary process for testing wireless access points according to one embodiment of the invention.

FIG. 12A is a flow diagram of an exemplary process for WAP testing according to one embodiment of the invention. In step 900, a particular MAC address is selected, and in step 902, the topology analytic engine 200 poses as a client that attempts to make an association with a particular WAP using the selected MAC address. In step 904, the topology analytic engine determines whether the association was successful. If the association failed for a MAC address that is authorized via being listed in the WAP's MAC address filtering list as is determined in step 906, a notification is transmitted of the failure in step 908. Otherwise, if the association failed for a MAC address that is not authorized, the test is deemed to be successful in step 912.

The test is also deemed to be successful if the association was successful for an authorized MAC address as is determined in step 910. However, if the association was successful but the MAC address was unauthorized, a conclusion is made that MAC address filtering has failed. In any scenario where connectivity to the WAP's network is gained, the logical location of the WAP is identified in step 914. In this regard, the topology analytic engine 200 initiates a trace route routine which identifies the hops (routers) used to transmit a packet from the client initiating the wireless connection, out through the WAP and through the infrastructure, to a target IP address. The route of the packet may be traced, for example, by utilizing a conventional traceroute program or any other similar program conventional in the art. The identified routers are then associated with the wireless access point parameters.

According to one embodiment of the invention, one or more WAP policies are provided for checking whether WAPs that have failed a MAC address filtering test are located within the global network being monitored by the network security audit system. The WAP policies may also test for particular sections of the global network in which the failing WAPs are located. A determination is then made in step 916, whether the WAP policies have been violated. If the failure represents a WAP policy violation, it is handled in manner similar to other policy violations, such as, for example, by generating remediation tasks, transmitting alerts, and/or including the information in compliance reports 500. For example, the WAP policy may indicate that if the failing WAP is located in the accounting department of the global network, this is a serious security risk and a remediation task should be generated. However, if the failing WAP is located in a third party's network, or in a non-sensitive part of the global network, the policy may simply include the information in the compliance reports, but not generate any alerts or remediation tasks.

According to one embodiment of the invention, other policies regarding any of the WAP properties such as encryption usage, key length, location, vendor, and the like, are also provided.

V. Policy & Vulnerability (P&V) Engine

Figure 13:
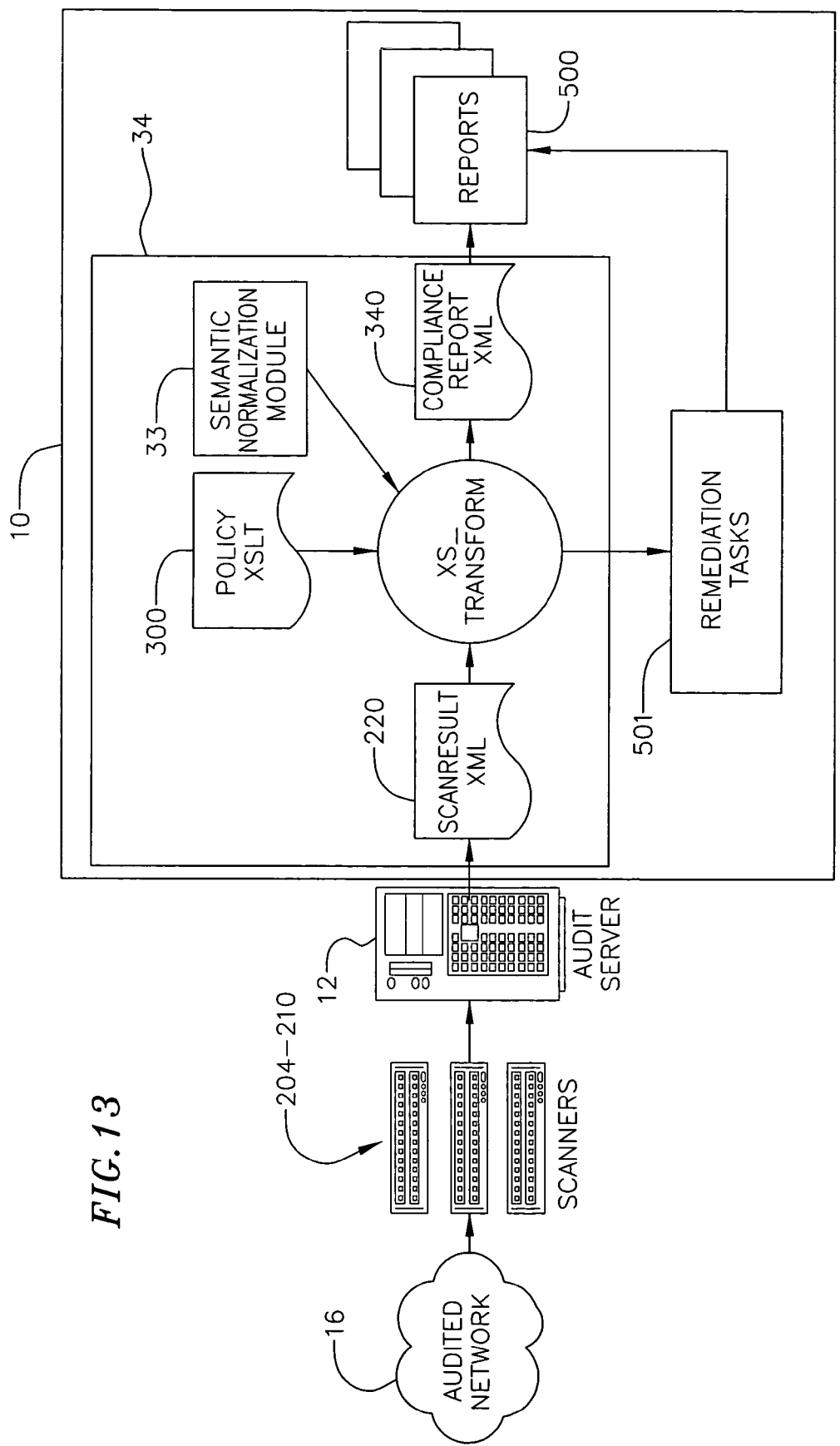
FIG. 13 is a semi-schematic block diagram of a policy analysis process according to one embodiment of the invention.

FIG. 13 is a semi-schematic block diagram of a policy analysis process according to one embodiment of the invention. One or more audit servers 12 invoke one or more associated scanners 204-210 to scan the network 16, 22 and gather facts about it based on a predetermined audit schedule. A user may also manually invoke the audit outside of the audit schedule as desired. The facts about the network may also be gathered manually via physical inspections performed by a human being.

Regardless of a method in which the network information is obtained, each audit server 12 generates a scan results document 220 with scan data that is normalized into a standard XML format. The P&V engine 34 (FIG. 2) resident in the compliance server 10 then applies one or more policies to the scan results. According to one embodiment of the invention, the pattern matching and transformation aspects of the P&V engine 34 are implemented via an XLST processor conventional in the art.

In performing a policy analysis, the P&V engine 34 generates a policy template 300 for a policy that is to be applied, and applies the policy template to the scan results document generated by the audit server 12. The policy template 300 is generated by identifying the rules associated with an applicable policy. The applicable policy may be the policy configured for a scheduled audit. A user may also manually select the policy for re-analyzing the scan results, or for testing in the policy lab 32. According to one embodiment of the invention, the policy template 300 is a collection of rules written as XSL fragments and wrapped in a policy XSL template header and footer.

Semantic Normalization Module

According to one embodiment of the invention, P&V engine 34 includes a semantic normalization module 33 that allows users to write policy rules that are included in policies and applied to facts gathered by the scanners without regard to the disparate products from different vendors that may be used as a data source to obtain the facts. Such disparate products often have different ways of representing information gathered about the network, and/or different ways of testing the information, although the tests and/or results may be semantically equivalent to one another. For example, one scanner may represent and test SNMP community strings, which are well known in the art, differently from another scanner. The first scanner may use a specific test number for testing SNMP community strings, and format its output in a simple delimited, plain text representation. The second scanner may use a different test number for performing the same test, and may represent its output data in an XML representation with separable fields of tagged data. Both scanners may in turn represent and test SNMP community strings differently than a human who performs a manual inspection and enters facts gathered from the manual inspection. In this regard, the system supports and creation and management of manual audit tasks to supplement automated audits.

The semantic normalization module 33 allows the user to write a uniform rule that is flexible enough to be applied to the facts gathered by currently existing disparate data sources, and even data sources that may be added in the future, instead of writing a different rule for each specific variation of the data source. In this regard, the semantic normalization module 33 defines, in a reference map, semantic equivalencies among numerous types of data supplied by different data sources. This may be done, for example, by maintaining a list of the types of facts that each data source product may gather, and performing a semantic mapping of each fact (or set of facts) for one data source product to the fact or set of facts that have semantic equivalence, that is, have the same meaning, for each of the other data source products. The mapping may be done automatically via a self-organizing mapping software to generate relationships based on the structure of the lists and their contents, and/or manually. A mapping score may then be provided based on how well the facts from one product match to the facts from another product. The reference map thus allows the system to combine and correlate the output of numerous network security scanners.

Once the semantic mapping is done, a list of references may be generated and stored in the reference map for use in machine-coding policy rules. According to one embodiment of the invention, references are symbolic names referring to a more specific code which is encapsulated and abstracted away from the user. For references associated with facts whose mapping score is above a given threshold, an assumption is made that the set of matches made by the self-organizing mapping software are semantically equivalent. Mapping scores below the threshold, however, are manually verified for determining whether the matches are indeed semantically equivalent.

Figure 13A:
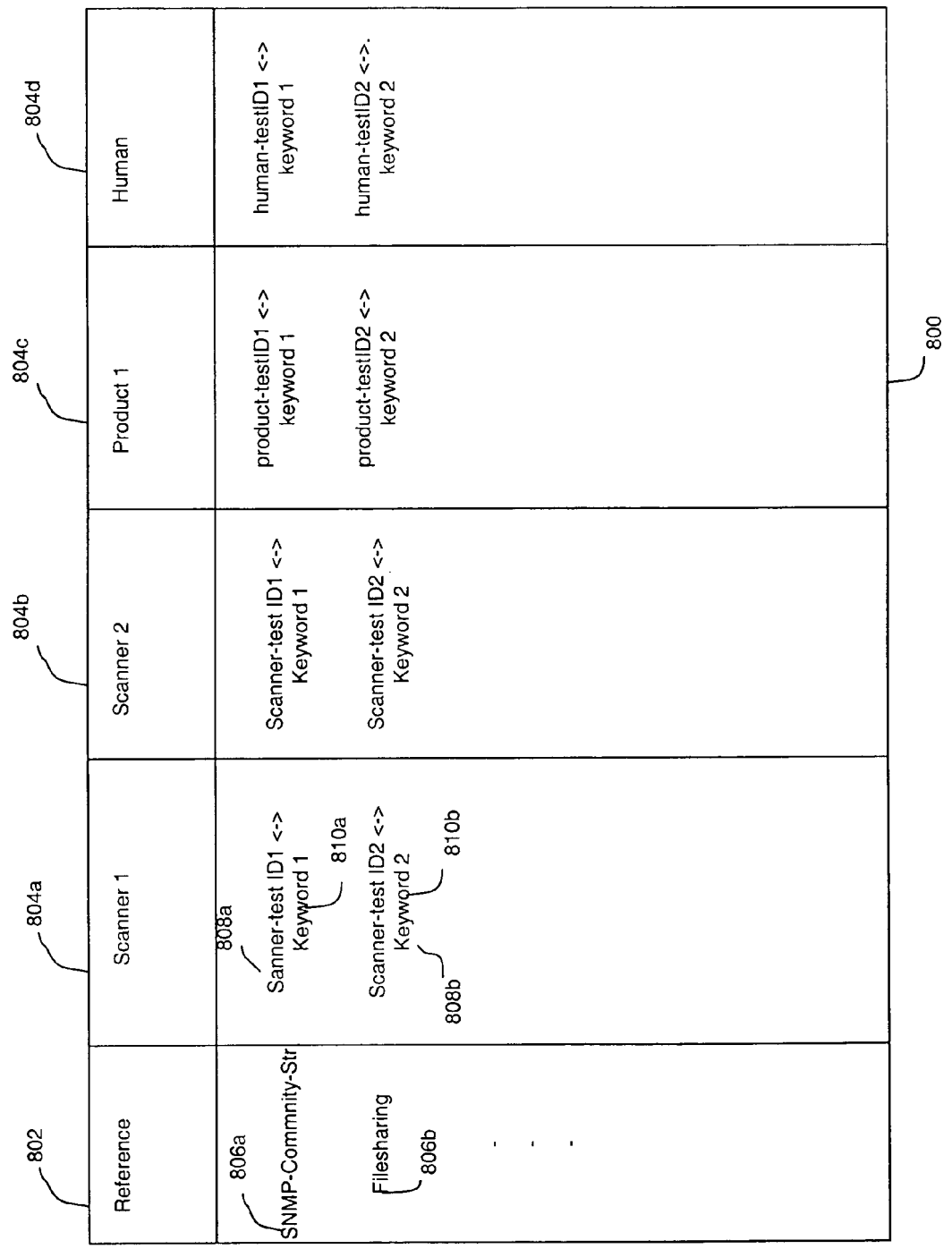
FIG. 13A is a conceptual layout diagram of an exemplary reference map according to one embodiment of the invention.

FIG. 13A is a conceptual layout diagram of an exemplary reference map 800 according to one embodiment of the invention. A person of skill in the art should recognize that the reference map may be organized in many other ways, and may include other fields that are not illustrated in FIG. 13A.

The reference map 800 may include a reference field 802 and one or more data source fields 804*a-d*. The reference field 802 includes a list of references 806*a-b* that are mapped to corresponding test IDs 808*a-b* and/or keywords 810*a-b* produced by the data source products identified in the data source fields 804*a-d*. Each test ID 808*a-b* and/or keyword 810*a-b* associated with a particular data source product may be deemed to be semantically equivalent to a test ID and/or keyword associated with a different data source product as long as they are both associated to the same reference 806*a-b*.

According to one embodiment of the invention, each reference is associated with code that is configured to parse a scan results document based on the type of data source product creating the document, and retrieve data from the appropriate fields of the document. The code for retrieving the data may be implemented in XSL, SQL, Java, any other procedural, object oriented, or structured programming language conventional in the art.

In the above-referenced example, if a policy having a rule that uses an SNMP community string reference is applied to the various XML scan results documents, the reference map 800 is searched to look for the SNMP community string reference, and determine the test IDs and/or keywords produced by the different data sources for the reference. Once a particular data source, such as, for example, a Nessus scanner, is identified via the reference map as having producing facts associated with the reference, code associated with the reference and the particular scanner is invoked to retrieve data from the correct fields of the scan results document. For example, a namespace convention such as "SNMP_Community_String.Nessus." may be mapped to code used to extract data associated with SNMP community strings from a scan results document generated by the Nessus scanner.

According to one embodiment of the invention, the execution of the XSL based policy template 300 to the XML scan results document 220 causes the P&V engine 34 to generate an XML based compliance document 340. The P&V engine 34 analyzes the generated compliance document for making various types of computations. Such computations may include, for example, figuring out a number of compliant and non-compliant hosts, a total number of policy and vulnerability violations detected during the audit, and the like. The computed information is then correlated and presented to a user in one or more reports 500. The reports may be automatically generated upon completion of a scheduled audit or based on a pre-determined schedule. The reports may also be generated based on a user's manual request.

According to one embodiment of the invention, the P&V engine automatically makes recommendations for improving the security of the overall network. This may be done, for example, by generating a remediation task 501 for a policy or vulnerability rule violation noted in the compliance document 340. Information on the generated remediation task may also be displayed in one or more reports 500. Such information may indicate whether the task is for a policy violation or a vulnerability detection, the name of the policy or vulnerability rule, the severity measure for the rule, an address of the host in which the violation or vulnerability was noted, and the date in which the violation or vulnerability was detected. A network administrator may then assign the remediation task to a particular person or entity for improving the security of the global network. The status of the assigned remediation task is tracked and made available in the reports 500 generated by the system.

FIG. 14 is an illustration of an exemplary XSL-based policy template 300 according to one embodiment of the invention. In the illustrated example, the policy template includes a rule that states that hosts on the scanned network that are running a file transfer protocol (FTP) service or telnet service must provide logon banner templates that includes particular text. According to one embodiment, the rule is written without regard to the particular information source that is to produce data to which the rule is to be applied.

The rule in the illustrated embodiment is encapsulated by "<xsl:template>" 302 and "</xsl:template>" 304 tags. The actual processing of the rule is performed via the expression <xsl: for-each select="$hosts"> 306 where "$hosts" is a reference to a variable describing the hosts that match the criteria. The expression follows other rules of the XSL language which is well known to those skilled in the art.

According to the exemplary rule, if the value of the expression 306 matches, that is, if there is a service whose name attribute is equal to "ftp," or "telnet" and whose "$banner" text does not match, then a result element 308 is output with a description 310 and solution 312 child elements. The description 310 element provides an English explanation of the rule that was violated. The solution 312 element lays out a solution for fixing the rule violation.

Figure 15:
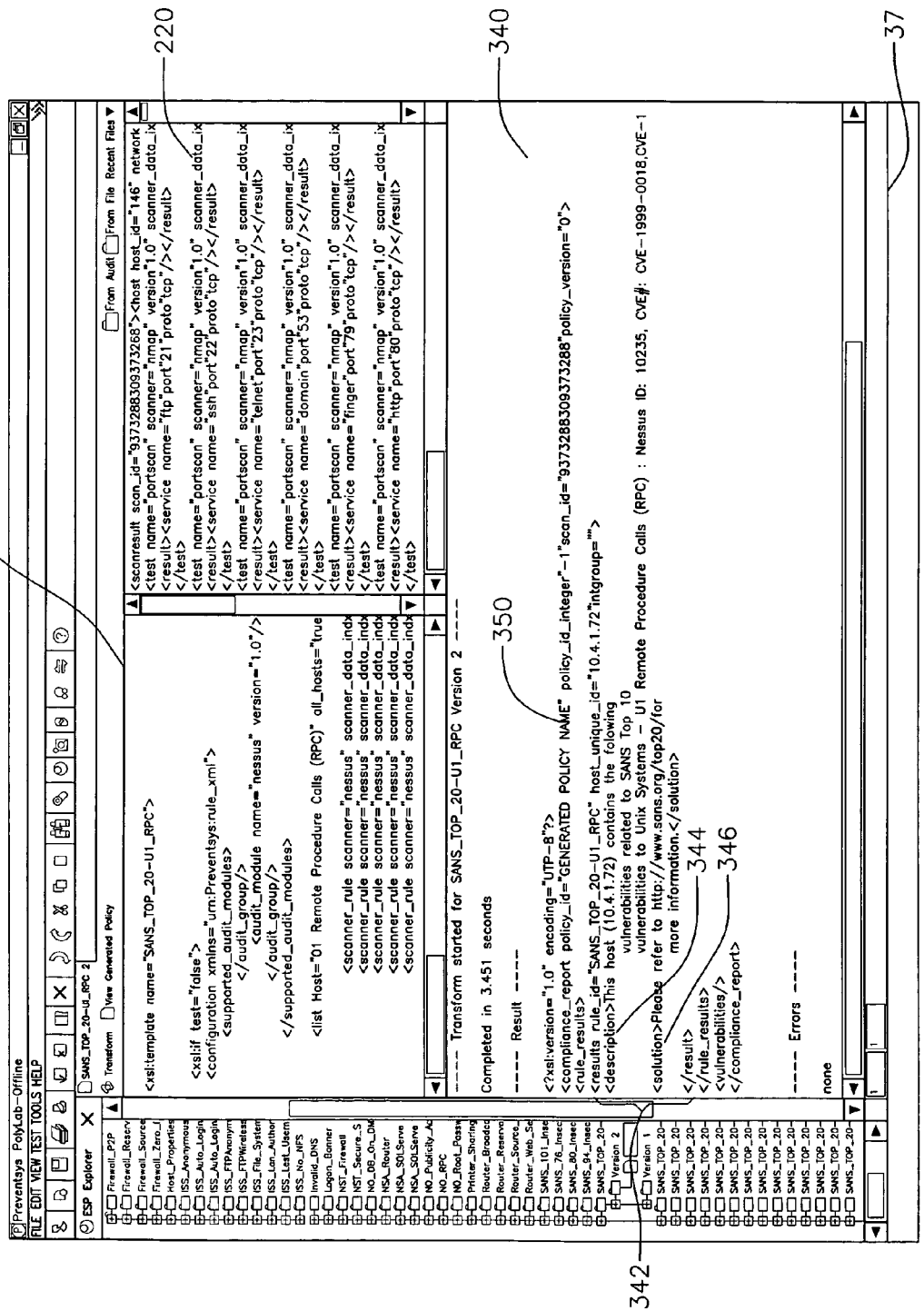
FIG. 15 is a screen shot of a GUI displaying an XML-based compliance document generated upon applying an XSL policy template to an XML-based scan results document according to one embodiment of the invention.

FIG. 15 is a screen shot of a GUI displaying an XML-based compliance document 340 generated upon applying an XSL policy template 300 to an XML-based scan results document 220 based on normalization information stored in the reference map 800 according to one embodiment of the invention. As illustrated in FIG. 15, the policy template 300, scan results document 220, and compliance document 340 may be displayed concurrently in the work area 37 of the GUI.

The compliance document 340 includes the results of applying a policy template identified by a policy identifier 350, to one or more host devices in the audited network 16. The results 342 of applying one or more rules to a particular host are encapsulated by <rule_results> 350 and </rule_results> 352 tags. Each result 342 includes a rule identifier 352, severity indicator 354, rule category type 356, host identifier 348, and network group 358. Each result 342 further includes a description 344 of the rule that is being applied, and a solution 346 associated with the rule. The compliance document 340 is then stored in the audit repository 14 for use by the compliance server 10 for compliance reporting and remediation.

According to one embodiment of the invention, the P&V engine may calculate a standardized score representing the organization's security posture. This may be done, for example, by calculating an average number of violations per critical resource/node across different categories of risk. A measure of time may also be included into the calculation.

Remediation Tasks

Figure 16:
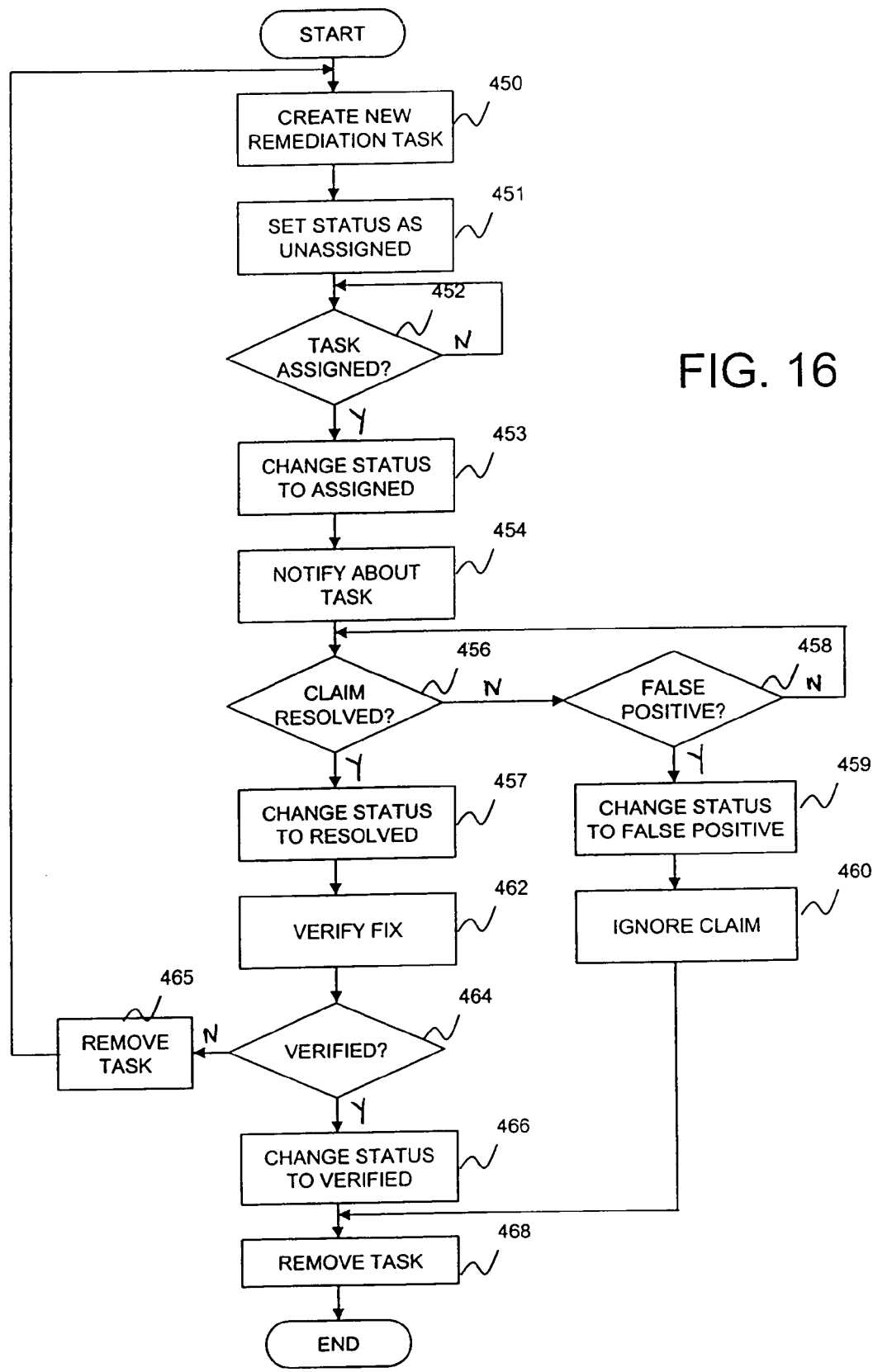
FIG. 16 is a flow diagram of an exemplary remediation process executed according to one embodiment of the invention.

FIG. 16 is a flow diagram of an exemplary remediation process executed by the P&V engine 34 in conjunction with a remediation management and reporting module 408 (FIG. 17) according to one embodiment of the invention. The process starts, and in step 450, the P&V engine 34 generates a new instance of a remediation task for a policy violation or vulnerability claim. In this regard, the P&V engine 34 extracts from the compliance document 340, information on the type of policy or vulnerability rule being violated, the name of the violated policy or vulnerability rule, a severity associated with the rule violation, an address of the host in which the violation was noted, and the date in which the violation was detected. All or part of the information is later displayed in the reports 500 generated by the system, or in a separate remediation task assignment window.

In step 451, the status of the remediation task is set to an unassigned state.

In step 452, a determination is made as to whether the remediation task was assigned to a person or entity for resolution. Remediation tasks may be assigned based on roles, geographic responsibility, and the like. If the answer is YES, the status of the remediation task is changed to an assigned state in step 453. The remediation management and reporting module 408 then transmits a notification to the assigned person or entity in step 454. According to one embodiment of the invention, the notification takes the form of an e-mail message that includes all or part of the information on the remediation task. The e-mail message may further include a hyperlink to a remediation update function provided by the remediation management and reporting module 408, for updating the status of the task.

If a third-party remediation system, also referred to as an action request system (ARS), is integrated into the present network security audit system, no e-mail notifications are transmitted, according to one embodiment of the invention, to users associated with the third-party ARS. However, tasks assigned to such users are pushed to the associated ARS. The ARS may then notify its users accordingly. These users may update their tasks via the ARS, or, if associated with an authorized user of the network security audit system, update the tasks via the remediation update function. Updates made via the third-party ARS are pulled into the network security audit system, and transmitted to the remediation update function.

In step 456, a determination is made as to whether the policy violation or vulnerability claim has been resolved. This may be done, for example, by determining whether the user has updated the status of the associated task to a resolved state.

If the answer is NO, a further determination is made in step 458 as to whether the user has provided a false positive status to the task. An assigned user may provide a false positive status to a policy violation or vulnerability claim if it presents a false reporting of a vulnerability or violation, and therefore does not plan to fix it, and wants the system to filter it out in the future. An assigned user may provide an "acceptable risk" status if the vulnerability or violation represents an acceptable risk, and therefore does not plan to fix it and wants the system to filter it out in the future.

If a false positive status is received from the user, the status of the task is changed to a false positive state in step 459. According to one embodiment of the invention, policy violation or vulnerability claims given a false positive status are ignored in subsequent audits using the same audit configuration, as is indicated in step 460.

Referring again to step 456, if a claim has been resolved, the fix is verified in step 462. In this regard, the P&V engine 34 re-audits the network based on the same audit configuration. In step 464, a determination is made as to whether the fix is verified. The fix is deemed to be verified if the policy violation is no longer detected during the re-audit. In this case, the status of the task is changed to a verified state in step 466, and the task is removed from the user's lists of remediation tasks.

Otherwise, if the fix may not be verified, the particular instance of the task is removed in step 465, and a new instance of the task with an unassigned state created in steps 450 and 451.

According to one embodiment of the invention, remediation tasks may be automatically prioritized based on criteria such as, for example, severity, length of exposure, and the like.

VI. Management Interface

Referring again to FIG. 2, the compliance server 10 includes a management interface 30 that provides a GUI for generating reports 500 and managing the system. According to one embodiment of the invention, the GUI is a web-based interface.

Figure 17:
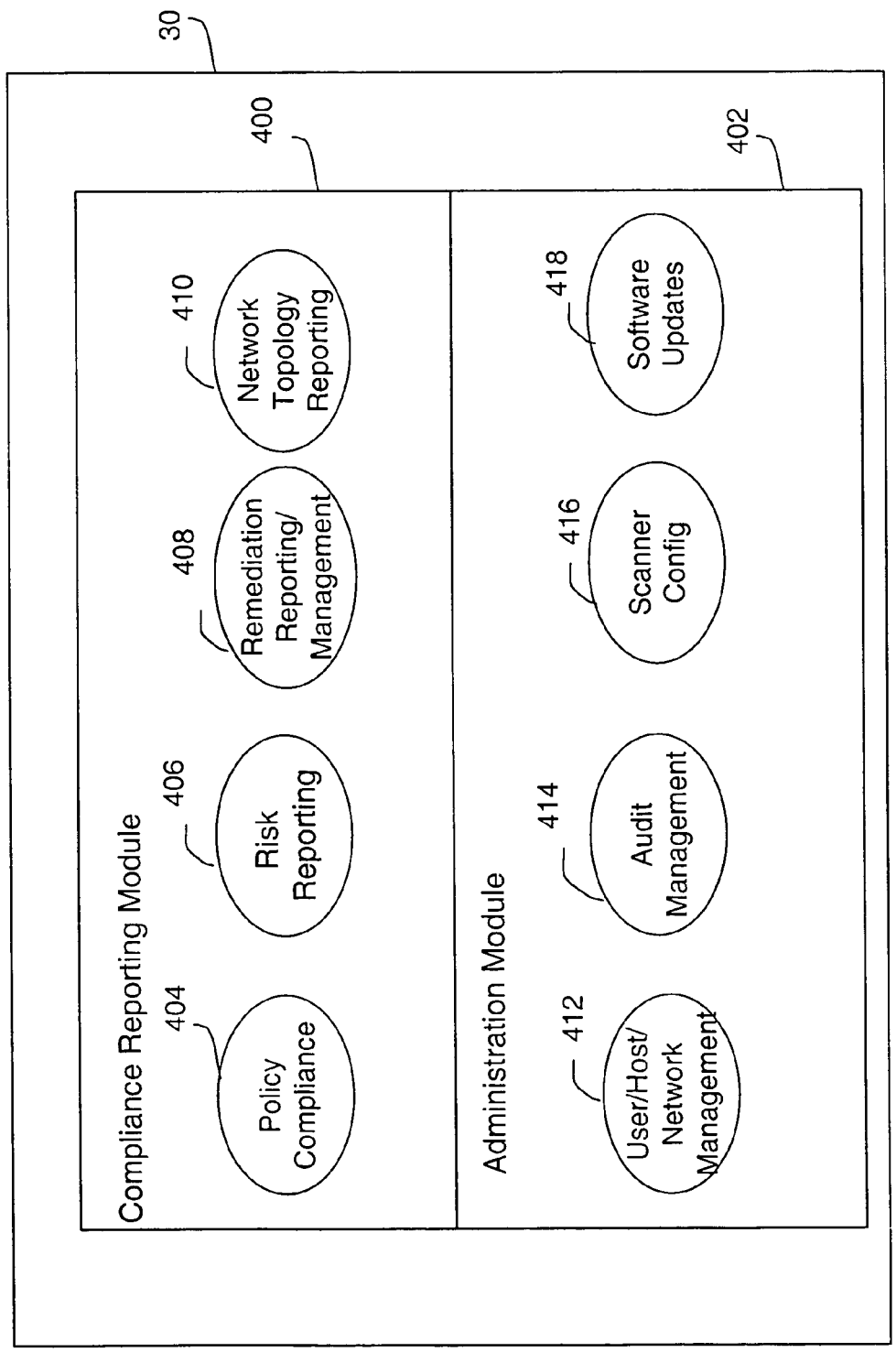
FIG. 17 is a block diagram of the logical modules making up a management interface according to one embodiment of the invention.

FIG. 17 is a more detailed block diagram of the logical modules making up the management interface 30 according to one embodiment of the invention. According to this illustrated embodiment, the management interface 30 includes a compliance reporting module 400 and an administration module 402. The compliance reporting module 400 allows the compliance server 10 to generate reports 500 providing different types of views of the overall security of the network. The administration module 402 allows the management of user roles, management of network devices, and configuration and scheduling of network audits.

Compliance Reporting Module

According to one embodiment of the invention, the compliance reporting module 400 includes a plurality of sub-modules for generating different types of reports 500, including, but not limited to a policy compliance reporting sub-module 404, risk reporting sub-module 406, remediation management and reporting sub-module 408, and network topology reporting sub-module 410.

The policy compliance reporting sub-module 404 generates policy compliance reports 503 that summarize the compliance of the overall network to applicable security and regulation policies as indicated by one or more compliance documents 340 stored in the audit repository 14.

Figure 18:
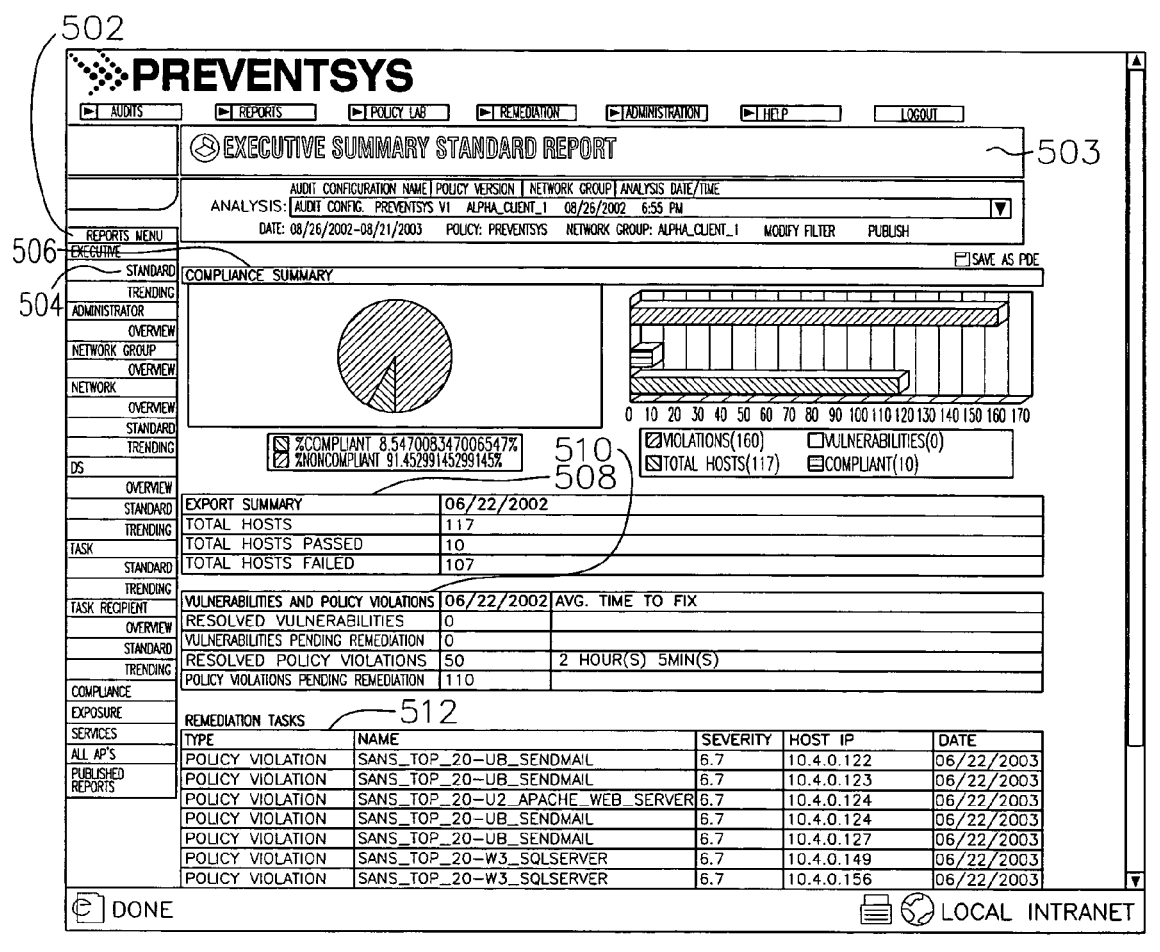

FIG. 18 is a screen shot of a GUI displaying an exemplary policy compliance report 503 calculated and rendered based on the XML-based compliance document 340 according to one embodiment of the invention. The compliance report 503 may be generated by selecting a standard report option 504 from a reports menu 502. The report 503 may include a compliance summary section 506 displaying policy compliance information as one or more graphs. The report 500 may also include a report summary section 508 with information on hosts that have passed or failed a network audit. A vulnerabilities and policy violations section 510 includes a number of resolved vulnerabilities and policies, and a number of vulnerabilities and policies pending remediation. A remediation tasks section 512 displays the remediation tasks generated by the P&V engine 34.

Figure 19:
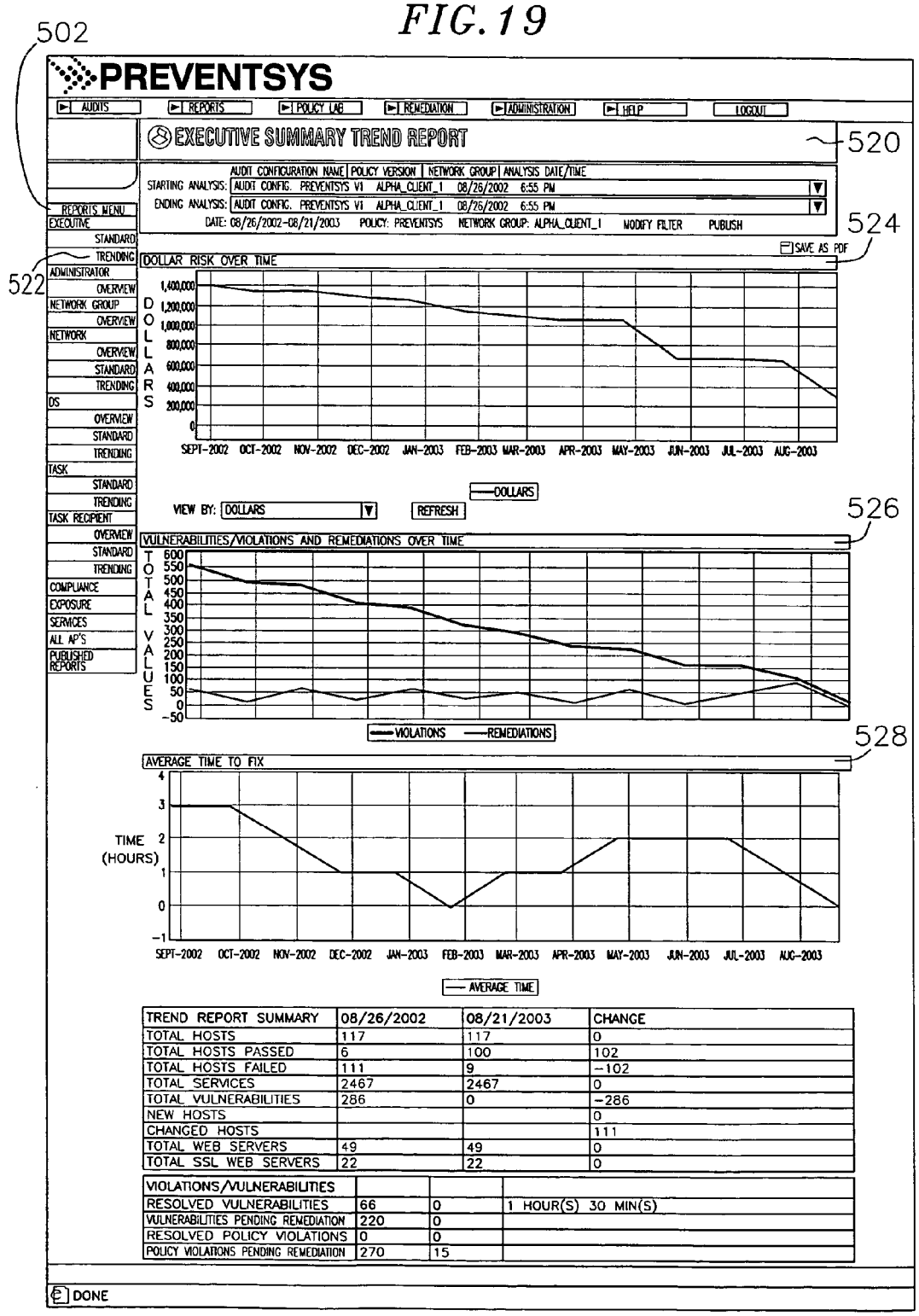
FIG. 19 is a screen shot of a GUI displaying an exemplary trend report calculated and rendered based on historic audit data according to one embodiment of the invention.

The risk reporting sub-module 406 generates reports that track windows of exposure and trends over time with regards to risk exposure. FIG. 19 is a screen shot of a GUI displaying an exemplary trend report 520 calculated and rendered based on historic audit results stored in the audit repository 14 according to one embodiment of the invention. The trend report 520 may be generated by selecting a trend reporting option 522 from the reports menu 502. The trend report 520 may include window 524 showing a trend of the assets at risk, window 526 showing a number of violations/vulnerabilities and remediations over time, and window 528 showing a trend on an average time to fix violation and/or vulnerability claims. This information can be rendered at an executive report level which considers all audited networks, as is illustrated in FIG. 19. The same information may also be shown for individual networks and individual devices. Thus, the risk and exposure of all networks, specific networks, or individual devices may be reported, as well as average times to fix these issues at each level, allowing for quick calculations. Although not specifically depicted in the figures, these views exist at each of these levels according to one embodiment of the invention. The results may then be tracked regardless of any IP address changes to the individual devices due to the DTAS feature provided by the topology analytic engine 200.

The remediation management and reporting sub-module 412 provides a GUI for assigning remediation tasks, updating tasks status, adding third-party ARS, and generating associated reports.

FIG. 20 is a screen shot of a GUI displaying an exemplary remediation task assignment screen 530 according to one embodiment of the invention. The remediation task assignment screen 530 lists, for a particular audit, a list of rules for which a policy violation or network vulnerability was detected. The remediation task assignment screen 530 further lists the IP address 534 of the affected host, as well as the hostname 536 associated with the host. The date in which the violation or vulnerability was detected is listed in a date field 538. A severity field 540 indicates the severity measure associated with the violated rule.

Field 542 indicates a person or entity to which a task is assigned. The user may browse a list of authorized users or entities to assign the task by selecting a scroll-down icon 544. Selection of an assign tasks button 546 causes the remediation management and reporting module 408 to be assigned to the selected user or entity. A notification is then transmitted to the selected user or entity, or the assigned tasks pushed to an indicated third-party ARS.

Figure 21:
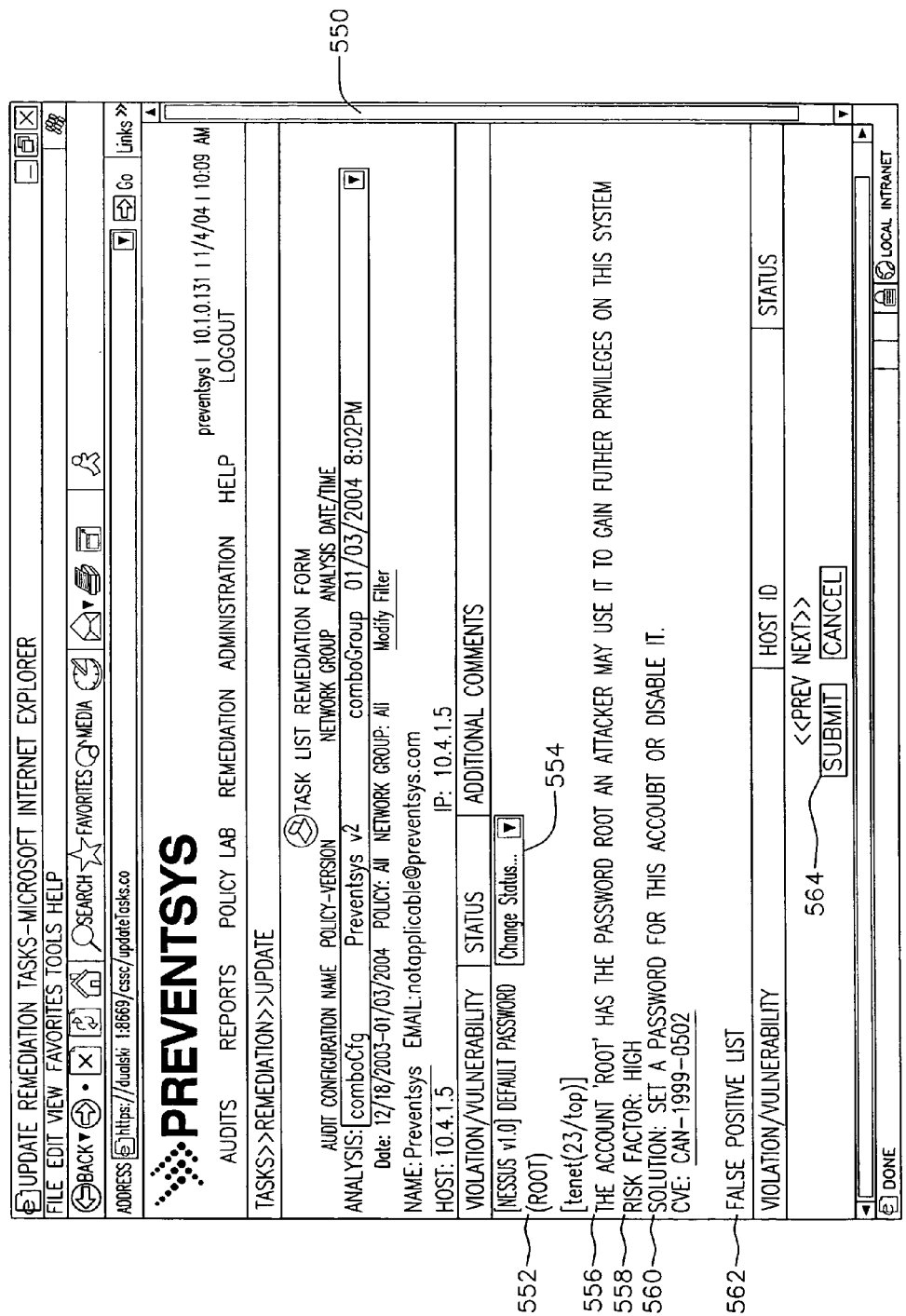
FIG. 21 is a screen shot of an exemplary task updating window according to one embodiment of the invention.

FIG. 21 is a screen shot of an exemplary task updating window 550 according to one embodiment of the invention. The window is displayed upon the user's selection of a link in his or her e-mail notification that a remediation task has; been assigned.

According to one embodiment of the invention, the task updating window 550 displays a list of remediation tasks 552 assigned to the particular user 552, along with a status area 554 allowing the user to enter an updated status for an assigned task. Also displayed for aiding the user in fixing the violation or vulnerability, is a description of the violation or vulnerability 556, a risk factor 558, and a proposed solution 560. A false positive list 562 provides details of assigned tasks to which the user has assigned a false positive status in the status area 554.

Selection of a submit button 564 transmits the status of the assigned tasks to the compliance server 10. The compliance server 10 attempts to verify claims indicated by the user as having been resolved. If such a verification is successful, the task is removed from the user's list of remediation tasks 552. If the verification is not successful, the compliance server 10 generates another instance of the remediation task, and may re-assign the task to the user, or assign it to a different user.

The network topology reporting sub-module 414 generates several views of the network and the structure of its elements.

FIGS. 22A-22D are screen shots of exemplary GUIs for integrating a third-party ARS and associated users into the present network security audit system. An exemplary ARS is Remedy, manufactured by BMC Software, Inc.

Figure 22A:
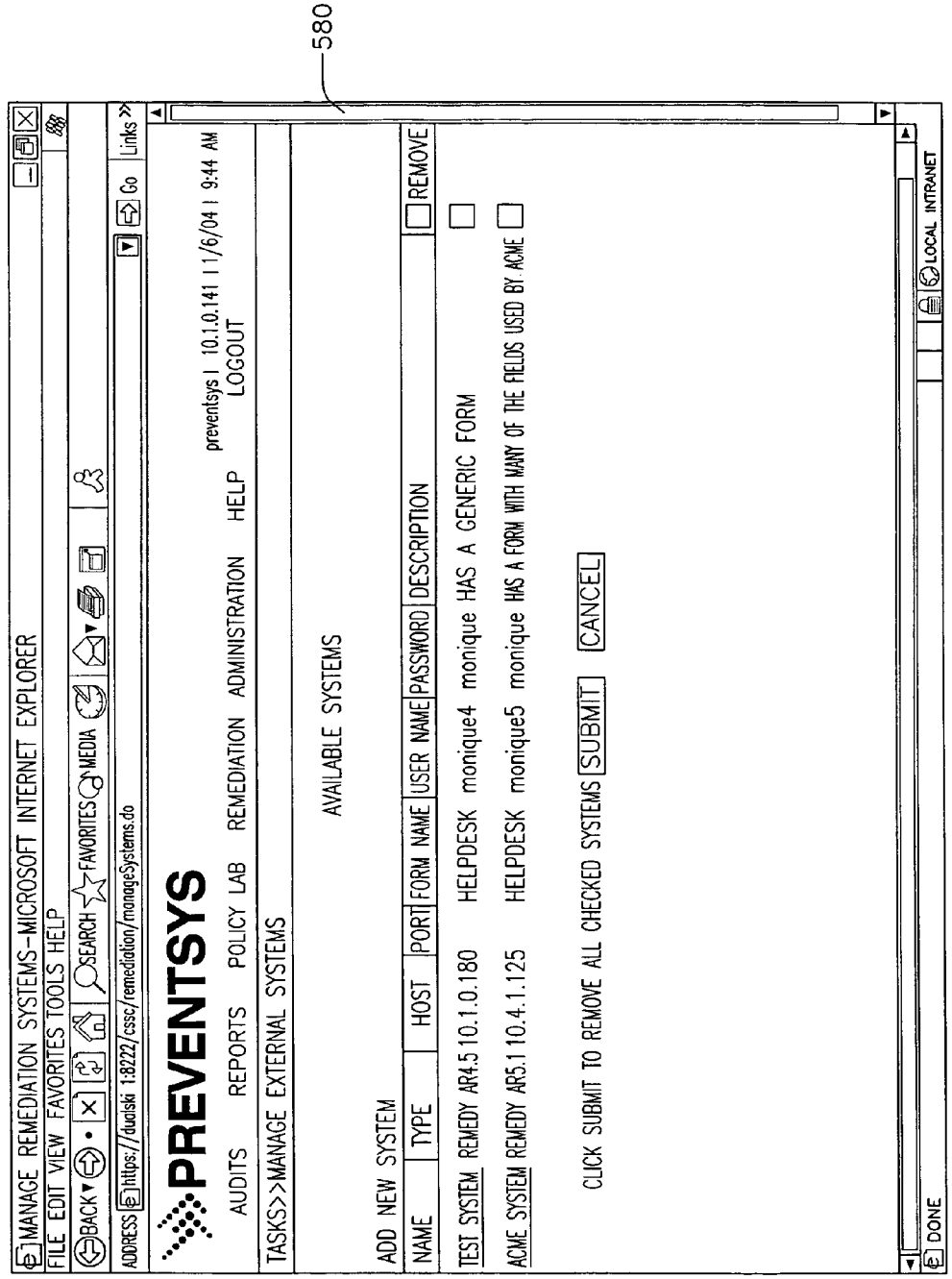
FIGS. 22A-22D are screen shots of exemplary GUIs for integrating a third-party remediation system and associated users into the system of FIG. 1 according to one embodiment of the invention.
Figure 22B:
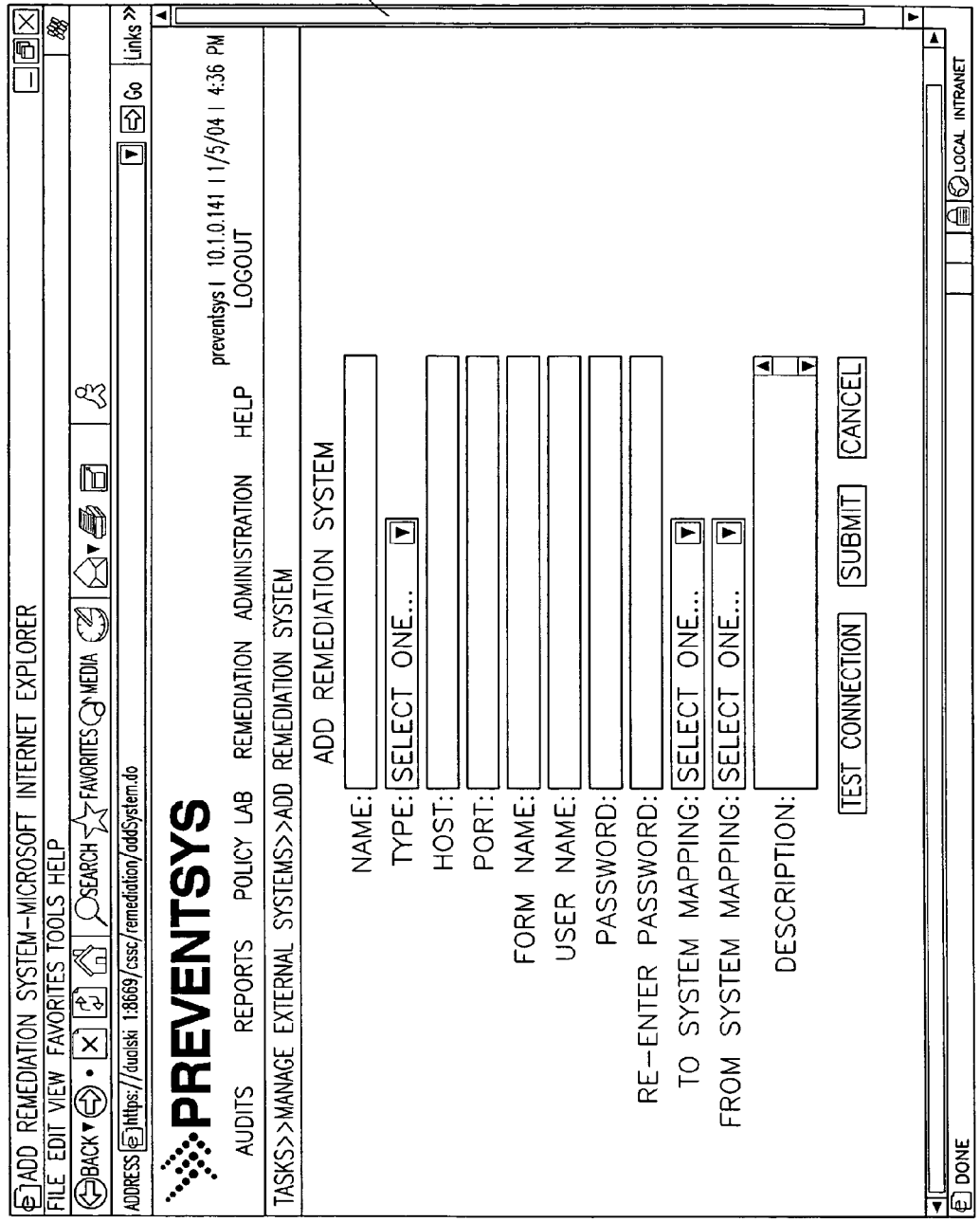
Figure 22C:
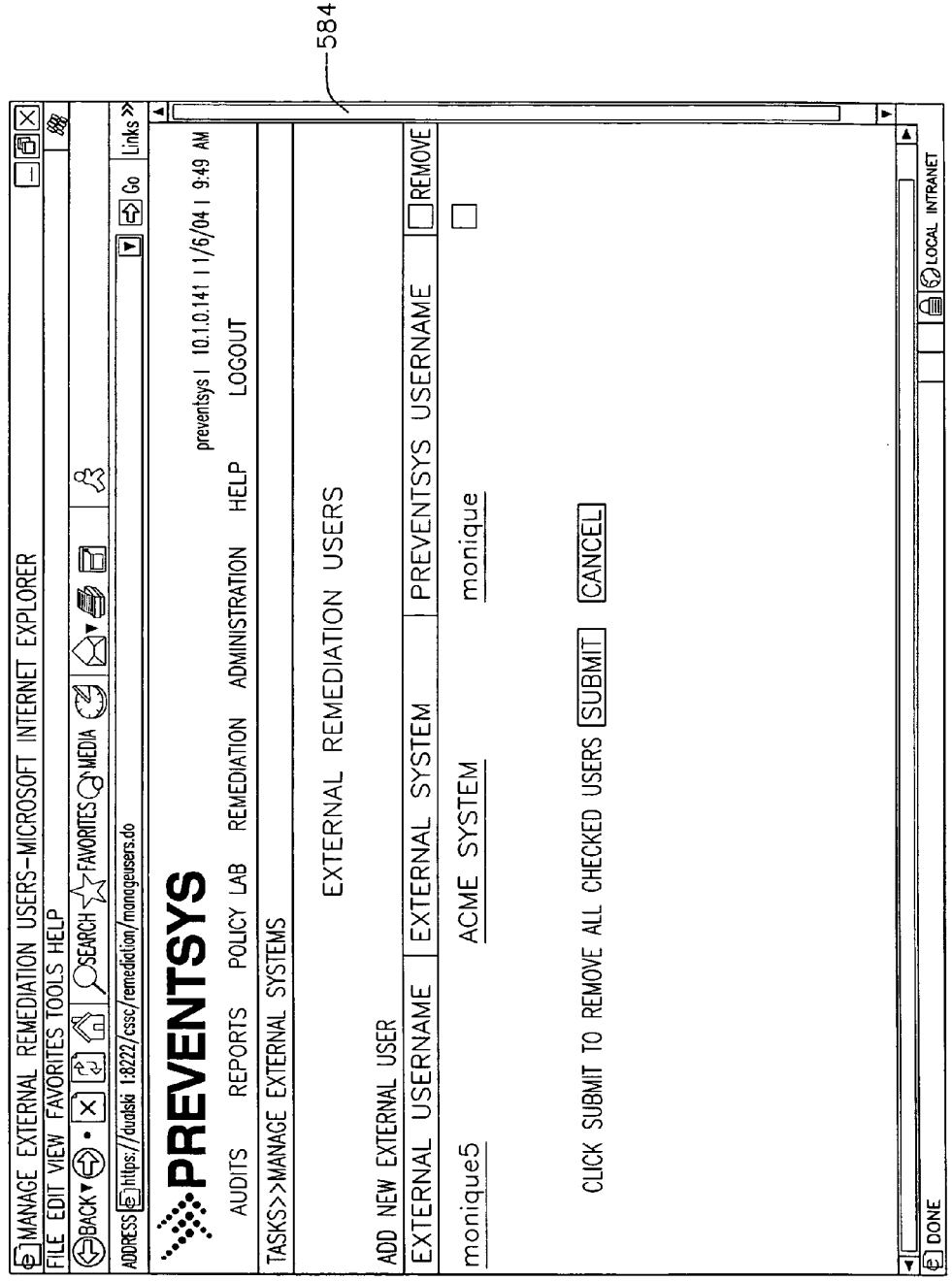
Figure 22D:
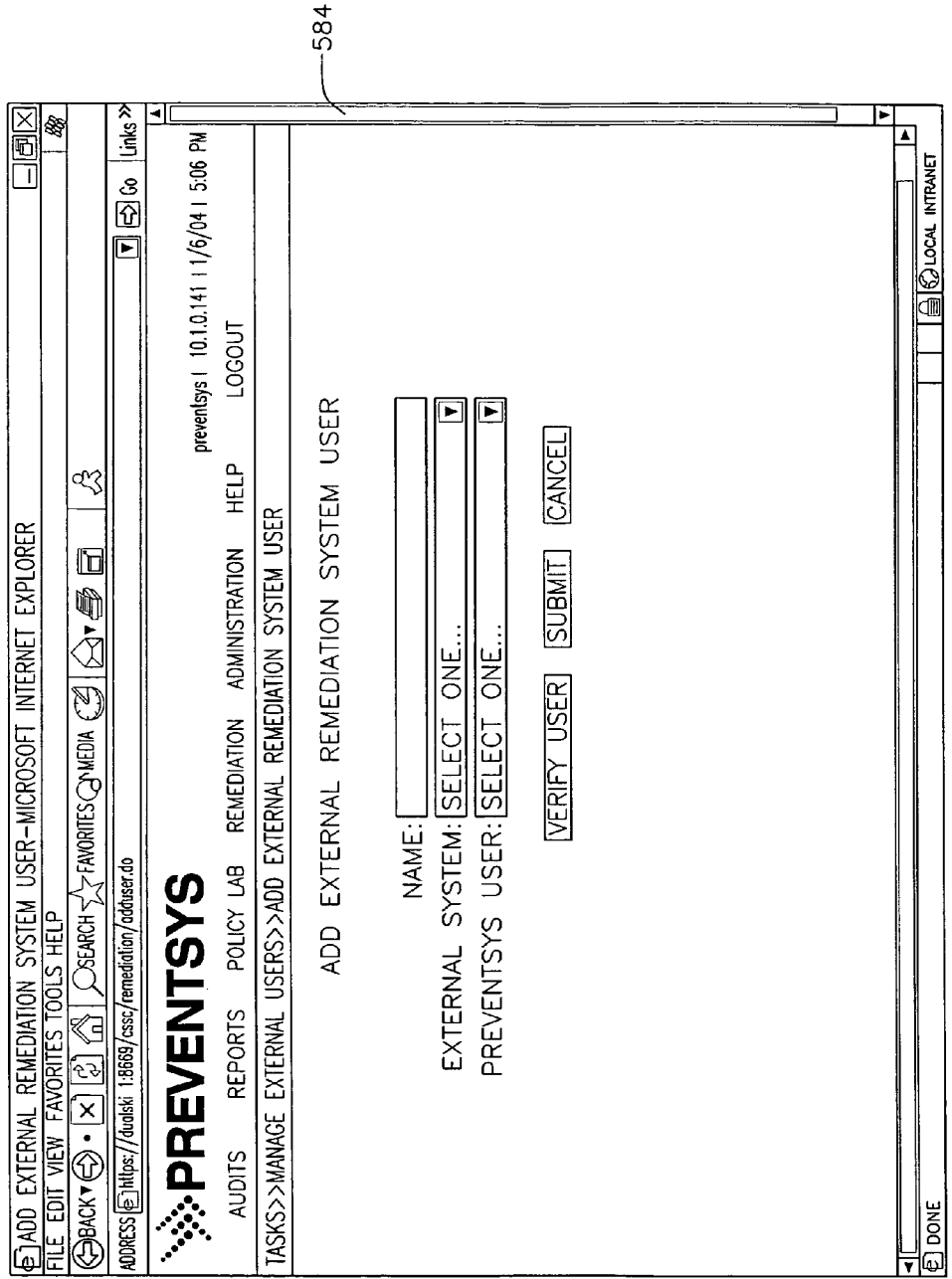

A user may view a list of available ARS via an available systems window 580 (FIG. 22A). A user may add a new ARS to the available systems via an add remediation system window 582 (FIG. 22B). The user may also view information on external users associated with the external ARS via an external remediation users window 584 (FIG. 22C). New external users may be added via an add external remediation system user window 586 (FIG. 22D).

Administration Module

According to one embodiment of the invention, the administration module 402 includes a user, host, and network management sub-module 412, an audit management sub-module 414, a scanner configuration sub-module 416, and a software updates sub-module 418.

Figure 24:
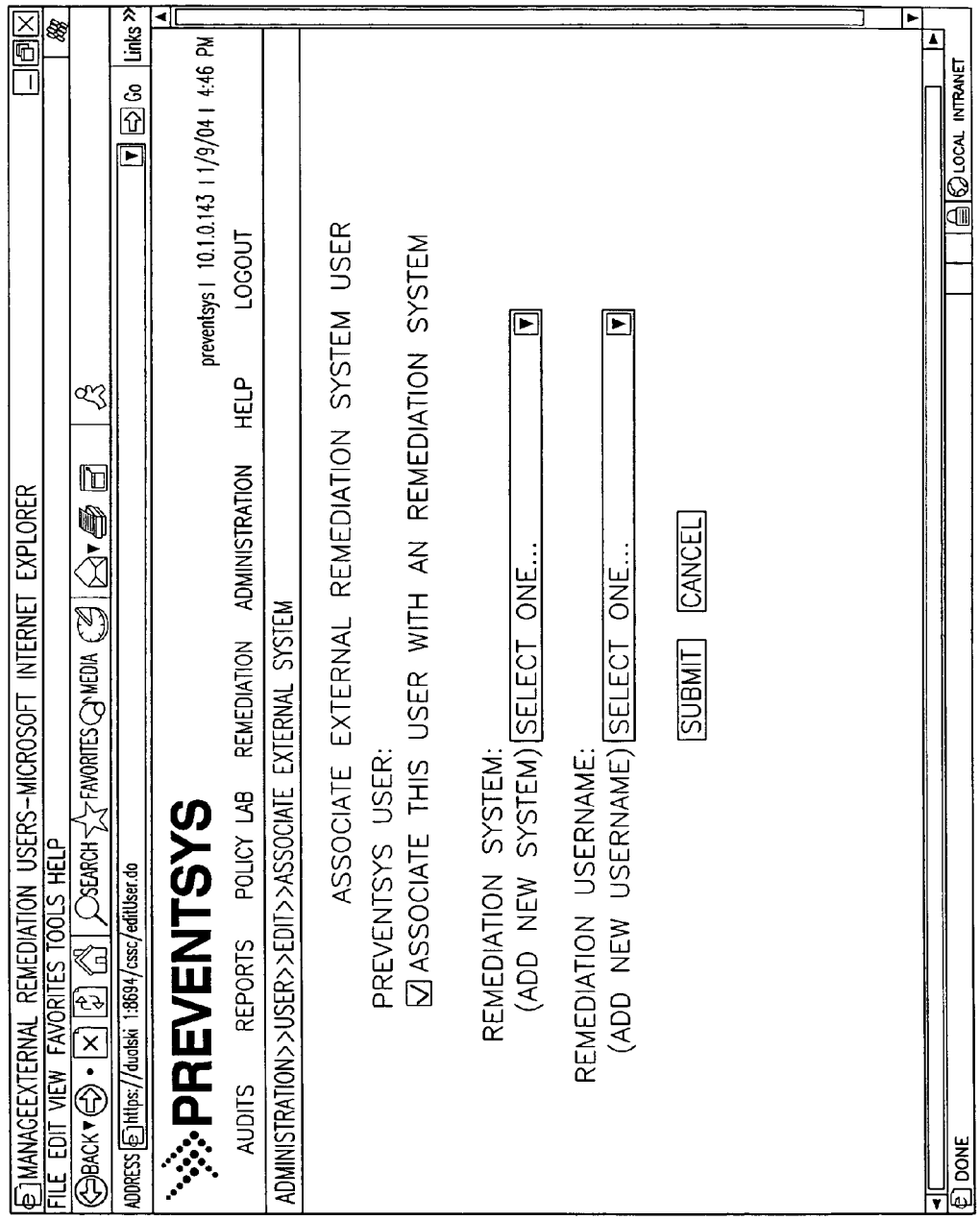
FIG. 24 is a screen shot of an exemplary GUI for associating the user of FIG. 23 with a third-party remediation system according to one embodiment of the invention.

The user, host, and network management sub-module 412 provides a GUI for adding, removing, and editing users, hosts, and networks. FIG. 23 is a screen shot of an exemplary GUI for adding a new user according to one embodiment of the invention. According to the illustrated embodiment, an add users window 600 allows an administrator to provide to a new user, a username, a password, a full name, and an e-mail address. Users are also assigned a default role (or roles), dictating the type of access to various system functions. The user's default role is then associated to a specified network group. The user may also be associated with an external ARS by providing an identifier to the external ARS and a external remediation username, as is illustrated in FIG. 24.

Host management functions include, but are not limited to adding, editing, and removing hosts and host properties. According to one embodiment of the invention, a host is a specific machine on the global network.

Figure 25:
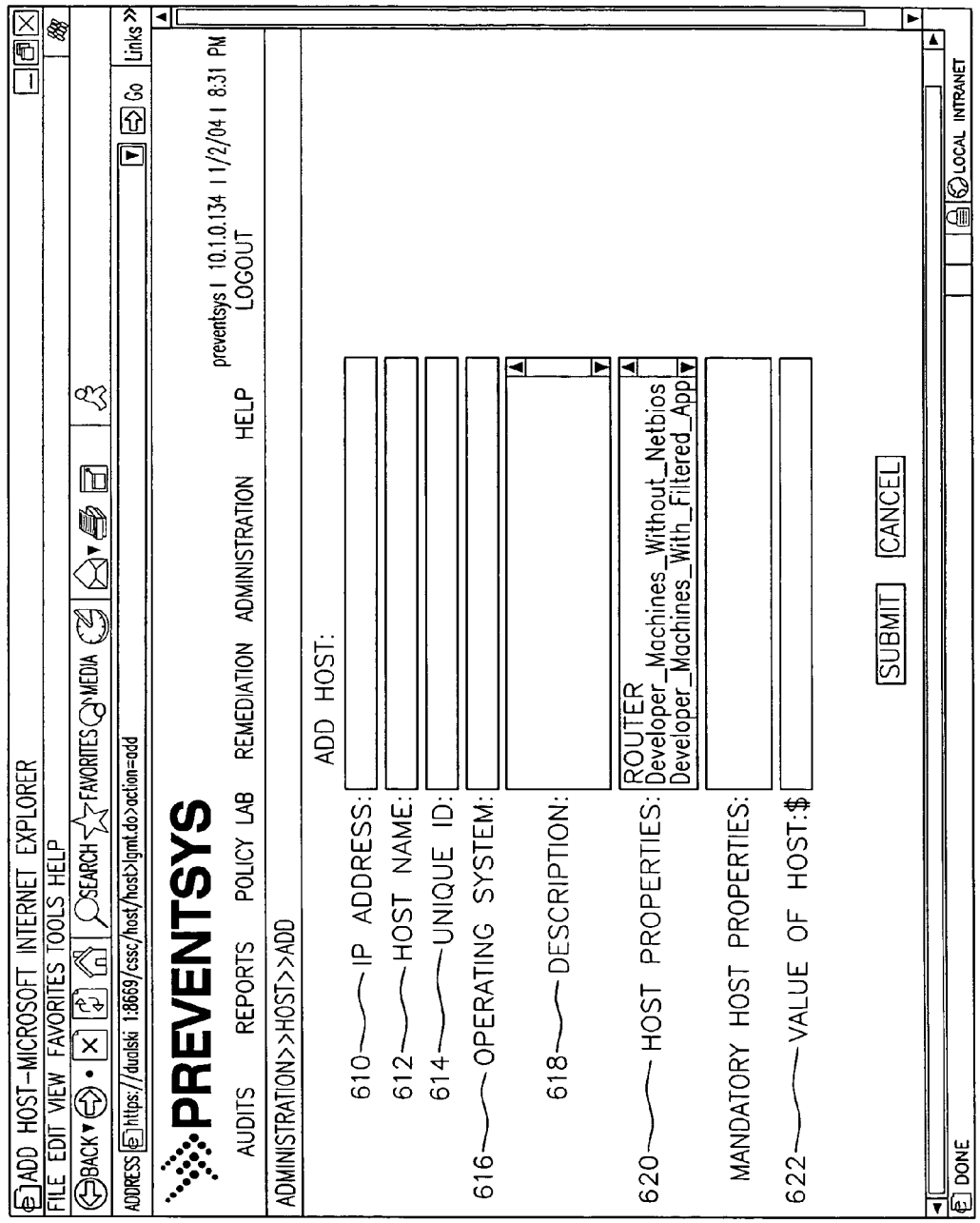
FIG. 25 is a screen shot of an exemplary GUI for adding a host to the global network of FIG. 1 according to one embodiment of the invention.

FIG. 25 is a screen shot of an exemplary GUI for adding a host to the global network according to one embodiment of the invention. The host may be associated with a hostname 610, an IP address 612, a unique ID 614, an operating system 616, and a description 618. The unique ID may take the form of a static IP address or a MAC address in DHCP systems. According to one embodiment of the invention, the unique ID is used to identify hosts despite potential changes to the host name or IP address.

The host may also be associated with a set of host properties 620 and a dollar value 622. According to one embodiment of the invention, the user may select from a list of available host properties to define the type of host (e.g. server, desktop, DMZ, etc.) that is being added. Host properties allow for the detection of policy violations in the context of the assigned host type.

According to one embodiment of the invention, following installation and network definition, running an initial audit triggers the DTAS process for automatically populating the audit repository 14 with host data and generating the target list. An edit host function provided by the user, host, and network management sub-module may then be invoked to manually specify additional host data, such as, for example, its unique ID, host property, and dollar value.

While the DTAS process may automatically retrieve host data and include them in the target list as part of the audit process, the user may also manually add and remove hosts from the target list using the add host and remove host functions.

Figure 26:
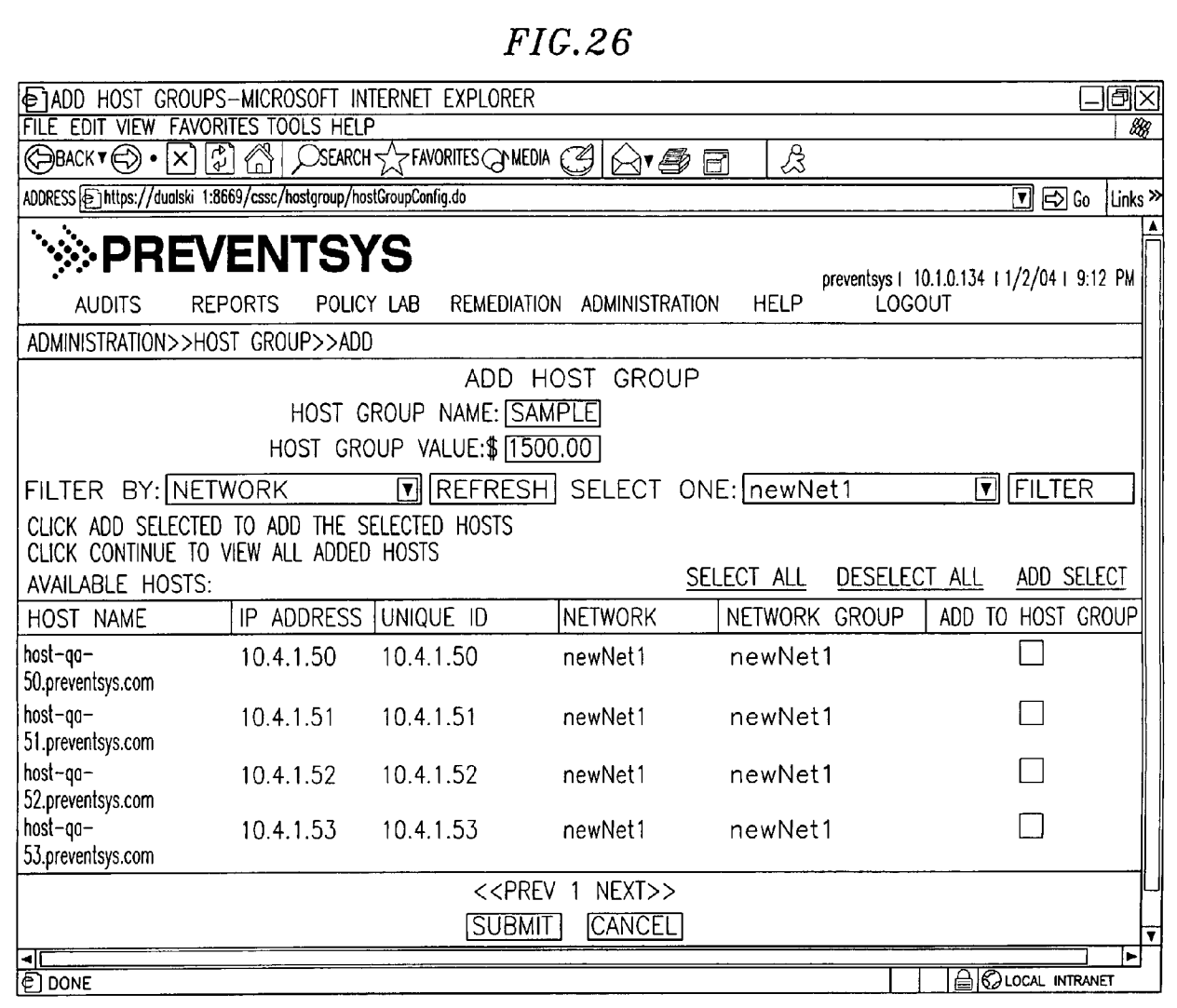

FIG. 26 is a screen shot of an exemplary GUI for generating host groups according to one embodiment of the invention. Host groups represent selections of hosts from disparate networks that are grouped for performing audits and policy analysis. Each host group may be associated with a host group name, a host group value, and a group of included hosts. A dollar value of a host group may be used for calculating assets that are at risk upon detection of a policy or vulnerability rule violation.

According to one embodiment of the invention, in order to audit a host, it is first associated with a network, which in turn is associated with a network group. In this manner, host groups may be associated with network groups to allow for scanning of selected hosts spanning disparate networks.

FIG. 27 is a screen shot of an exemplary GUI for adding a host property to a list of available host properties according to one embodiment of the invention. According to the illustrated embodiment, there are two types of host properties: label-based host properties and specification-based host properties. Label-based host properties simply include a name of the property. An exemplary label-based host property is a property that indicates that the associated host is a database server.

Specification-based host properties include the property's name, description, solution, severity level, and service mappings. The property's description provides basic information about the host property for display in reports generated by the compliance reporting module 400. The property's solution includes a text description and/or links for alleviating policy violations associated with the selected host property. Specification-based host properties further include an indicator for determining whether the host property should be applied to all hosts.

Exemplary host property specifications include, but are not limited to trusted host properties, firewall host properties, router host properties, properties for developer machines without Netbios, properties for developer machines with filtered application server, properties for commerce servers, and the like. According to one embodiment of the invention, custom host properties may also be created and manipulated via an add host properties, an edit host properties, and a remove host properties function provided by the user, host, and network management sub-module 412.

Figure 28:
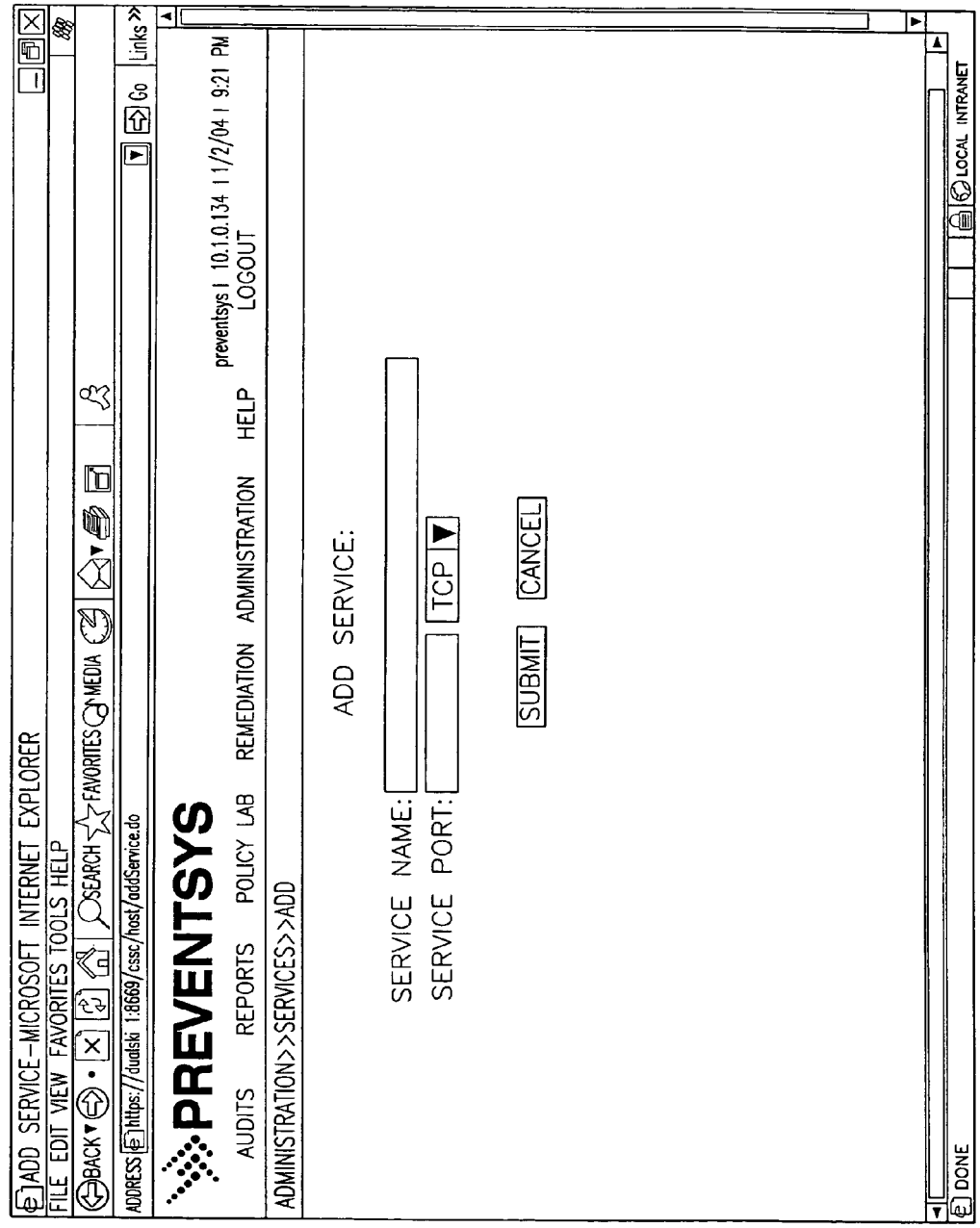
FIG. 28 is a screen shot of an exemplary GUI for adding a service that may be selected when defining a host property specification according to one embodiment of the invention.

FIG. 28 is a screen shot of an exemplary GUI for adding a service that may be selected when defining a host property specification according to one embodiment of the invention. According to the illustrated embodiment, a service is associated with a service name, a protocol, and a service port. The service port represents a port on which the service runs. The protocol indicates an Internet protocol such as, for example, TCP or UPD, to be utilized for the service.

Figure 29:
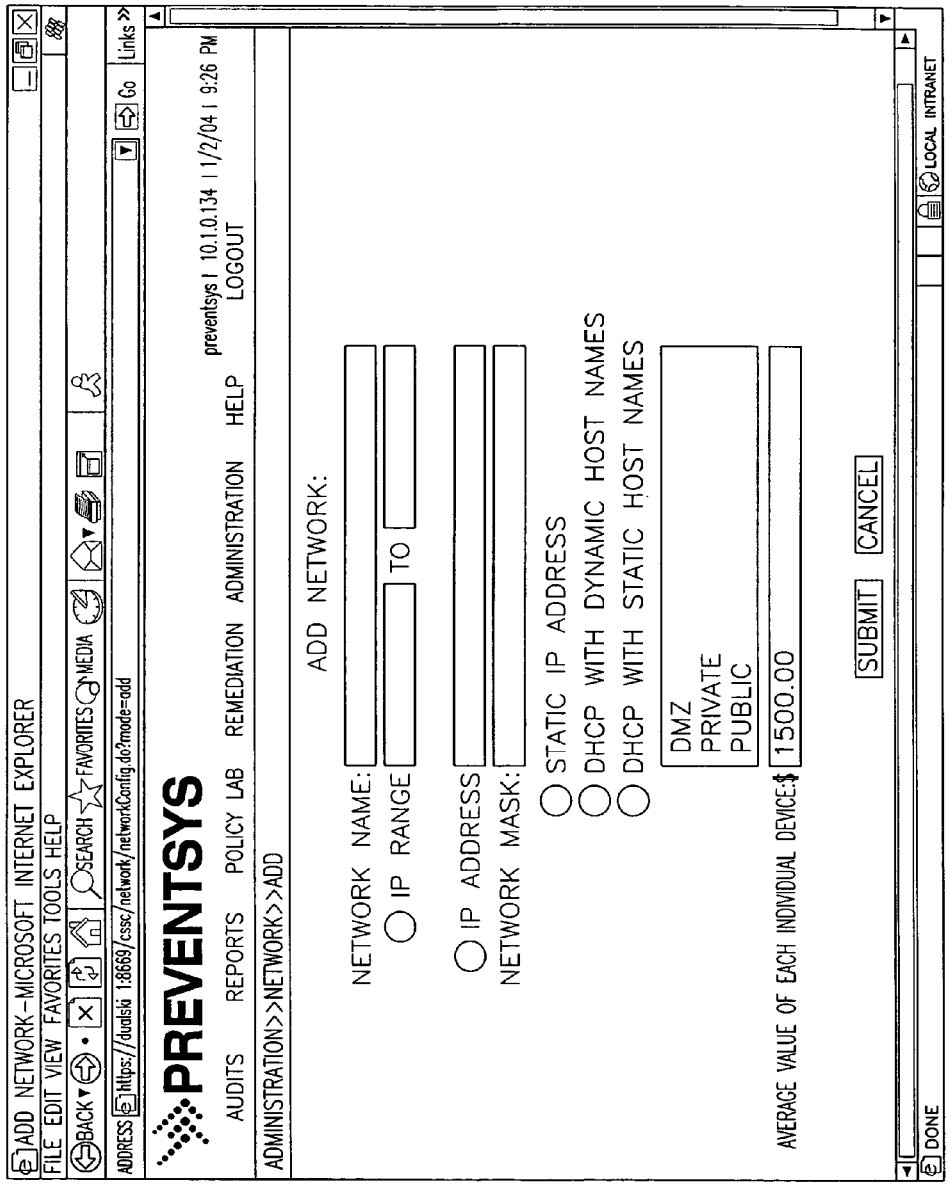
FIG. 29 is a screen shot of an exemplary GUI for adding a sub-network to the global network of FIG. 1 according to one embodiment of the invention.

FIG. 29 is a screen shot of an exemplary GUI for adding a sub-network to the global network of FIG. 1 according to one embodiment of the invention. A network, according to the illustrated embodiment, represents a specific cluster of hosts. A network may be associated with a network name, an IP range (for range-based networks) or IP address/network mask (for mask-style networks), a static/DHCP configuration, and an average value for each individual device on the network.

The average value of an individual device on the network may be used to calculate assets at risk upon the detection of policy or vulnerability violations. The average value may then be used as the value of a host for which no specific dollar value was specified. When no value is specified, the average value of each individual device on the network may default to a predetermined dollar amount. This default value may be changed.

According to one embodiment of the invention, a network is associated with a predetermined network property. Network properties allow policy violations to be analyzed in the context of the associated network type during audit analysis.

Figure 30:
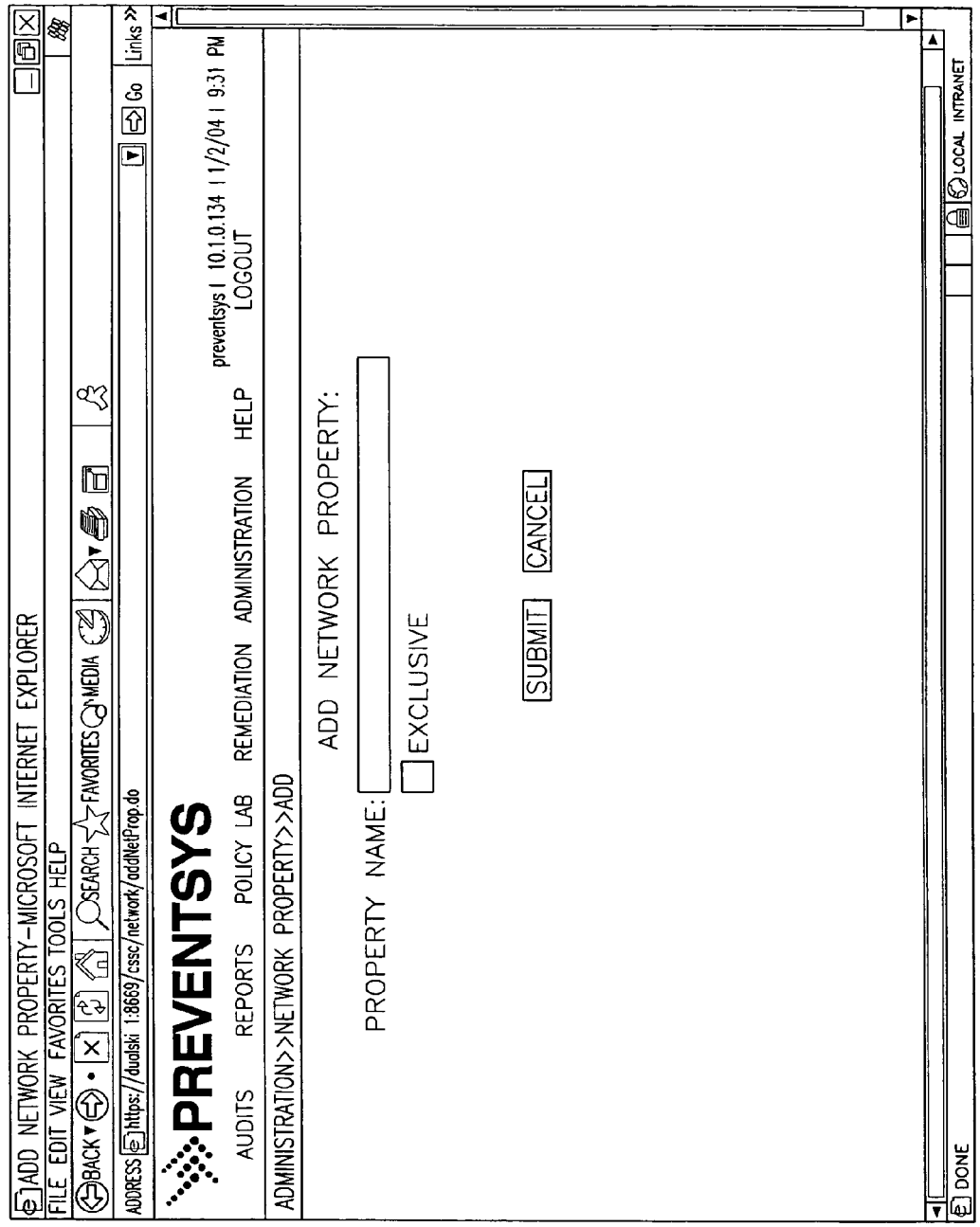
FIG. 30 is a screen shot of an exemplary GUI for adding a network property that may be associated to a network according to one embodiment of the invention.

FIG. 30 is a screen shot of an exemplary GUI for adding a network property that may be associated to a network according to one embodiment of the invention. Exemplary network properties include properties for a DMZ network, private network, or public network. According to one embodiment of the invention, network properties are simply labels that are used to provide lexical terms that match the user's description of the function of their different networks (i.e. DMZ, Finance, private, public, etc.) for use as references when writing policies.

According to one embodiment of the invention, network properties may be exclusive or non-exclusive. Networks may support multiple non-exclusive network properties, but assigning an exclusive network property to a network precludes the assignment of additional network properties to that network.

Figure 31A:
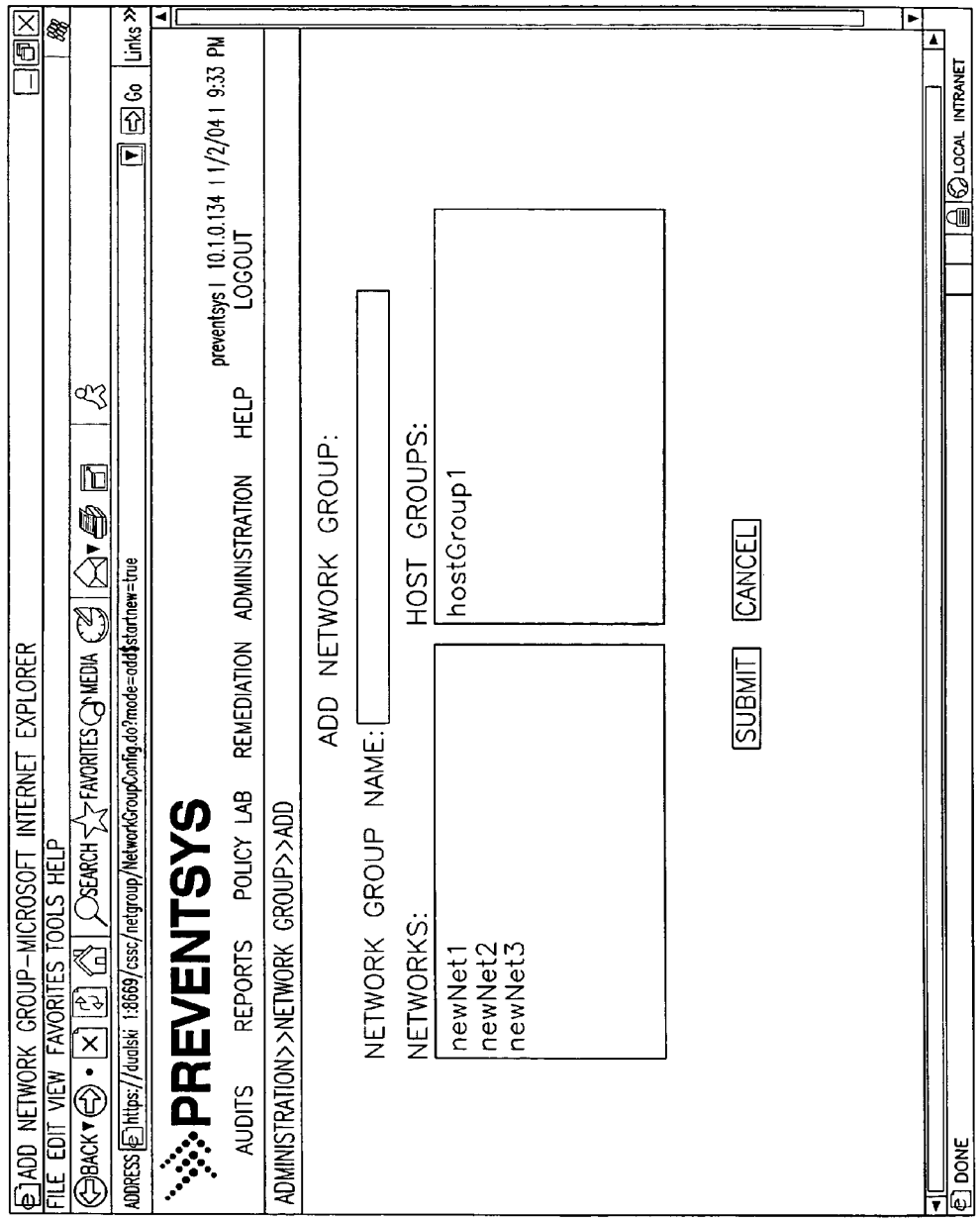
FIGS. 31A-31B are screen shots of exemplary GUIs for generating a network group and assigning access control according to one embodiment of the invention.
Figure 31B:
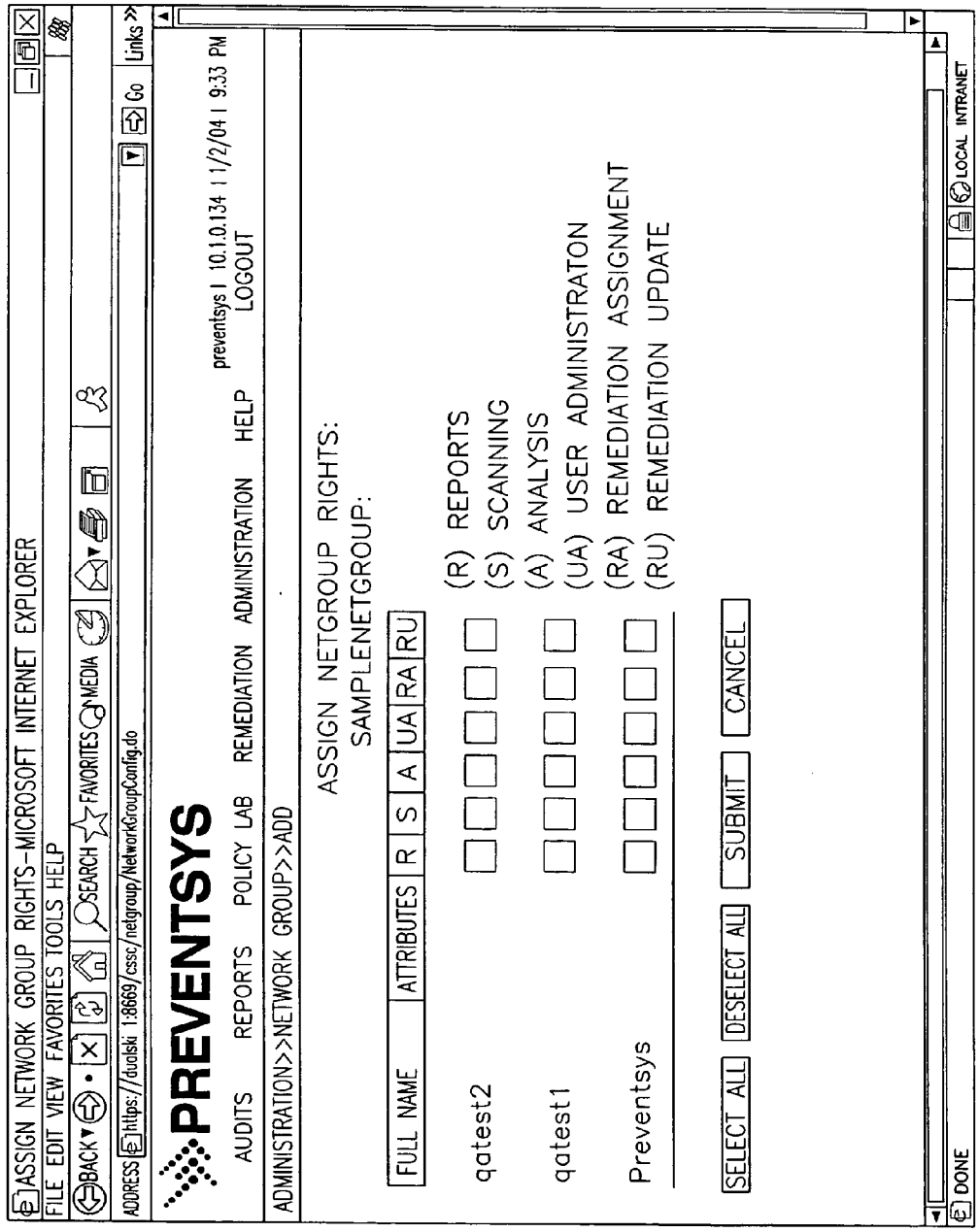

FIGS. 31A-31B are screen shots of exemplary GUIs for generating a network group and assigning access control according to one embodiment of the invention. Network groups represent clusters of networks that are grouped for performing audits and policy analysis. According to the illustrated embodiment, a network is first associated to a network group in order for it to be audited.

A network group may be associated with a network group name, a group of included networks and/or host groups, and user privilege assignments that determine which functions users can access for the network group. According to one embodiment, while a network group may contain hosts from networks and host groups, those hosts are different from each other. According to this embodiment, a network group does not contain like hosts.

According to one embodiment of the invention, the audit management sub-module 420 allows for audit management, including audit configuration and scheduling. Audit configuration functions encompass the creation, editing, and removal of audit configurations, which, according to one embodiment of the invention, represent specific schemes for performing network security audits.

Figure 32A:
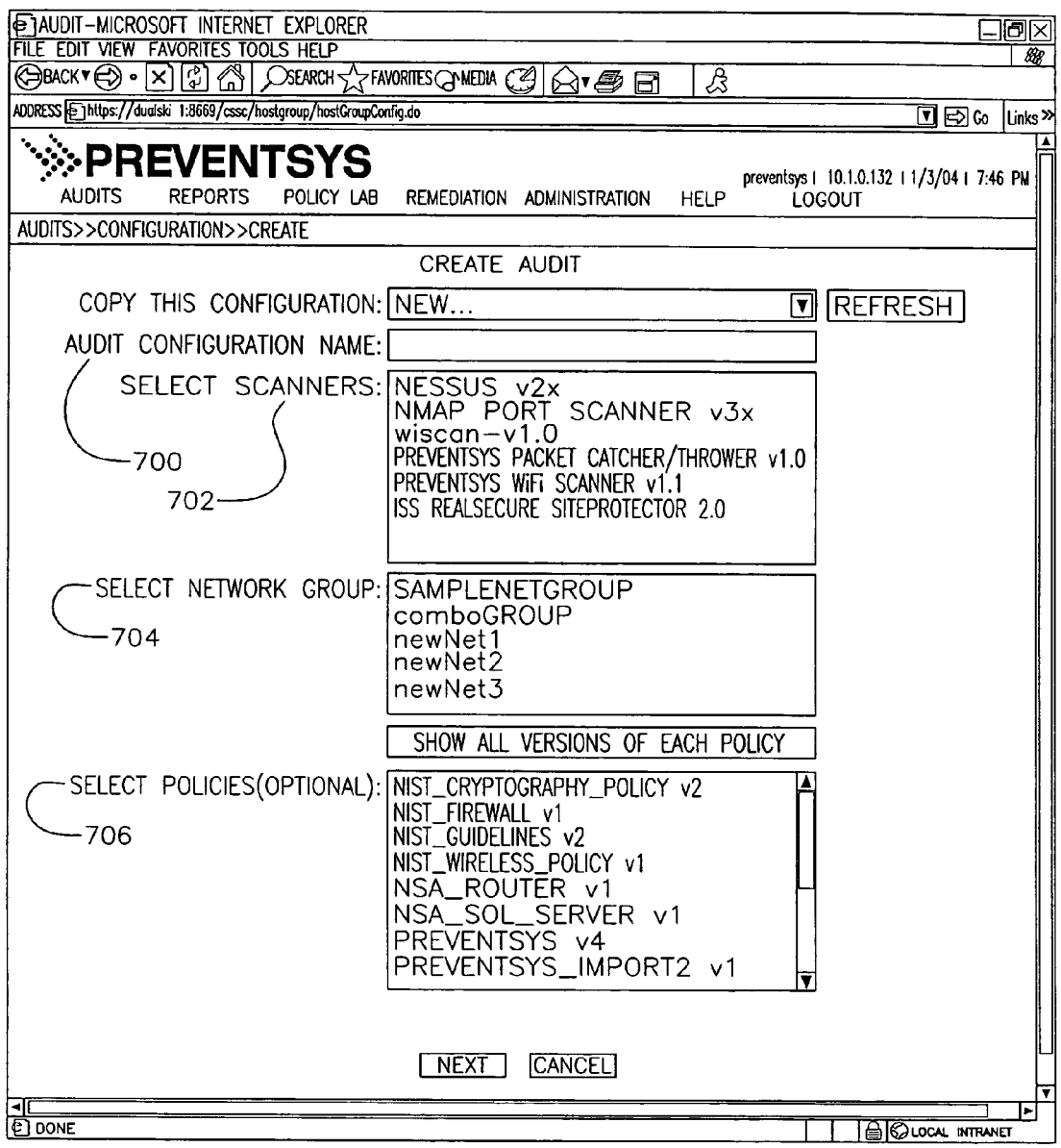
FIGS. 32A-32B are screen shots of exemplary GUIs for creating an audit according to one embodiment of the invention.
Figure 32B:
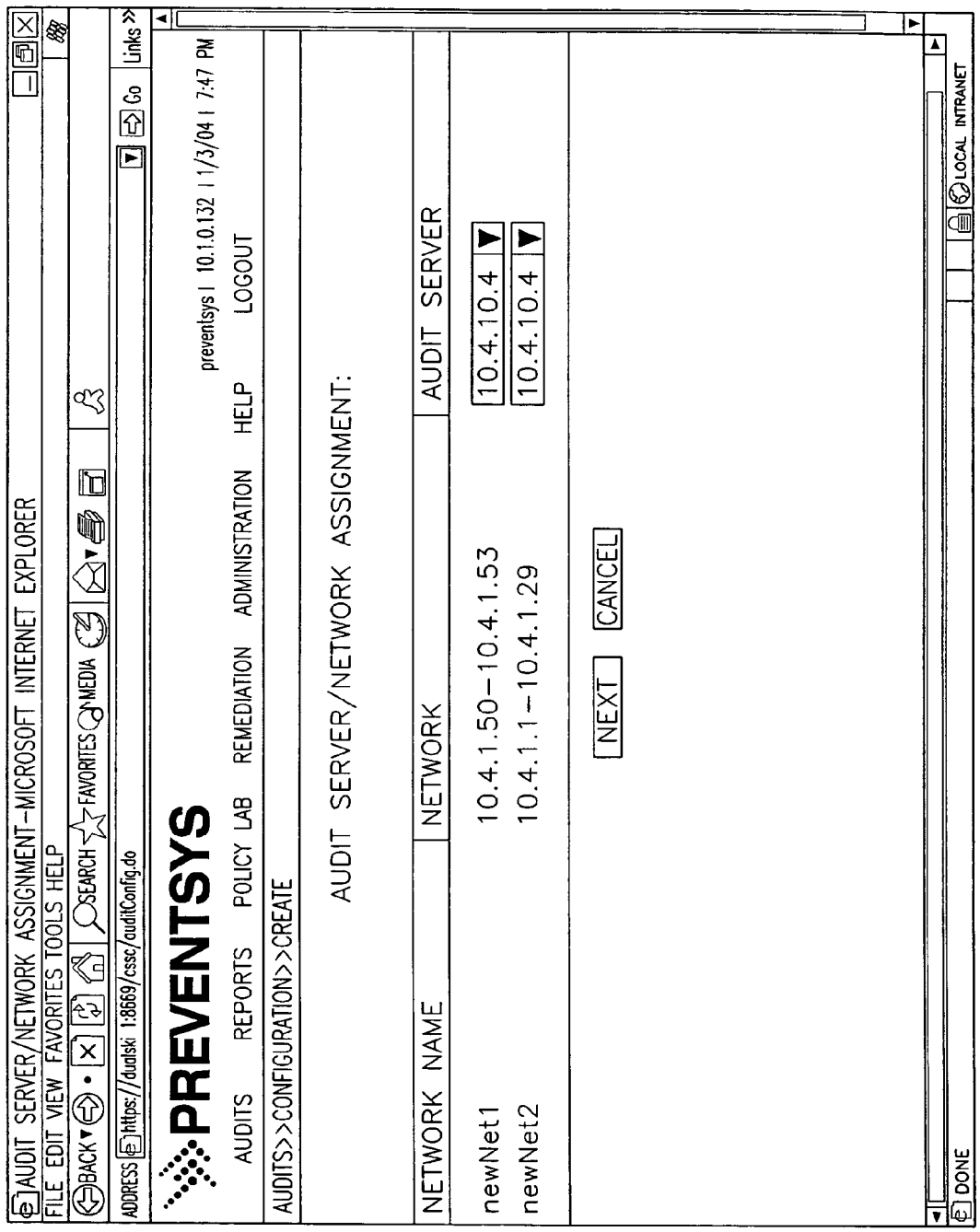

FIGS. 32A-32B are screen shots of exemplary GUIs for creating (configuring) an audit according to one embodiment of the invention. According to the illustrated embodiment, an audit is generated by providing a unique audit configuration name 700, a list of network groups to be audited 704, an optional list of policies 706 selected from the policy directory 60 (FIG. 4) against which the audit is to be analyzed 706, and a selection of scanners 702 for performing the audit. Particular audit servers 12 may also be designated for scanning particular networks as is illustrated in FIG. 32B. According to one embodiment of the invention, the system may automatically distribute audit tasks to a number of audit scanners based on load and remaining work information. Various scanner options and configuration settings may further be specified as part of the audit configuration process.

According to one embodiment of the invention, if no policies are selected in an audit configuration, the audit servers 12 simply generate audit scan results based on data gathered about the scanned networks. However, policies are not applied to the scan results until selected by invoking a re-analyze audit results function provided by the audit management sub-module 414. According to one embodiment of the invention, audit results are not available for generating reports until policies have been applied.

Figure 33:
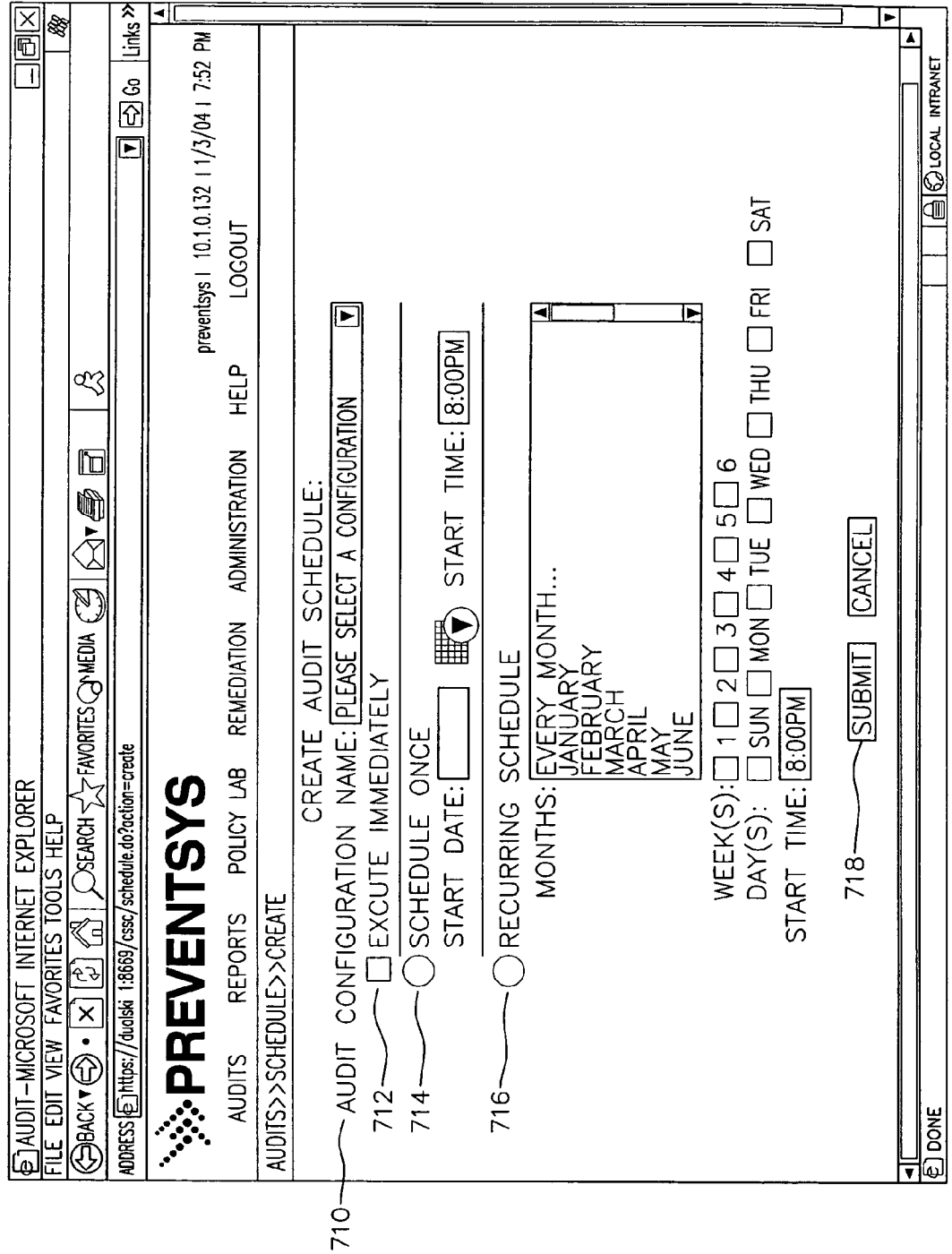
FIG. 33 is a screen shot of an exemplary GUI for scheduling a configured audit according to one embodiment of the invention.

FIG. 33 is a screen shot of an exemplary GUI for scheduling the execution of a configured audit according to one embodiment of the invention. According to the illustrated embodiment, an audit is scheduled by selecting the name 710 of a configured audit, and indicating whether the audit is to be executed immediately 712, at a specified date and time 714, or periodically 716 according to a recurring schedule. Audits that are configured with a recurring schedule are run indefinitely, according to the specified date parameters, until the audit schedule is altered or removed.

Selection of a submit button 718 causes the configured audit to be stored in the repository of audit configurations and schedules until ready for execution by the audit servers 12. In this regard, the compliance server 10 includes a scheduling mechanism that continuously reviews the audit schedules, and upon detecting that it is time to execute a scheduled audit, it informs the audit servers 12 with the required audit configuration information. The audit servers 12 then proceed to execute the audit based on the received audit configuration information.

Figure 34:
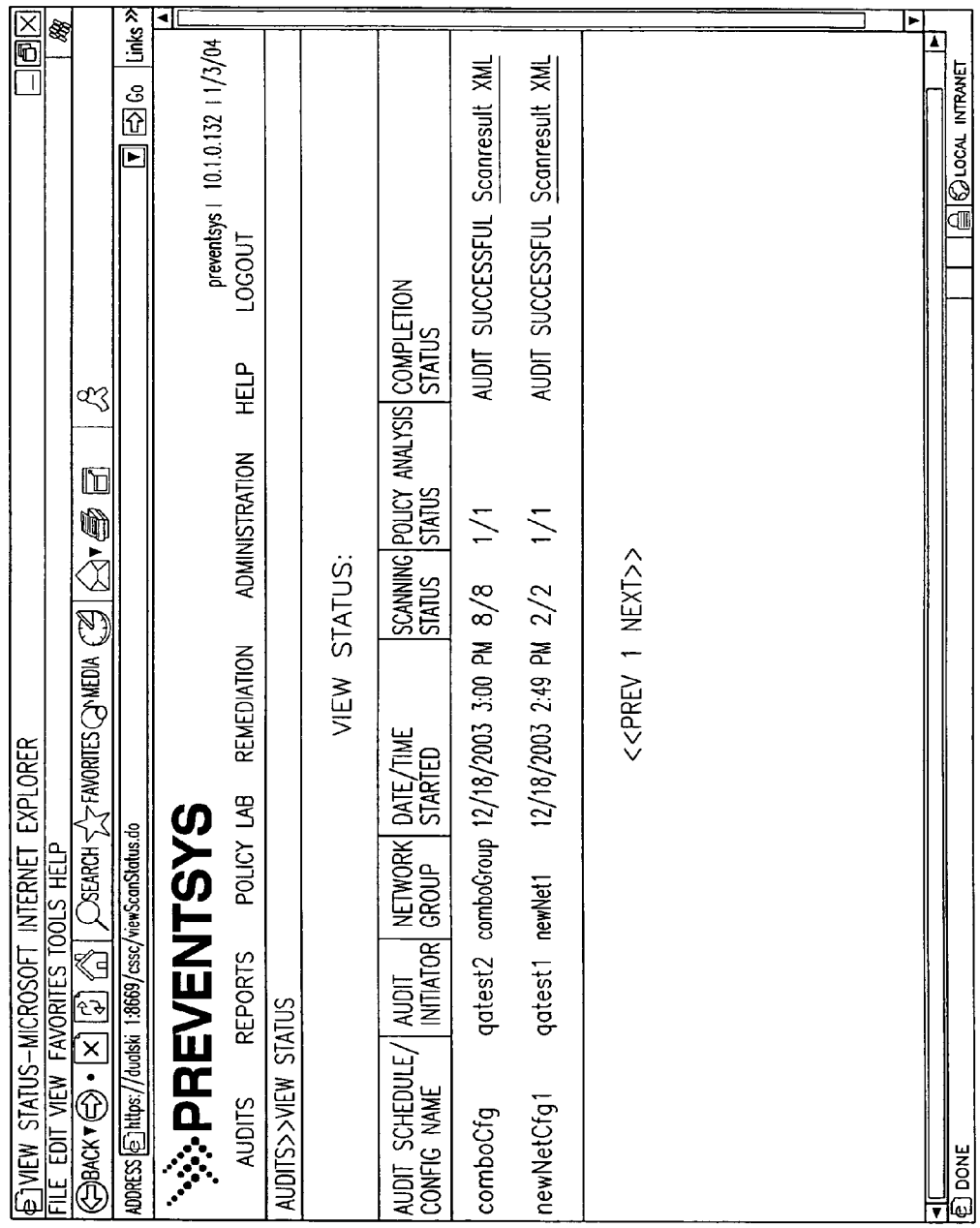
FIG. 34 is an exemplary screen shot of a GUI for viewing the status of a scheduled audit according to one embodiment of the invention.

According to one embodiment of the invention, the status of a scheduled audit may be viewed by invoking a view status function of the audit management sub-module 414. FIG. 34 is an exemplary screen shot of a GUI for viewing the status of a scheduled audit. According to one embodiment of the invention, the view status function may also allow for the viewing of an XML scan result associated with a completed audit, and for the cancellation of audits that are currently in progress.

Figure 35:
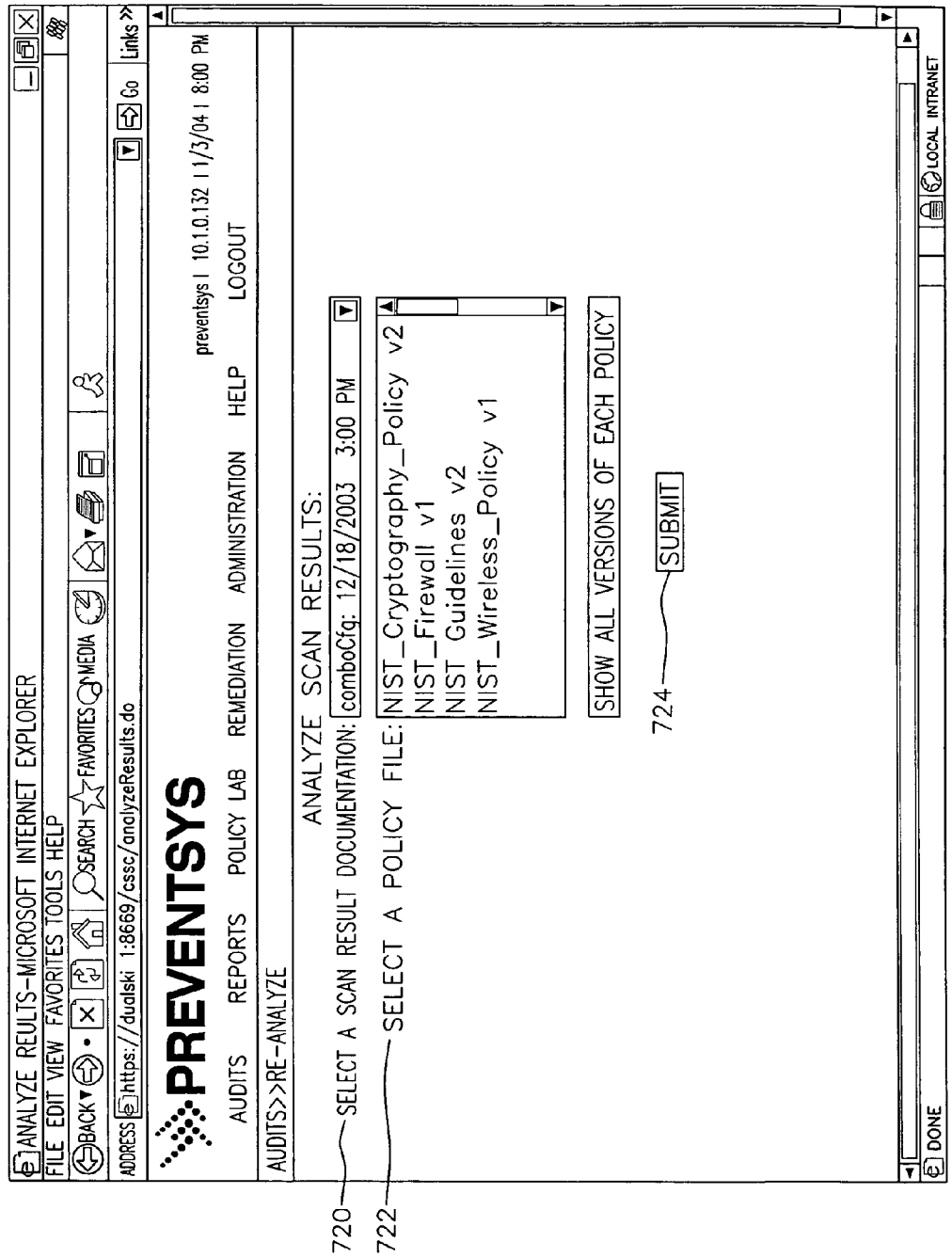
FIG. 35 is a screen shot of a GUI for re-analysis utilizing the same or different policies re-analyzing a scan result according to one embodiment of the invention.

FIG. 35 is a screen shot of a GUI for re-analyzing a scan result according to one embodiment of the invention. This may be desirable if the user wants to initiate an analysis of a scan result for which no policies were initially configured. Even if a policy was initially selected during the configuration process, invocation of the re-analyze audit results function may be desirable if the user wants to apply additional policies to the scan result. In this regard, the GUI allows the user to select, in area 720, a particular scan results document stored in the audit repository 14. The user further selects, in area 722, a policy from a list of policy files stored in the audit repository 14. Selection of a submit button 724 causes the re-analyze audit results function to invoke the P&V engine 34 to generate a policy template for the selected policy, and execute the policy template on the scan results document. This results in a compliance document that may then be analyzed for generating compliance reports 500.

Figure 36:
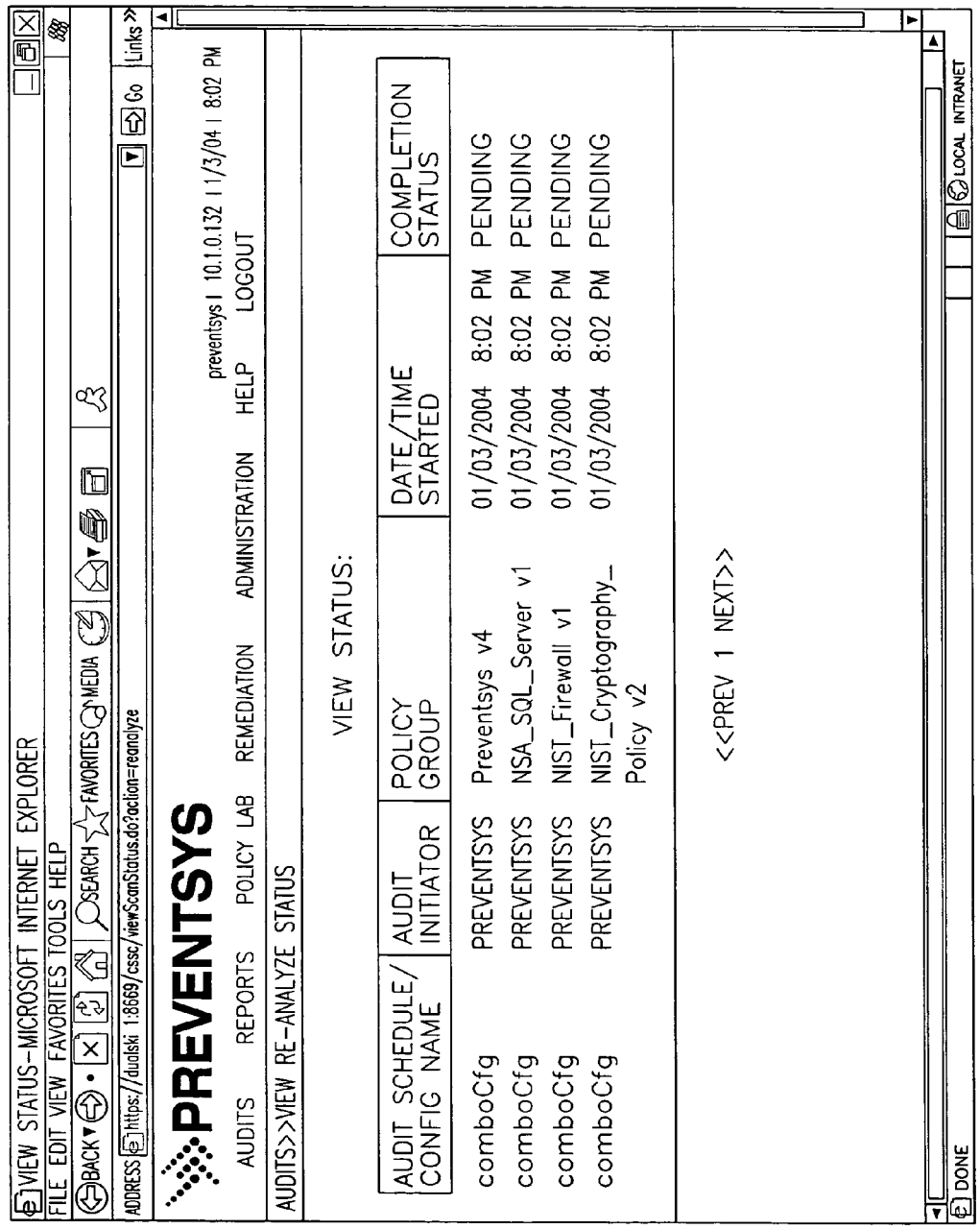
FIG. 36 is an exemplary screen shot of a GUI for viewing the status of audits scheduled for re-analysis utilizing the same or different policies.

According to one embodiment of the invention, the administrator who initiated the re-analysis process is automatically notified, such as, for example, via e-mail, upon completion of the re-analysis. The administrator may further view the status of audits scheduled for re-analysis by invoking a view re-analyze status function of the audit management sub-module 414. FIG. 36 is an exemplary screen shot of a GUI for viewing the status of audits scheduled for re-analysis. The view re-analyze status function may also be invoked to view the XML compliance document generated by the analysis.

According to one embodiment of the invention, the software updates sub-module 426 allows for updates to the policy library 42, operating system, and other system components such as, for example, the compliance server 10, audit servers 12, DTAS servers, DPF servers, and the like.

In updating the policy library, the administrator invokes an update policy library function provided by the software updates sub-module 426, and downloads updated policy library files from a remote site. An import policy function is then invoked to implement the new policies.

Figure 37A:
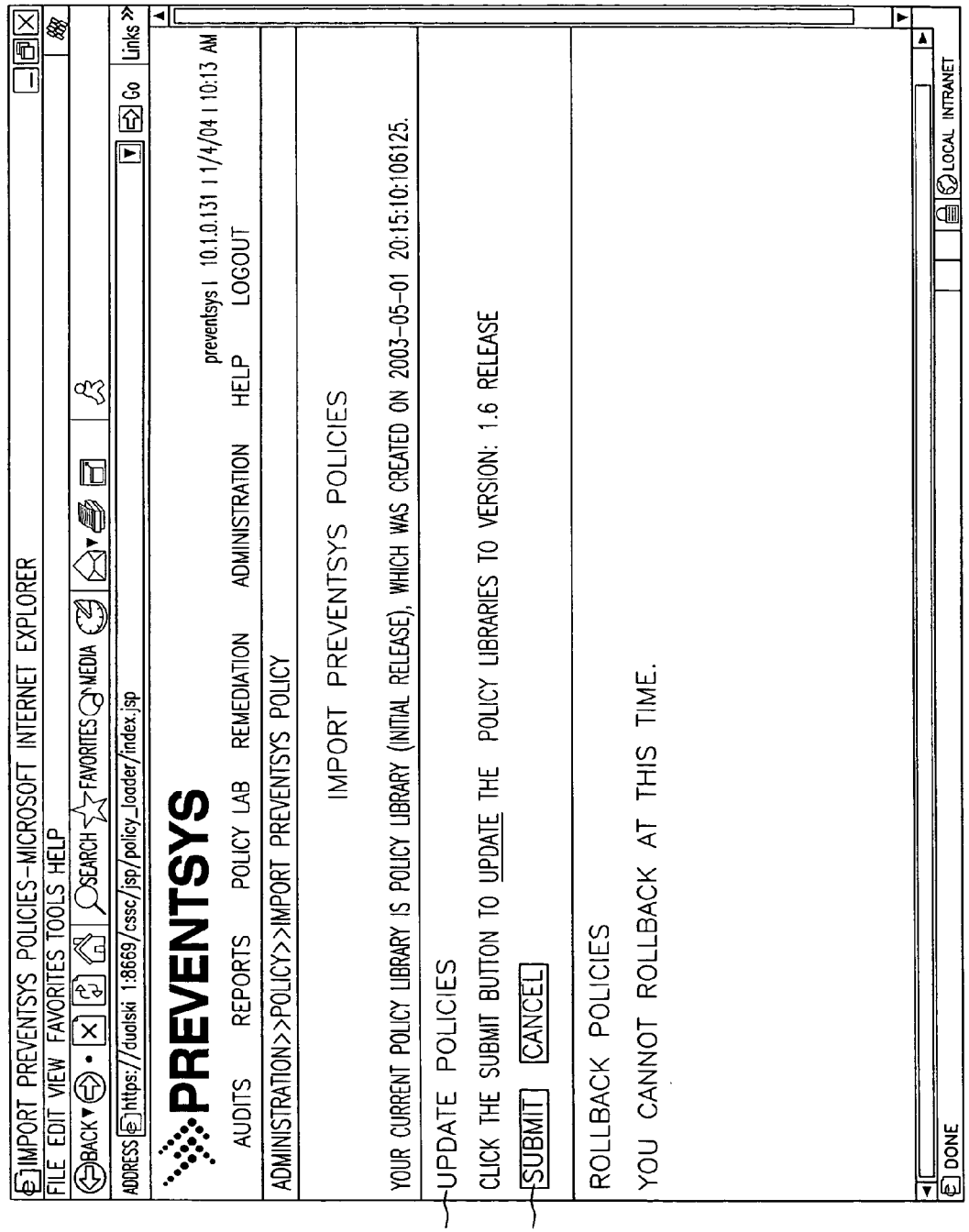

FIGS. 37A-37B are screen shots of GUIs for importing policies according to one embodiment of the invention. Selection of a submit button 730 in an updates policies window 734 allows new policies to be implemented in the system. The user may also opt to rollback to a previous version of a particular policy by selecting a submit button 736 in a rollback policies window 732.

According to one embodiment of the invention, the software updates sub-module 426 also provides a component rollback function that allows certain system components to be taken back to a previous version. Prior to initiating the rollback, however, the software updates sub-module 426 verifies that the selected component is idle. If the component is currently in use, the rollback request is canceled.

The rolling back of the operating system or system components as well upgrading the system's operating system initiates a re-verification of the old component's signature file. According to one embodiment of the invention, this is accomplished automatically by the software updates sub-module 426. If the signature is not valid, the rollback or update process is canceled.

Although this invention has been described in certain specific embodiments, those skilled in the art will have no difficulty devising variations to the described embodiment which in no way depart from the scope and spirit of the present invention. For example, although the various modules described herein are described as being software modules implemented on one or more processors, a person of skill in the art should recognize that the modules may be implemented in hardware, firmware, or any combination of software, hardware or firmware. Furthermore, the steps described in the flow diagrams may be implemented in the indicated order, or in any other order recognized by a person of skill in the art.

Moreover, to those skilled in the various arts, the invention itself herein will suggest solutions to other tasks and adaptations for other applications. For example, the policies described herein are network security policies, a person of skilled in the art should recognize that other types of policies may be used in performing network audits. It is the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method comprising:
communicating with a plurality of heterogeneous information sources;
converting received network information into a normalized data format written in a mark-up language;
comparing at least a portion of the converted network information with a network policy;
determining, based on the comparison, compliance with the network policy; and
recommending rules for improving the network policy;
wherein the received network information is normalized for structure utilizing a conversion table that maps known fields of the received network information into fields used in the normalized data format;
wherein the rules are recommended via an ordered list, the ordered list ordering the rules based on a number of times each of the rules was previously applied, a severity meter set for each of the rules, or assets affected by each of the rules, wherein the network information includes a list of wireless access point devices and associated parameters used for accessing one or more wireless networks, and wherein a location for each of the wireless access points is determined.

2. The method of claim 1, wherein the comparing further comprises:
identifying whether a first converted network information associated with a first information source is semantically equivalent to a second converted network information associated with a second information source.

3. The method of claim 1 further comprising:
tracking an identity of a network device; and
correlating the gathered network information based on the tracked identity of the network device.

4. The method of claim 1 further comprising:
scheduling a network audit for gathering the network information; and
dynamically configuring a packet filter for opening communication with a network device in response to a start of the scheduled network audit, and closing communication with the network device in response to an end of the scheduled network audit.

5. The method of claim 1, further comprising:
making an association with a particular wireless access point.

6. The method of claim 5, wherein the determining of the location of the particular wireless access point comprises:
identifying one or more routers associated with the particular wireless access point; and
associating the identified routers with the particular wireless access point parameters.

7. The method of claim 6, wherein the identifying of the one or more routers comprises tracing a route of a packet transmitted via the routers.

8. A system, comprising:
a first server coupled to a plurality of heterogeneous information sources, the first server including:
means for facilitating communication with the plurality of heterogeneous information sources; and
means for converting the information gathered by the heterogeneous information sources into a normalized data format written in a mark-up language; and a recommendation engine for recommending rules for improving the network policy;

wherein the information is normalized for structure utilizing a conversion table that maps known fields of the information into fields used in the normalized data format;

wherein the rules are recommended via an ordered list, the ordered list ordering the rules based on a number of times each of the rules was previously applied, a severity meter set for each of the rules, or assets affected by each of the rules, wherein the network information includes a list of wireless access point devices and associated parameters used for accessing one or more wireless networks, and wherein a location for each of the wireless access points is determined.

9. The system of claim 8 further comprising:

means for comparing at least a portion of the converted information with a network policy.

10. The system of claim 8 further comprising:

means for identifying whether a first converted network information associated with a first information source is semantically equivalent to a second converted network information associated with a second information source.

11. The system of claim 8 further comprising:

means for tracking an identity of a network device; and means for correlating the gathered network information based on the tracked identity of the network device.

12. The system of claim 8 further comprising:

means for scheduling a network audit for gathering the network information; and means for dynamically configuring a packet filter for opening communication with a network device in response to a start of the scheduled network audit, and closing communication with the network device in response to an end of the scheduled network audit.

13. The system of claim 8, the system further comprising:

means for making an association with a particular wireless access point.

14. The system of claim 13, wherein the means for determining the location of the particular wireless access point comprises:

means for identifying one or more routers associated with the particular wireless access point; and means for associating the identified routers with the particular wireless access point parameters.

15. A computer program product embodied on a tangible non-transitory computer readable medium, comprising:

computer code for receiving network information gathered by a heterogeneous information sources via the uniform communications interface;

computer code for converting the received network information into a normalized data format taking the form of a mark-up language;

computer code for comparing at least a portion of the converted network information with a network policy;

computer code for determining, based on the comparison, compliance with the network policy; and computer code for recommending rules for improving the network policy;

wherein the received network information is normalized for structure utilizing a conversion table that maps known fields of the received network information into fields used in the normalized data format;

wherein the rules are recommended via an ordered list, the ordered list ordering the rules based on a number of times each of the rules was previously applied, a severity meter set for each of the rules, or assets affected by each of the rules, wherein the network information includes a list of wireless access point devices and associated parameters used for accessing one or more wireless networks, and wherein a location for each of the wireless access points is determined.

16. The method of claim 1, wherein the mark-up language includes an extensible mark-up language (XML).

17. The method of claim 5, wherein the associated parameters include at least one of an identifier, a radio frequency, a channel, and an encryption status associated with the particular wireless access point device.

18. The method of claim 1, wherein at least one of the assets includes a particular wireless access point, and the rules are recommended in response to a determination that the network policy excludes rules for the particular wireless access point.

19. The method of claim 1, wherein the rules are written for specific device types, specific application configurations, and specific subnets and further include rules that seek to find violations of network policies, rules that seek to gather the information about the network, rules that seek to identify compromised hosts, and rules that seek to identify vulnerabilities in the network.

20. The method of claim 1, wherein the reference map includes a reference field and at least one data source field, the reference field including a list of references mapped to corresponding test IDs and keywords produced by data source products identified in the at least one data source field, and each test ID and keyword associated with a particular data source product is deemed semantically equivalent to at least one other test ID and keyword associated with another data source product when the test ID and keyword and the at least one other test ID and keyword are associated with the same reference.

* * * * *